United States Patent
Lidgett et al.

(10) Patent No.: US 12,371,077 B2
(45) Date of Patent: Jul. 29, 2025

(54) SENSING METHOD, SYSTEM AND ASSEMBLY FOR RAILWAY ASSETS

(71) Applicant: AMSTED RAIL COMPANY, INC., Chicago, IL (US)

(72) Inventors: Justin M. Lidgett, Forney, TX (US); Andrew H. Martin, West Chester, PA (US); Armand P. Taillon, Barrington, IL (US); Evan Weiner, Chicago, IL (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 921 days.

(21) Appl. No.: 17/510,096

(22) Filed: Oct. 25, 2021

(65) Prior Publication Data
US 2022/0041194 A1   Feb. 10, 2022

Related U.S. Application Data

(63) Continuation-in-part of application No. 16/256,772, filed on Jan. 24, 2019, now Pat. No. 11,180,170.
(Continued)

(51) Int. Cl.
*B61L 15/00* (2006.01)
*B61L 27/70* (2022.01)
(Continued)

(52) U.S. Cl.
CPC ...... *B61L 15/0081* (2013.01); *F16K 37/0083* (2013.01); *G01D 5/12* (2013.01); *B61L 27/70* (2022.01)

(58) Field of Classification Search
CPC .. B61L 15/0081; B61L 27/70; F16K 37/0083; G01D 5/12
See application file for complete search history.

(56) References Cited

U.S. PATENT DOCUMENTS

| 3,718,040 A | 2/1973 | Freeman et al. |
|---|---|---|
| 3,854,417 A | 12/1974 | MacDonnell et al. |

(Continued)

FOREIGN PATENT DOCUMENTS

| BR | PI0709492 | 7/2011 |
|---|---|---|
| BR | PI0709515 | 7/2011 |

(Continued)

OTHER PUBLICATIONS

Printout of web pages found at http://lat-Ion.com/ Available on the Internet at least as early as Sep. 23, 2013.
(Continued)

*Primary Examiner* — Jason C Smith
(74) *Attorney, Agent, or Firm* — Fox Rothschild LLP; Carol E. Thorstad-Forsyth

(57) ABSTRACT

System and methods for detecting an operational status of a valve or passageway on a railway asset. The methods may comprise: resiliently biasing a magnet in a direction away from a wireless sensor node coupled to the passageway; determining that the passageway is in an open position when the wireless sensor node is neutrally polarized (the data collection device being neutrally polarized when the magnet is distant therefrom); causing the magnet to move in a direction towards the wireless sensor node responsive to a cover of the passageway being closed; and determining that the passageway is in a closed position when the wireless sensor node is magnetically polarized (the wireless sensor node being magnetically polarized when the magnet is proximate thereto).

23 Claims, 36 Drawing Sheets

Related U.S. Application Data

(60) Provisional application No. 63/108,717, filed on Nov. 2, 2020, provisional application No. 62/621,212, filed on Jan. 24, 2018.

(51) Int. Cl.
*F16K 37/00* (2006.01)
*G01D 5/12* (2006.01)

(56) References Cited

U.S. PATENT DOCUMENTS

| | | |
|---|---|---|
| 3,859,619 A | 1/1975 | Ishihara et al. |
| 3,896,280 A | 7/1975 | Blake |
| 4,042,813 A | 8/1977 | Johnson |
| 4,134,464 A | 1/1979 | Johnson et al. |
| 4,296,707 A | 10/1981 | Kennedy |
| 4,368,927 A | 1/1983 | Billingsley et al. |
| 4,487,060 A | 12/1984 | Pomeroy |
| 4,503,705 A | 3/1985 | Polchaninoff |
| 4,801,288 A | 1/1989 | Schmitt et al. |
| 4,812,826 A | 3/1989 | Kaufman et al. |
| 4,859,000 A | 8/1989 | Deno et al. |
| 4,905,795 A | 3/1990 | Rains |
| 4,934,877 A | 6/1990 | Haverick et al. |
| 4,946,229 A | 8/1990 | Deno et al. |
| 4,977,577 A | 12/1990 | Arthur et al. |
| 5,038,605 A | 8/1991 | Tews et al. |
| 5,140,849 A | 8/1992 | Fujita et al. |
| 5,347,871 A | 9/1994 | D'Andrea et al. |
| 5,372,435 A | 12/1994 | Genero et al. |
| 5,381,090 A | 1/1995 | Adler et al. |
| 5,381,692 A | 1/1995 | Winslow et al. |
| 5,394,137 A | 2/1995 | Orschek |
| 5,410,911 A | 5/1995 | Severinsson |
| 5,440,184 A | 8/1995 | Samy et al. |
| 5,446,451 A | 8/1995 | Grosskopf, Jr. |
| 5,503,030 A | 4/1996 | Bankestrom |
| 5,603,556 A | 2/1997 | Klink |
| 5,633,628 A | 5/1997 | Denny et al. |
| 5,642,944 A | 7/1997 | Dublin, Jr. et al. |
| 5,682,139 A | 10/1997 | Pradeep et al. |
| 5,691,980 A | 11/1997 | Welles et al. |
| 5,701,974 A | 12/1997 | Kanjo et al. |
| 5,810,485 A | 9/1998 | Dublin, Jr. et al. |
| 5,986,547 A | 11/1999 | Korver et al. |
| 6,006,868 A | 12/1999 | Klink |
| 6,014,600 A | 1/2000 | Ferri et al. |
| 6,127,672 A | 10/2000 | Danisch |
| 6,161,962 A | 12/2000 | French et al. |
| 6,170,619 B1 | 1/2001 | Sheriff et al. |
| 6,175,784 B1 | 1/2001 | Jicha et al. |
| 6,179,471 B1 | 1/2001 | Moretti et al. |
| 6,184,798 B1 | 2/2001 | Egri |
| 6,195,600 B1 | 2/2001 | Kettle, Jr. |
| 6,237,722 B1 | 5/2001 | Hammond et al. |
| 6,263,265 B1 | 7/2001 | Fera |
| 6,301,531 B1 | 10/2001 | Pierro et al. |
| 6,324,899 B1 | 12/2001 | Discenzo |
| 6,339,397 B1 | 1/2002 | Baker |
| 6,397,978 B1 | 6/2002 | Jackson et al. |
| 6,441,324 B1 | 8/2002 | Stimpson |
| 6,474,450 B1 | 11/2002 | Ring et al. |
| 6,474,451 B1 | 11/2002 | O'Brien, Jr. |
| 6,487,478 B1 | 11/2002 | Azzaro et al. |
| 6,535,135 B1 | 3/2003 | French et al. |
| 6,668,216 B2 | 12/2003 | Mays |
| 6,695,483 B2 | 2/2004 | Sakatani et al. |
| 6,739,675 B1 | 5/2004 | Scharpf et al. |
| 6,823,242 B1 | 11/2004 | Ralph |
| 6,882,851 B2 | 4/2005 | Sugar et al. |
| 6,945,098 B2 | 9/2005 | Olson |
| 6,948,856 B2 | 9/2005 | Takizawa et al. |
| 6,957,801 B2 * | 10/2005 | Wilfert ............... F16K 31/046 |
| | | 137/554 |
| 7,014,368 B2 | 3/2006 | Morita et al. |
| 7,018,106 B2 | 3/2006 | Okada |
| 7,034,660 B2 | 4/2006 | Watters et al. |
| 7,114,596 B2 | 10/2006 | Borugian |
| 7,180,019 B1 | 2/2007 | Chiou et al. |
| RE40,099 E | 2/2008 | Stephens et al. |
| 7,336,156 B2 | 2/2008 | Arita et al. |
| 7,538,672 B2 | 5/2009 | Lockyer et al. |
| 7,657,349 B2 | 2/2010 | Hawthorne |
| 7,688,218 B2 | 3/2010 | LeFebvre et al. |
| 7,698,962 B2 | 4/2010 | LeFebvre et al. |
| 7,705,743 B2 | 4/2010 | Barone et al. |
| 8,033,236 B2 | 10/2011 | Michel et al. |
| 8,060,264 B2 | 11/2011 | Oestermeyer et al. |
| 8,212,685 B2 | 7/2012 | LeFebvre et al. |
| 8,244,411 B2 | 8/2012 | Baker |
| 8,370,006 B2 | 2/2013 | Kumar et al. |
| 8,560,151 B2 | 10/2013 | Armitage et al. |
| 8,672,273 B2 | 3/2014 | Brown et al. |
| 8,751,290 B2 | 6/2014 | Schullian et al. |
| 8,763,637 B2 | 7/2014 | Soldo et al. |
| 8,820,685 B2 | 9/2014 | Michaut |
| 8,823,537 B2 | 9/2014 | LeFebvre et al. |
| 8,967,196 B2 * | 3/2015 | Ha ..................... F16K 37/0041 |
| | | 137/554 |
| 9,026,281 B2 | 5/2015 | Murphy et al. |
| 9,365,223 B2 | 6/2016 | Martin et al. |
| 9,562,623 B2 * | 2/2017 | Clark .................. F16K 37/0041 |
| 9,574,680 B2 * | 2/2017 | Burlage ..................... F16K 17/20 |
| 9,592,815 B2 * | 3/2017 | Wright ................... B60T 13/665 |
| 9,663,092 B2 * | 5/2017 | Martin ..................... B60T 17/228 |
| 9,663,124 B2 | 5/2017 | LeFebvre et al. |
| 9,744,980 B2 | 8/2017 | Henry et al. |
| 9,981,673 B2 * | 5/2018 | Martin ................ B61L 15/0081 |
| 10,137,915 B2 * | 11/2018 | LeFebvre .............. B61L 25/021 |
| 10,253,900 B2 * | 4/2019 | Jefford .................... F16K 31/082 |
| 10,267,433 B2 | 4/2019 | Brown et al. |
| 10,343,700 B2 * | 7/2019 | Brundisch ........... B61L 15/0094 |
| 10,449,975 B2 | 10/2019 | Huck et al. |
| 10,539,241 B2 | 1/2020 | Jackson et al. |
| 10,710,619 B2 * | 7/2020 | LeFebvre ................. B61L 17/00 |
| 10,732,012 B2 * | 8/2020 | Wimmer ................. G01D 21/00 |
| 11,014,583 B2 | 5/2021 | Reitz |
| 11,070,624 B2 * | 7/2021 | Yuan ..................... H04L 67/125 |
| 11,473,993 B2 * | 10/2022 | Gibson ............... F16L 55/1108 |
| 11,542,690 B2 * | 1/2023 | Gibson ............... F16L 55/1155 |
| 2002/0017439 A1 | 2/2002 | Hill et al. |
| 2002/0049520 A1 | 4/2002 | Mays |
| 2002/0111726 A1 | 8/2002 | Dougherty et al. |
| 2003/0058091 A1 | 3/2003 | Petersen et al. |
| 2003/0097885 A1 | 5/2003 | Kell |
| 2003/0116742 A1 * | 6/2003 | Anderson ............. F16K 31/508 |
| | | 251/326 |
| 2003/0146821 A1 | 8/2003 | Brandt |
| 2003/0182030 A1 | 9/2003 | Kraeling et al. |
| 2004/0117076 A1 | 6/2004 | Horst |
| 2004/0126043 A1 | 7/2004 | Ito |
| 2004/0201464 A1 | 10/2004 | Donishi |
| 2004/0251058 A1 | 12/2004 | Carr et al. |
| 2005/0028596 A1 | 2/2005 | Gall |
| 2005/0194497 A1 | 9/2005 | Matzan |
| 2005/0259598 A1 | 11/2005 | Griffin et al. |
| 2005/0259619 A1 | 11/2005 | Boettle et al. |
| 2005/0268813 A1 | 12/2005 | Van Auken |
| 2006/0018141 A1 | 1/2006 | Chai et al. |
| 2006/0042734 A1 | 3/2006 | Turner et al. |
| 2006/0080048 A1 | 4/2006 | Kessler et al. |
| 2006/0154398 A1 | 7/2006 | Qing et al. |
| 2006/0158181 A1 | 7/2006 | Shoji |
| 2006/0181413 A1 * | 8/2006 | Mostov .................... G08B 25/08 |
| | | 340/539.22 |
| 2006/0207336 A1 | 9/2006 | Miyazaki |
| 2006/0243068 A1 | 11/2006 | Ueno et al. |
| 2006/0264221 A1 | 11/2006 | Koike et al. |
| 2007/0005200 A1 | 1/2007 | Wills et al. |
| 2007/0018083 A1 | 1/2007 | Kumar et al. |
| 2007/0062765 A1 | 3/2007 | Michel et al. |
| 2007/0084676 A1 | 4/2007 | Vithani et al. |
| 2007/0095160 A1 | 5/2007 | Georgeson et al. |
| 2007/0096904 A1 | 5/2007 | Lockyer et al. |

(56) References Cited

U.S. PATENT DOCUMENTS

| | | |
|---|---|---|
| 2007/0076107 A1 | 7/2007 | LeFebvre et al. |
| 2007/0151812 A1 | 7/2007 | Michel et al. |
| 2007/0152107 A1 | 7/2007 | LeFebvre et al. |
| 2007/0156307 A1 | 7/2007 | Muinonen et al. |
| 2007/0186642 A1 | 8/2007 | Sano et al. |
| 2007/0208841 A1 | 9/2007 | Barone |
| 2007/0241610 A1 | 10/2007 | Smith |
| 2007/0255509 A1 | 11/2007 | LeFebvre et al. |
| 2008/0064941 A1 | 3/2008 | Funderburk et al. |
| 2008/0073606 A1* | 3/2008 | Liantonio ............. F16K 31/086 251/65 |
| 2008/0097659 A1 | 4/2008 | Hawthorne |
| 2008/0179269 A1 | 7/2008 | Bachman |
| 2008/0195265 A1 | 8/2008 | Searle et al. |
| 2008/0252515 A1 | 10/2008 | Oestermeyer et al. |
| 2009/0001226 A1 | 1/2009 | Haygood |
| 2009/0001540 A1 | 1/2009 | Yang et al. |
| 2009/0010264 A1 | 1/2009 | Zhang |
| 2009/0015400 A1* | 1/2009 | Breed ...................... G07C 9/28 340/539.22 |
| 2009/0102649 A1* | 4/2009 | Diener ................... G08B 13/08 340/542 |
| 2009/0173840 A1 | 7/2009 | Brown et al. |
| 2009/0299550 A1 | 12/2009 | Baker |
| 2010/0032529 A1 | 2/2010 | Kiss et al. |
| 2010/0168941 A1 | 7/2010 | Geiger et al. |
| 2010/0200307 A1 | 8/2010 | Toms |
| 2010/0302974 A1 | 12/2010 | Niiyama et al. |
| 2011/0203685 A1* | 8/2011 | Lin ................... F16K 31/52408 137/553 |
| 2011/0219981 A1 | 9/2011 | Brandt |
| 2011/0270475 A1 | 11/2011 | Brand et al. |
| 2011/0282540 A1 | 11/2011 | Armitage et al. |
| 2012/0037435 A1 | 2/2012 | Duehring |
| 2012/0046811 A1 | 2/2012 | Murphy et al. |
| 2012/0051643 A1 | 3/2012 | Ha et al. |
| 2012/0072266 A1 | 3/2012 | Schullian et al. |
| 2012/0166109 A1 | 6/2012 | Kernwein et al. |
| 2012/0303237 A1 | 11/2012 | Kumar et al. |
| 2013/0006451 A1 | 1/2013 | Cooper et al. |
| 2013/0116865 A1 | 5/2013 | Cooper et al. |
| 2013/0270396 A1 | 10/2013 | Agostini |
| 2013/0314239 A1* | 11/2013 | Clark ........................ E03B 7/08 340/686.1 |
| 2013/0342362 A1 | 12/2013 | Martin |
| 2014/0060979 A1 | 3/2014 | Martin et al. |
| 2014/0089243 A1 | 3/2014 | Oppenheimer |
| 2014/0111356 A1 | 4/2014 | LeFebvre et al. |
| 2014/0244080 A1 | 8/2014 | Herden et al. |
| 2014/0372498 A1 | 12/2014 | Mian et al. |
| 2014/0375497 A1 | 12/2014 | Friend et al. |
| 2015/0060608 A1 | 3/2015 | Carlson et al. |
| 2015/0083869 A1 | 3/2015 | Lefebvre et al. |
| 2015/0148984 A1 | 5/2015 | Padulosi et al. |
| 2016/0027222 A1 | 1/2016 | Kurihara |
| 2016/0031849 A1 | 2/2016 | Yang et al. |
| 2016/0032576 A1 | 2/2016 | Leffler et al. |
| 2016/0272228 A1* | 9/2016 | LeFebvre ................. H04L 67/12 |
| 2016/0280195 A1 | 9/2016 | Kull et al. |
| 2016/0318497 A1* | 11/2016 | Wright .................. B60T 17/228 |
| 2016/0325767 A1* | 11/2016 | LeFebvre ................ B61L 27/40 |
| 2017/0021847 A1 | 1/2017 | LeFebvre et al. |
| 2017/0210401 A1 | 7/2017 | Mian |
| 2018/0224306 A1* | 8/2018 | Wimmer ................ G01D 21/00 |
| 2019/0225248 A1* | 7/2019 | Lidgett .................... B61D 7/26 |
| 2020/0007934 A1 | 1/2020 | Ortiz et al. |
| 2020/0079343 A1* | 3/2020 | Martin .................. B60T 17/221 |
| 2021/0053548 A1 | 2/2021 | Michel et al. |
| 2022/0041194 A1* | 2/2022 | Lidgett .................. B61L 27/57 |
| 2022/0135093 A1* | 5/2022 | Lidgett ................. B61L 25/025 246/127 |
| 2023/0023113 A1* | 1/2023 | Ornot ...................... F16K 15/18 |
| 2023/0137680 A1* | 5/2023 | Davis ..................... F16K 31/08 251/65 |

FOREIGN PATENT DOCUMENTS

| | | |
|---|---|---|
| BR | 102013022303 | 8/2015 |
| CN | 1429726 A | 7/2003 |
| CN | 102238233 B | 11/2011 |
| EP | 1548419 A1 | 6/2005 |
| EP | 2650191 A1 | 10/2013 |
| GB | 2295207 A | 5/1996 |
| JP | 863236937 A | 10/1988 |
| JP | 05213195 A | 8/1993 |
| JP | 05343294 | 12/1993 |
| JP | 08015099 | 1/1996 |
| JP | 10217968 | 8/1998 |
| JP | 11192948 | 7/1999 |
| JP | 2004294419 A | 10/2004 |
| JP | 2009210301 A | 9/2009 |
| WO | 01/015001 A2 | 1/2001 |
| WO | 2005105536 A1 | 10/2005 |
| WO | 2007076107 A2 | 7/2007 |
| WO | WO-2012088666 A1 * | 7/2012 ......... F16K 31/1221 |
| WO | 2015/081278 A1 | 6/2015 |
| WO | 2015/100425 A1 | 7/2015 |
| WO | 2016/191711 A1 | 12/2016 |

OTHER PUBLICATIONS

Printout of web pages found at http://www.skybitz.com/ Available on the Internet at least as early as Sep. 23, 2013.

Printout of web pages found at http://www.transcore.com/ Available on the Internet at least as early as Sep. 23, 2013.

International Search Report and Written Opinion mailed Oct. 1, 2019 issued in International Application No. PCT/US2019/014997.

European Search Report issued in European Patent Application No. 1957308 dated Sep. 8, 2021.

Topolev, V.P.; Automation of Strain-gauge Crane Scales; Feb. 1966; Translated from Izmeritel'naya Tekhnika, No. 2, pp. 81-82.

Balkov, P.P. et al.; Electrical Strain-gauge Scales; Oct. 1961; Translated from Izmeritel'naya Tekhnika, No. 10, pp. 17-20.

MSI-9300 Series User Guide, Rev Jul. 1, 27, 2002 for SW Ver 1-1.

Dillon EDxtreme Dynamometer and Crane Scale User's Manual, Dec. 2008 EDX.sub.-U.P65 PN 29808-0011 Issue AC.

Information Disclosure Statement for Salco Technologies, LLC Handbrake Sensor—Brochure dated Mar. 30, 2007.

Printout of web pages found at http://www.id-systems.com/ Available on the Internet at least as early as Sep. 23, 2013.

Printout of web pages found at http://www.microstrain.com/wireless/sensors Available on the Internet at least as early as Sep. 23, 2013.

International Search Report in related WO Application No. PCT/IB2013/03267, dated Apr. 23, 2015.

International Search Report and Written Opinion mailed Nov. 29, 2019 issued in International Application No. PCT/US2019/041734.

Extended European Search Report mailed Sep. 23, 2021 issued in International Application No. PCT/US2019014997.

U.S. Appl. No. 63/108,717, filed Nov. 2, 2020.

U.S. Appl. No. 16/256,772, filed Jan. 24, 2019.

U.S. Appl. No. 62/621,212, filed Jan. 24, 2018.

International Search Report and Written Opinion mailed Feb. 24, 2022 in International Application No. PCT/US2021/056508.

Extended European Search Report issued in European Patent Application No. 19833138.1 filed on Jan. 22, 2021.

* cited by examiner

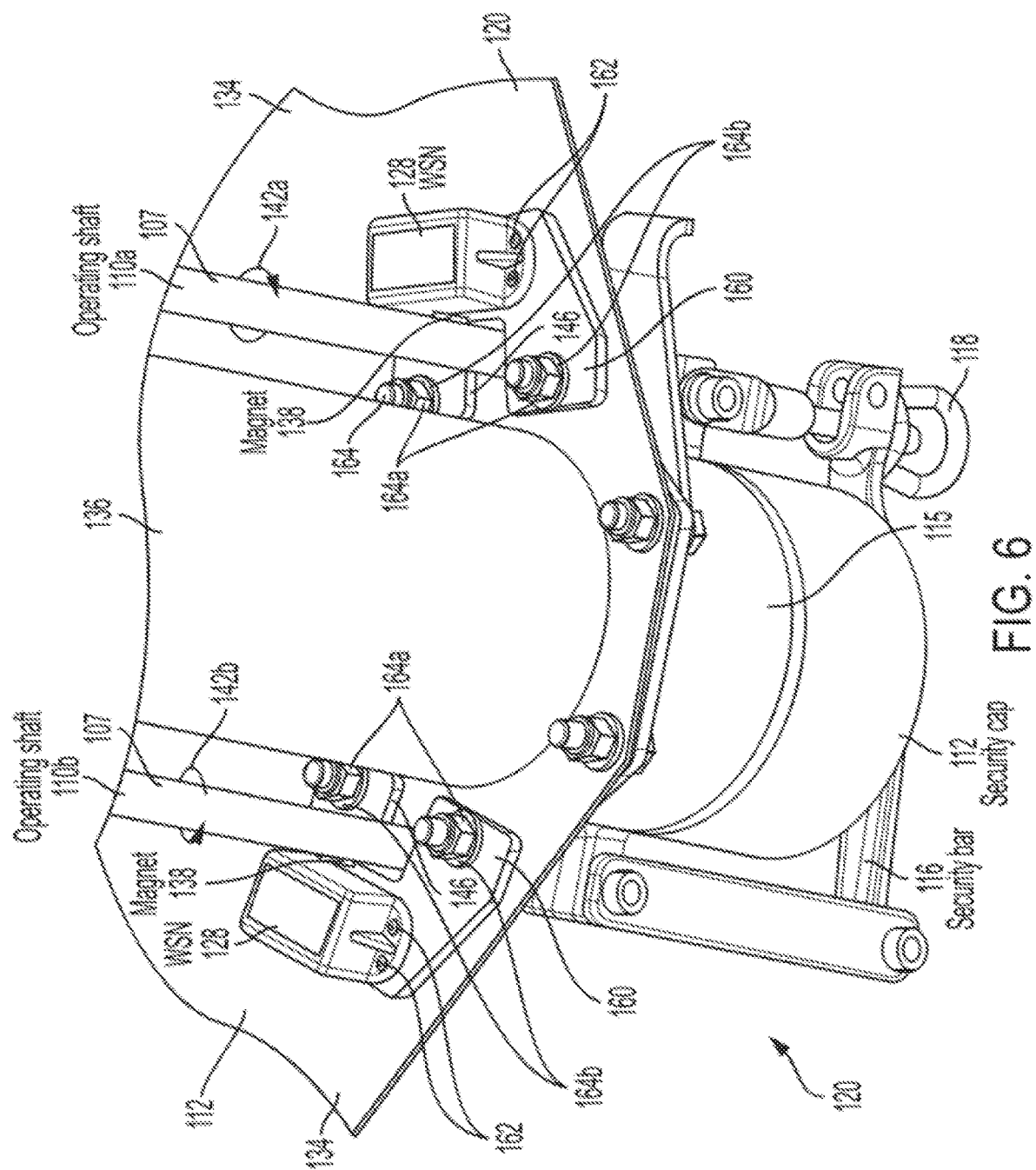

| | Operational Status 1 | Operational Status 2 | Operational Status 3 | Operational Status 4 | Operational Status 5 | Operational Status 6 | Operational Status 7 | Operational Status 8 |
|---|---|---|---|---|---|---|---|---|
| Discharge Gate – Close (default) | x | | x | x | | | | |
| Discharge Gate – Open | ⇑ | ⇑ | ⇑ | ⇑ | ⇓ | ⇓ | ⇓ | ⇓ |
| | | | | | x | x | x | x |
| Motion – Stationary (default) | | | | | | | | |
| Motion – Moving | x | x | x | x | | x | x | |
| Geofence – Outside (default) | | | | | | | | |
| Geofence – Inside | x | x | x | x | x | x | x | x |
| Event / Alarm / Alert type | Alarm - End security event, also possible undefined geofence for unloading or sampling event | Non- Typical Event - Unsecured gate chatter. | Typical Event - End unloading in unloading, maintenance, railcar wash or Generic geofence event | Non- Typical Event - Unsecured gate chatter event. | Alarm - Security alert, also possible undefined geofence for unloading or sampling event | Alarm - Security alert / unsecured gate | *Typical Event - Begin unloading event or product sampling, or maintenance, railcar wash, or generic event (these 6 events are defined by geofence type where the event takes place) | Non - Typical Event - Unsecured gate chatter event |

*- The Alert type is a Product Sampling event, if a Status 7 event lasts within a predetermined period of time and then goes to a Status 3 event, and the geofence type is a Customer (unloading) type.

FIG. 8

| | | Operational Status 9 | Operational Status 10 | Operational Status 11 | Operational Status 12 | Operational Status 13 | Operational Status 14 | Operational Status 15 | Operational Status 16 |
|---|---|---|---|---|---|---|---|---|---|
| Discharge Gate | Close (default) | x | x | x | x | | | | |
| | Open | | | | | | | x | x |
| Motion | Stationary (default) | x | | ⇐ | | ⇐ x | | ⇐ x | |
| | Moving | | ⇒ x | | ⇒ x | | ⇒ x | | ⇒ x |
| Geofence | Outside (default) | x | x | | | | | | |
| | Inside | | | x | x | x | x | x | x |
| Event Type/ Alert Type | | Status Change - Stopping event | Status Change - Moving event | Status Change - Stopping event in geofence (plant) | Status Change - Moving event in geofence (plant) | Status Change - Still in Alarm condition - Stopping event | Status Change - Still in Alarm condition - Moving event | Status Change - Still in Alarm condition - change in movement status after unloading event, sample event, or wash, or maintenance, or generic event. Also non-type24- Stopping event in geofence (plant) | Alarm - Raised movement status change after unloading event, sample event, or wash, or maintenance, or generic event. |

FIG. 9

| | Operational Status 17 | Operational Status 18 | Operational Status 19 | Operational Status 20 | Operational Status 21 | Operational Status 22 | Operational Status 23 | Operational Status 24 |
|---|---|---|---|---|---|---|---|---|
| Discharge Gate | | | | | | | | |
| Closed (default) | x | | | | | | | |
| Open | | x | x | x | x | x | x | x |
| Motion | | | | | | | | |
| Stationary (default) | x | x | | | x | x | | |
| Moving | | | x | x | | | x | x |
| Geofence | | | | | | | | |
| Outside (default) | x | x | x | x | | | | |
| Inside | | | | | x | x | x | x |
| Status change direction | ⇐ | ⇐ | ⇒ | ⇒ | ⇐ | ⇐ | ⇒ | ⇒ |
| Event / Alarm / Alert type | Not logically possible. Conflicting event. | Typical Event - Geofence exit event. | Not logically possible. Conflicting event. | Typical Event - Geofence entry event. | Not logically possible. Conflicting event. | Alarm - Geofence exit with gate unsecured. Give alert. | Not logically possible. Conflicting event. | Status Change - Spill in Alarm condition - Geofence entry with gate unsecured. |

FIG. 10

SENSING METHOD, SYSTEM AND ASSEMBLY FOR RAILWAY ASSETS

REFERENCE TO RELATED APPLICATIONS

This application (i) claims the benefit of Provisional Patent Application No. 63/108,717 which was filed on Nov. 2, 2020 and (ii) is a Continuation-In-Part of U.S. patent application Ser. No. 16/256,772 which was filed on Jan. 24, 2019 and claims the benefit of U.S. Provisional Patent Application Ser. No. 62/621,212 which was filed on Jan. 24, 2018. The contents of these applications are incorporated herein by reference in their entireties.

BACKGROUND

Statement of Technical Field

The present document relates to the field of railway asset operations and safety management. More particularly, the present document relates to implementing systems and methods for collecting and analyzing operational parameters related to railway asset components (e.g., valves, doors, and/or passageways (e.g., hatches and manways) to monitor the status thereof.

Description of the Related Art

In railcar transport systems, various data collection units are coupled to railcars. The data collection units are communicatively coupled to each other via the Internet, and therefore are collectively referred to as an Internet of Things (IoT). In railcar transport systems, various types of freight railcars (e.g., hopper cars) are used to carry loose bulk commodities by rail and (e.g., tank cars) are used to carry liquid commodities by rail. Such goods are loaded and contained within one or more railcar compartments (e.g., hopper cars) and then offloaded at the desired location through valves. These valves are often called discharge gates when on hopper cars, and outlet valves when on tank cars. Discharge gates can include one or more valves.

Valves are ideal for use with railcars that carry bulk materials that can be off-loaded through the same via gravity and/or pneumatic means. Examples of materials carried and off-loaded through valves include granular and particulate goods (e.g., plastic pellets used for molding, grains and sugar) and/or liquefied goods (e.g., crude oil and chemicals). The valves are typically located at the bottom of each compartment of the railcar. The valves are operated to be opened and closed. When opened, the material flows out by means of gravity and, in some cases, the valves may also be equipped with pneumatic means as known in the art to accommodate the off-loading.

Preventing theft and ensuring the integrity and cleanliness of the material within the railcar is important. Unauthorized access to the product is undesirable not only from a theft perspective, but also exposes the product remaining within the railcar to contamination and spoliation, rendering the material unsuitable for use. In some cases, the material within the railcar could be labeled hazardous material (HAZMAT) and such material would be hazardous to people and/or the environment if released from the railcar when the railcar is located outside of a HAZMAT-controlled environment.

Current prior art security methods include the use of security seals applied to the valves at the origin where the goods are loaded, and which are then removed when the railcar reaches its intended destination. The status of the seal upon arrival at the destination can indicate whether the valve has been opened during transit from its origin to destination.

Despite the use of seals, however, thieves have developed ways to disassemble sections of the valve assembly in ways allowing a portion of the contents within the railcar to be removed without altering the seal. The valve then is re-assembled to make it appear that nothing was removed with the seal remaining intact. Loss of product or lading resulting from unauthorized opening or accessing of a valve is a significant financial cost to both shippers and railroads.

Security seals and similar security means have other shortcomings. For example, seals cannot provide instantaneous warnings when a valve is opened in route, or continually monitor the status of the valve at any location in the rail network, including in an origin or destination rail yard.

SUMMARY

The present document concerns a valve assembly. The valve assembly comprises: a valve comprising an operative component configured to facilitate a change in a position of the valve between an open position and a closed position, and a plate configured to protect the valve from damage when contact is made with an external object; an actuator coupled to the operative component of the valve; and a data collection device coupled to the plate, aligned with the actuator, and configured to detect movement of the actuator as the valve is transitioned from the open position to the closed position.

The valve may also comprise a position indicator coupled to the operative component that is configured to indicate whether the valve is in the open position or the closed position. The actuator can be mounted on the position indicator without any modifications to a physical structure of the position indicator. For example, the actuator comprises a housing with a cavity formed therein in which a portion of the position indicator is disposed and adhesively secured. Alignment tab(s) can be provided with the actuator. The alignment tab(s) project(s) out from the housing of the actuator to facilitate alignment of the actuator and the position indicator during installation of the actuator on the position indicator. The alignment tab(s) is(are) removable from the actuator so that operation of the valve is unaffected by the alignment tab(s).

A gap is provided between the actuator and the data collection unit. Movement of the operative component of the valve causes a distance between the actuator and data collection unit to change. This distance increases when the valve is transitioned from the closed position to the open position, and decreases when the valve is transitioned from the open position to the closed position.

The data collection device may be coupled to the valve without any physical modifications to the plate. The data collection unit is configured to wirelessly communicate with a remote device when movement of the actuator is detected or a particular distance exists between the data collection unit and the actuator.

The actuator comprises a magnet and the data collection unit configured to detect changes in position of the magnet relative to the data collection unit. The data collection unit is in a magnetically neutral condition when the valve is in the open position and is in a magnetically polarized condition when the valve is in the closed position.

The present document also concerns implementing systems and methods for detecting an operational status of a passageway (e.g., a manway port) on a railway asset. The methods comprise: resiliently biasing a magnet in a direction away from a wireless sensor node coupled to the passageway; determining that the passageway is in an open position when the wireless sensor node is neutrally polarized (the data collection device being neutrally polarized when the magnet is distant therefrom); causing the magnet to move in a direction towards the wireless sensor node responsive to a cover of the passageway being closed; and determining that the passageway is in a closed position when the wireless sensor node is magnetically polarized (the wireless sensor node being magnetically polarized when the magnet is in proximity thereto).

The magnet is resiliently biased by a resilient member in a direction away from the wireless sensor node and towards the cover of the passageway. The magnet is caused to move in a direction towards the wireless sensor node by the cover's compression of the resilient member. The wireless sensor node may be coupled to the passageway without any modifications to a physical structure of the passageway (e.g., via an adhesive and at least one magnet).

The present document further concerns a passageway (e.g., a manway port). The passageway comprises: a nozzle; a cover coupled to the nozzle and transitionable between an open position and a closed position; and a data collection device assembly coupled to the nozzle, and comprising a wireless sensor node and a magnet movable relative to the wireless sensor node. The wireless sensor node detects that the cover is in the open position when the wireless sensor node is neutrally polarized as a result of the magnet being a first distance from the wireless sensor node, and detects that the cover is in the closed position when the wireless sensor is magnetically polarized as a result of the magnet being a second closer distance from the wireless sensor node.

The data collection device assembly also comprises a resilient member resiliently biasing the magnet in a direction away from the wireless sensor node and towards the cover of the passageway. The cover compresses the resilient member as the cover transitions from the open position to the closed position, whereby the magnet is caused to move in a direction towards the wireless sensor node. The data collection device assembly may further comprise a protective cover coupled to the passageway without any modifications to a physical structure of the nozzle (e.g., via magnet(s)).

BRIEF DESCRIPTION OF THE DRAWINGS

The present solution will be more fully and completely understood from a reading of the Detailed Description in conjunction with the drawings.

FIG. 6 provides a partial perspective view of the railcar discharge gate assembly shown in FIG. 1 having magnetic sensing WSNs of the type shown in FIG. 4 and magnets that work with the WSNs for sensing the status of the discharge gate.

FIG. 8 provides a chart showing criteria to determine an event/alarm/alert type after a change in the operational status. This particular chart shows the event/alarm/alert type determinations when a discharge gate status changes from open to closed or closed to open, while railcar motion and railcar location remain unchanged.

FIG. 9 provides a chart showing criteria to determine an event/alarm/alert type after a change in the operational status. This particular chart shows the event/alarm/alert type determinations when movement of a railcar changes from stationary to moving or moving to stationary, while railcar discharge gate status and railcar location remain unchanged.

FIG. 10 provides a chart showing criteria to determine an event/alarm/alert type after a change in the operational status. This particular chart shows the event/alarm/alert type determinations when a railcar moves from inside a geofence to outside a geofence or from outside a geofence to inside a geofence, while railcar discharge gate status and railcar motion remain unchanged.

DETAILED DESCRIPTION

Figure 1:
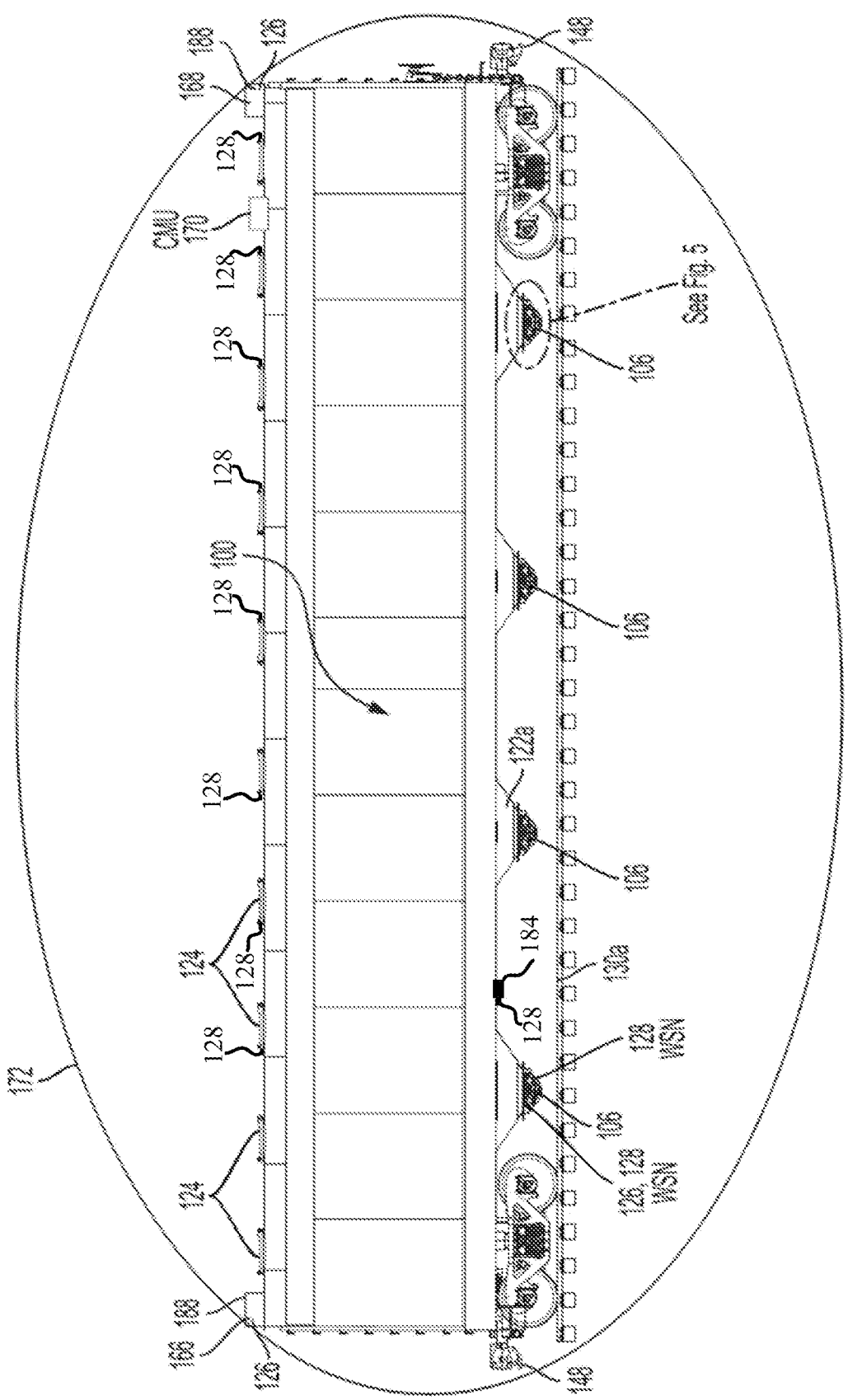
FIG. 1 provides a side elevational view of a railcar having multiple discharge gates, multiple Wireless Sensor Nodes (WSNs) positioned to monitor the discharge gates, a data collection unit (e.g., a Communication Management Unit (CMU)), and which illustrates a railcar based network for this railcar.

Improvements to current security methods are needed to monitor and report operational uses of the discharge gates of the railway assets at each stage of the supply chain cycle. Moreover, new methods for product chain of custody and billing terms may be possible if access to the product inside the railway asset can be monitored and confirmed. Railway assets may include, but are not limited to, railcars, containers, and an International Standards Organization (ISO) tanks. In this document, a railcar will be used for illustrative purposes. A railcar can include, but is not limited to, a hopper car or tank car.

The real time monitoring of various functions of railway assets (e.g., railcars), such as wheel bearing temperature, wheel-to-rail interactions, and other operational parameters of a railway asset has been previously contemplated. Examples of such systems are disclosed in U.S. Pat. No. 9,663,092 which issued on May 30, 2017, U.S. Pat. No. 10,137,915 which issued on Nov. 27, 2018, U.S. Patent Publication No. 2016/0272228 which was published on Sep. 22, 2016 (now issued as U.S. Pat. No. 10,710,619), and U.S. Pat. No. 9,981,673 which issued May 29, 2018. Each of the listed patent applications is incorporated herein by reference in its entirety.

Presently, however, there is no reliable system for continually monitoring in real or near real time the status of discharge gates on railway assets. Accordingly, it is desirable to provide methods, systems and assemblies for the real-time, on-board monitoring of the discharge gates and other components, and for analyzing the readings in real time to timely detect anomalous security and operational conditions.

Methods, systems and assemblies are provided for monitoring parameters related to the valves (e.g., discharge gates and outlet valves) and other components on railway assets (e.g., railcars). The other components can include, but are not limited to, passageways (e.g., hatches and manways). The data obtained can be used for determining the status, history and other information related to the discharge gates, other components and the commodity carried within the railway asset (e.g., railcar). The parameters monitored include, but are not limited to, the status of the discharge gate (open or closed), the railway asset motion (moving or not), and the railway asset location (is the location a place where the discharge gate is expected to be open or closed).

The present solution is discussed below with reference to the figures appended hereto. A brief overview of a railcar and train consist used in describing the present solution is provided first, followed by a more detailed description of the various components, assemblies and systems that carry out the methods of the present solution, followed by a detailed description of the illustrative methods for installing and operating sensors on railcars.

In broad terms, the present solution provides data collection units (e.g., CMUs and WSNs) on the railcars to monitor and/or collect data on various parameters and conditions related to the valves and other components. These data collection units may be mounted on one or more railcars in a train consist. When there is a change in status of any of the parameters monitored, such as when a status of the valve or other component changes from a closed status to an open status, data collected can be analyzed to determine if an event has occurred, identify the event and issues related thereto, and provide real time information as to the status of the valve, the status of another component, and/or the status of goods contained within the railcar. This includes a determination of the events based on the time and date of the data collected. If a problem is detected, notifications of the events, including alerts and alarms, can be forwarded for further action.

With initial reference to FIG. 1, a railcar 100 is shown in the form of a hopper car having internal storage compartments for carrying goods such as loose granular or particulate commodities. As used herein, the term "railcar" includes single railcars as shown, as well as two or more railcars that are permanently connected, often referred to in the art as a "tandem pair", "three-pack", "five-pack", etc. The present solution is not limited to hopper cars. For example, the railcar 100 can additionally or alternatively comprise one or more tank cars as is known in the art.

Figure 2:
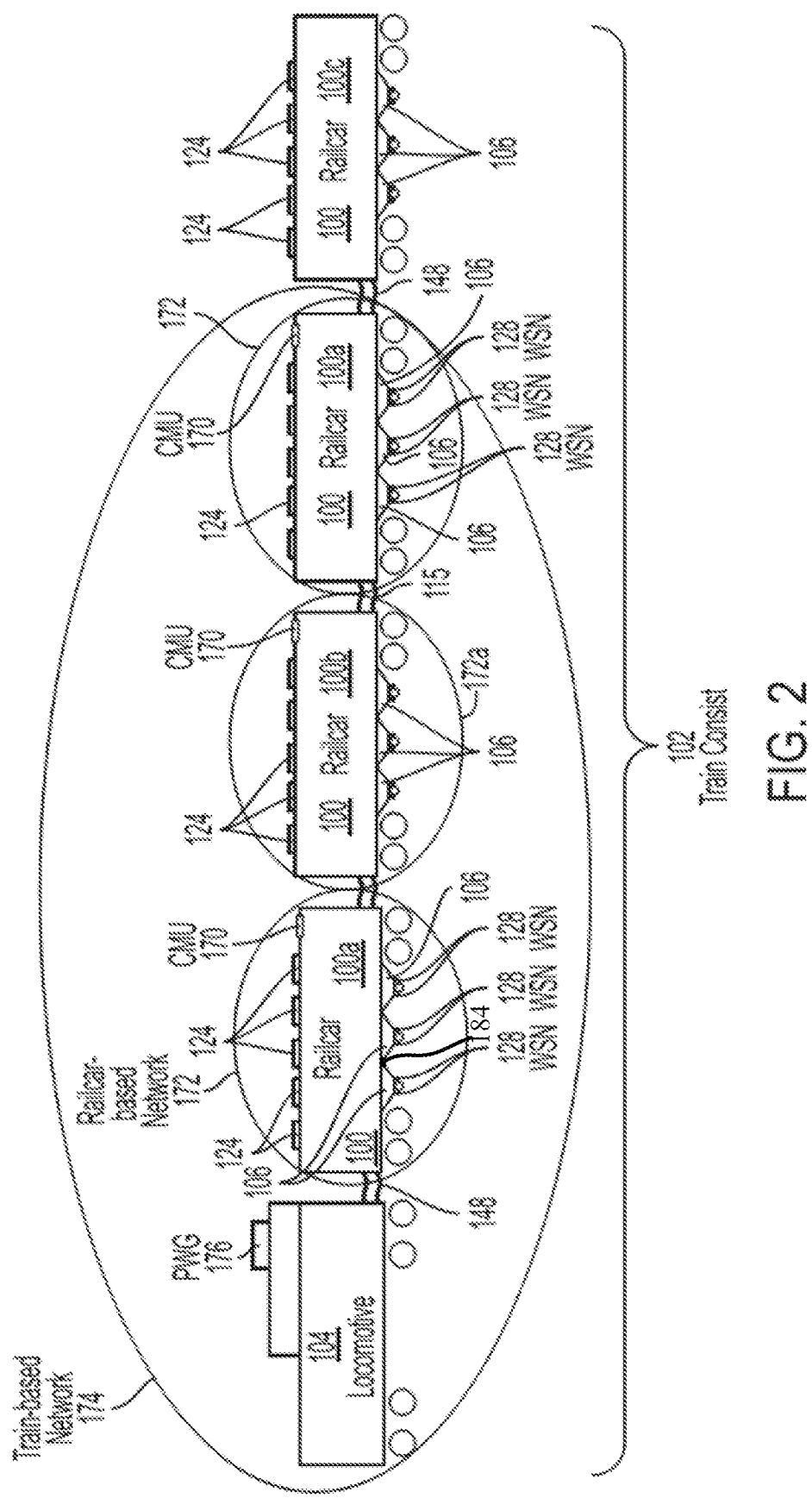
FIG. 2 provides a schematic diagram of a train consist where data collection units are installed (e.g., a Powered Wireless Gateway (PWG)), Wireless Sensor Node (WSN) and Communications Management Unit (CMU)), which includes a locomotive having a PWG, two railcars of the type shown in FIG. 1 (the second and fourth railcars from the right), a single railcar that does not include WSNs but includes a CMU (the third railcar from the right), and a single railcar that does not include WSNs or a CMU (the first railcar from the right), and which illustrates a train based network.

With further reference to FIG. 2, a train consist 102 includes a connected group of railcars 100 and at least one locomotive 104. The railcars 100 and locomotive 104 are coupled with rail couplers 148 as known in the art.

Returning to FIG. 1, the railcar 100 can have at least one discharge gate 106 and/or at least one outlet valve(s) 184 through which the commodity stored within the compartments of the railcar 100 is off loaded. In some scenarios, hoses are connected to the discharge gate(s) 106 and/or outlet valve(s) 184 to facilitate the off-loading of the commodity. In other scenarios, a container is slid under the railcar and the commodity is released into the container. Then, the commodity is pumped from the container into a truck. Notably, if the railcar 100 comprises a hopper car then the discharge gate(s) 106 would be preferred for off-loading commodity. In contrast, if the railcar 200 comprises a tank car, then the outlet valve 184 would be preferred to off load commodities. A discharge gate 106 and/or outlet valve 184 is(are) typically provided at the bottom of each storage compartment of the railcar 100. The illustrated railcar 100 has: four discharge gates 106 (one for each of the four compartments (not shown) of the railcar 100); and an outlet valve 184 for a given compartment. The present solution is not limited to the particulars of this architecture shown in FIG. 1. The railcar 100 can have any number of discharge gates and/or outlet valves in accordance with any given application.

Any suitable discharge gate can be used. An example of such a discharge gate, which is similar to the one shown in FIG. 1, is described in U.S. Pat. No. 4,934,877 which issued on Jun. 19, 1990 and which is incorporated by reference herein in its entirety. Each of the illustrated discharge gates 106, as described in U.S. Pat. No. 4,934,877, has two sets of operating levers 108a, 108b (see FIG. 5) and a discharge opening (or conduit) 115 (see FIG. 7B) on opposite sides of the railcar 100 to allow the commodity to be discharged from either side of the railcar. The illustrated discharge gate 106 has two internal rotatable valves (not shown), each one operated by one of the operating levers 108a, 108b (see FIG. 5) from either side of the railcar 100 to control the flow of the commodity from the discharge gate. The particular lever 108a, 108b is selected depending on which side of the railcar the commodity will be discharged.

Figure 5:
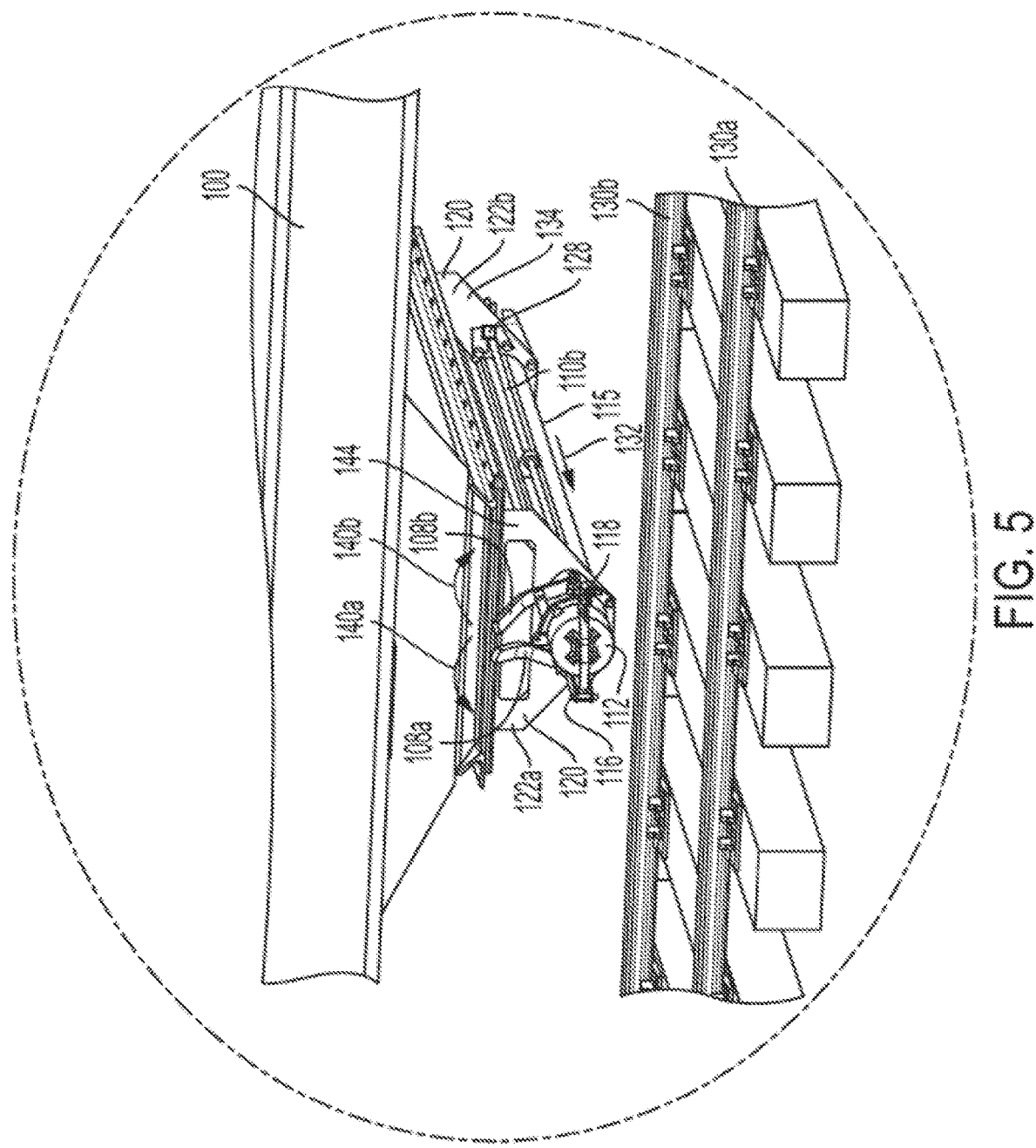
FIG. 5 provides an enlarged perspective view of the portion within the area identified in FIG. 1, showing the discharge gate.
Figure 7A:
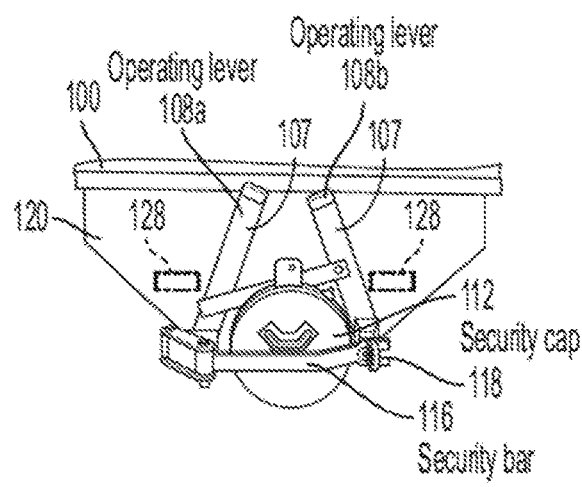
FIGS. 7A, 7B, 7C and 7D provide enlarged side elevational views of the discharge gate of FIG. 6 showing the operating levers that control the opening and closing of the discharge gate in different positions.
Figure 7B:
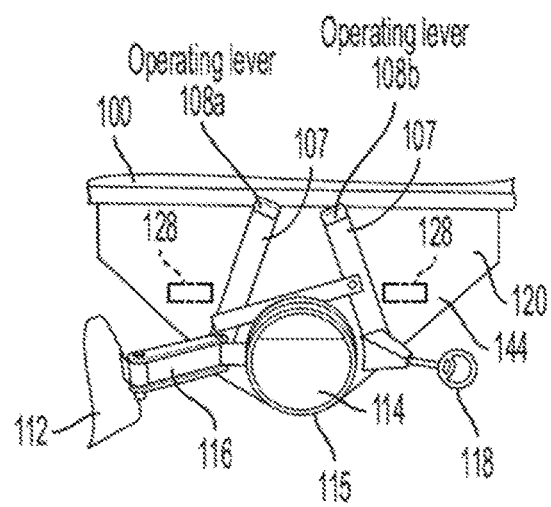

Each operating lever 108a, 108b of a discharge gate 106 is connected to and operates a respective shaft 110a, 110b (see FIG. 6), which in turn are attached to and operate one of the rotatable valves that release the commodity. When the position of both operating levers 108a, 108b are in the upward position as seen in FIGS. 6, 7A and 7B, the respective valves are closed, and thus the discharge gate 106 is closed and no commodity is discharged. When operating lever 108a is rotated to the left direction (counterclockwise) as seen in FIG. 5, the respective rotatable valve operated thereby moves to an open position. When operating lever 108b is rotated to the right direction (clockwise) as seen in FIG. 5, the respective rotatable valve operated thereby moves to an open position. The two operating levers 108a, 108b can be operated independent of one another. For example, with reference to FIG. 7C, the right-side operating lever 108b is in the valve open position while the left-side operating lever 108a is in the valve closed position. With reference to FIG. 7D, both operating levers 108a and 108b are in the valve open position. If any one of the levers 108a, 108b is in the open position, then the discharge gate 106 is in the open position or, put another way, if any one of the levers 108a, 108b is in the open position, the status of the discharge gate 106 is "open".

It is appreciated that the discharge gate 106, as well as other suitable discharge gates, include operable components 107 that move or are displaced as part of the operation to open and close the discharge gate. These operable components 107 include the operating levers 108a, 108b that are operable by a person to open and close the discharge gate 106, the operating shafts 110a, 110b that are operable by the levers 110a, 110b, the discharge gate valves that are operable by the operating shafts 110a, 110b, and any other such components that move or change when opening or closing the discharge gate 106. It is further appreciated that various measurable parameters of these operable components 107, such as their displacement and position, is indicative of whether the discharge gate is open or closed.

As seen in FIGS. 5 and 7A, the discharge gate 106 includes a security cap 112 that covers the discharge opening 114 of the discharge opening (or conduit) 115 (see FIG. 7B) of the discharge gate 106. A security bar 116 is attached to the front of the security cap 112 and locked in place with a releasable bolt device 118. The security bar 116 can be pivoted towards the left as seen in FIG. 7B to remove the security cap 112. With the security cap 112 removed, a hose (not shown) can be connected to the discharge opening (or conduit) 115 for discharging the commodity from the railcar through the opening 114 via operation of the levers 108a, 108b as is known in the art.

The discharge gate assembly 106 has support plates 120 on opposite ends 122a, 122b of the discharge gate 106, which are on opposite sides of the railcar 100, to support the discharge gate assembly 106 on the underside of the railcar 100 (FIG. 5). The support plates have an outer face 144 facing away from the railcar 100 and an opposite inner face 134 facing towards the railcar 100 (see the opposite end 122b in FIG. 5 and FIG. 6). A duplicate set of levers 108a, 108b connected to the operating shafts 110a, 110b, and a duplicate set of gate openings 114 are provided on each of the opposite ends 122a, 122b so that the discharge gate 106 can be operated from either side of the railcar 100 (although only the operating levers 108a, 108b on railcar side 122a and operating shaft 110b are shown in FIG. 5). Again, a detailed description of the discharge gate 106 described herein is provided in U.S. Pat. No. 4,934,877.

Figure 17:
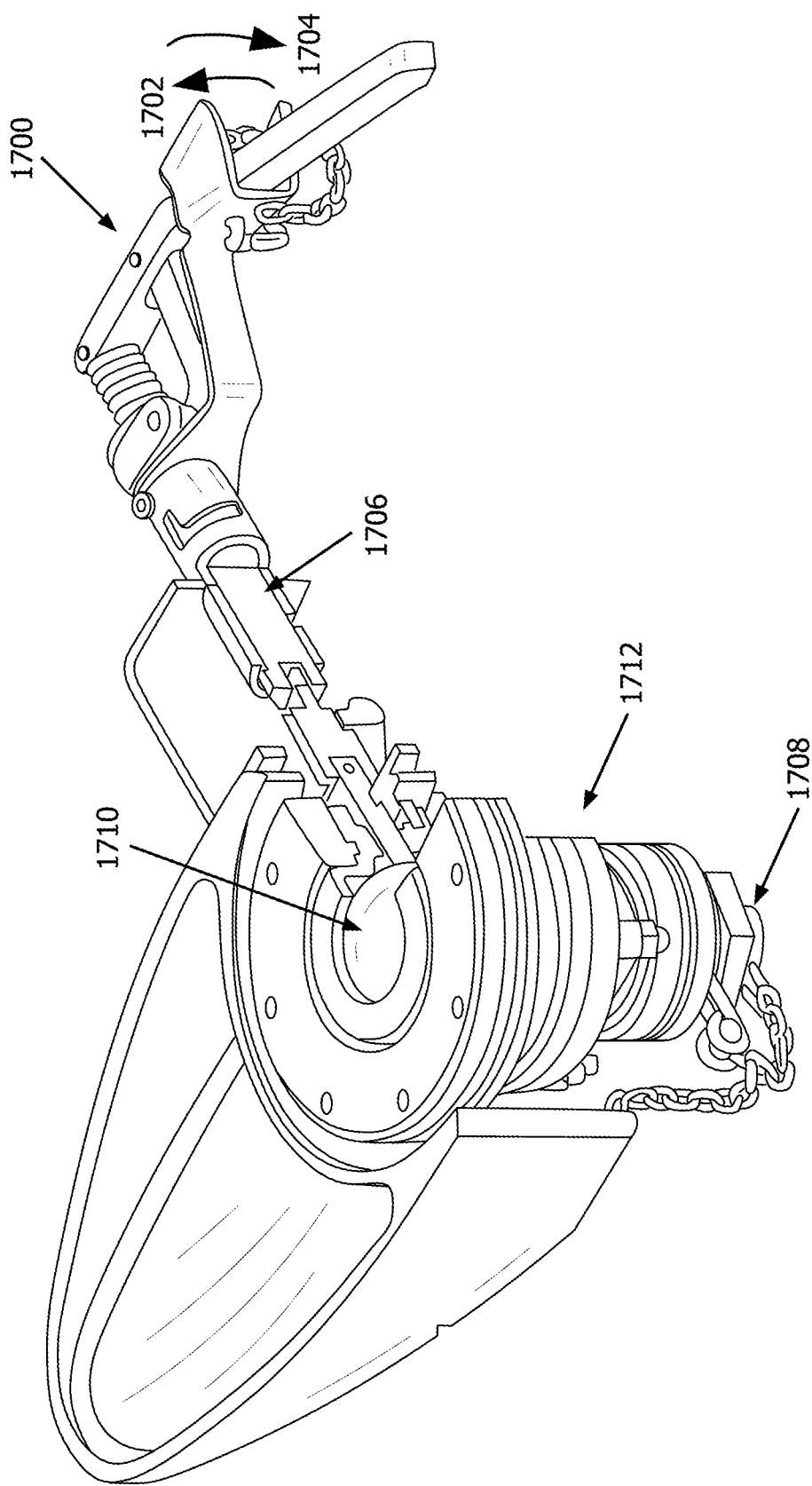
FIG. 17 provides an illustration of an illustrative outlet valve.

The outlet valve 184 can include any known or to be known outlet valve. An illustration of this outlet valve is provided in FIG. 17. As shown in FIG. 17, the outlet valve comprises a handle 1700 which can be rotated in two opposing directions shown by arrows 1702, 1704. Rotation of the handle 1700 causes rotation of a shaft 1706. The outlet valve is opened and closed via the rotation of handle 1700 and shaft 1706. A commodity can flow out of the rail car 100 when the outlet valve 184 is in its open position and a cap/plug 1708 has been removed therefrom such that an opening 1710 of a nozzle 1712 is no longer blocked thereby. Flow of the commodity from the rail car 100 can be interrupted or stopped via closure of the outlet valve 184.

As shown in FIGS. 1-2, at least one passageway 124 is provided on top of each railcar 100. The passageway 124 provides access to the storage compartments within the railcar 100, such as for loading the commodity into the railcar. The passageway 124 may comprise a hatch or a manway. An illustration of an illustrative manway 3400 is provided in FIG. 34.

Figure 34:
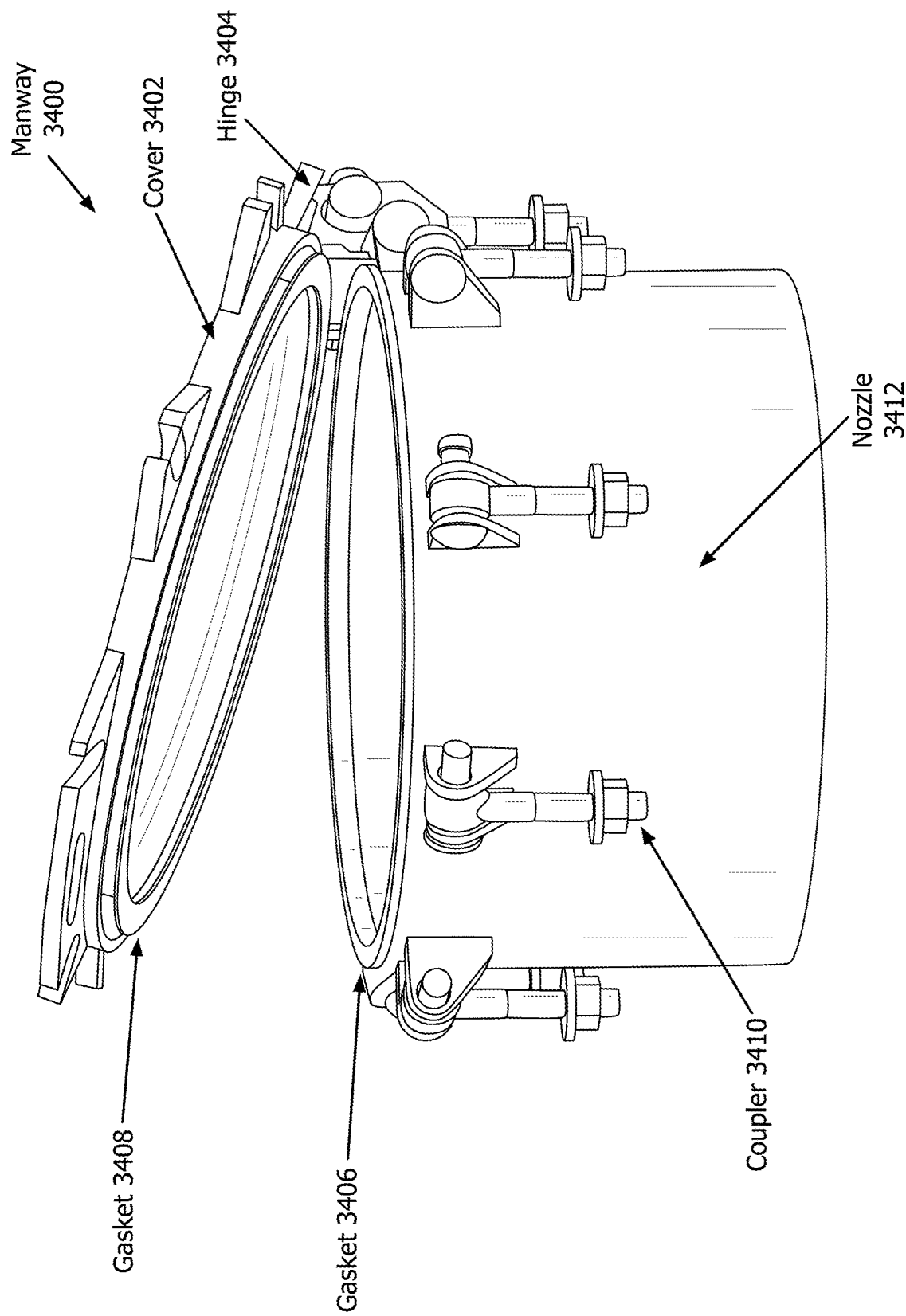
FIG. 34 provides an illustration of an illustrative manway port.

As shown in FIG. 34, the manway port 3400 comprises a cover 3402 and a nozzle 3412. Nozzle 3412 comprises a hollow tube that is sized and shaped to allow a person to pass therethrough. The cover 3402 is coupled to the nozzle 3412 via a hinge 3404. The hinged cover 3402 is transitionable between an open position and a closed position. In the open position, a person is able to travel through the nozzle 3412. In the closed position, the person is unable to enter the nozzle 3412 since the cover 3402 blocks access to the hollow tube. Gaskets 3406, 3408 are provided to create a seal when the cover 3402 is in a closed position. In the closed position, the cover 3402 prevents access to an interior of a railcar via the nozzle 3412. Couplers 3410 are provided to secure the manway port 3400 to a railcar.

Referring again to FIGS. 1-2, various sensor devices 126 are provided for collecting data about the railcars 100, valves (e.g., the discharge gates 106 and/or the outlet valves 184) and/or passageways 124 to carry out the methods of the present solution. As noted previously, the data to be collected includes, but is not limited to, a status of each valve 106, 184 (open or closed), a status of each passageway 124, data indicating whether the railcar 100 is or is not in motion, and the location of the railcar 100 (e.g., data indicating whether the railcar is within a geofence area where opening of a valve and/or passageway is expected). While particular sensor devices 126 are described below, any sensor devices can be used in accordance with a given application.

Figure 4:
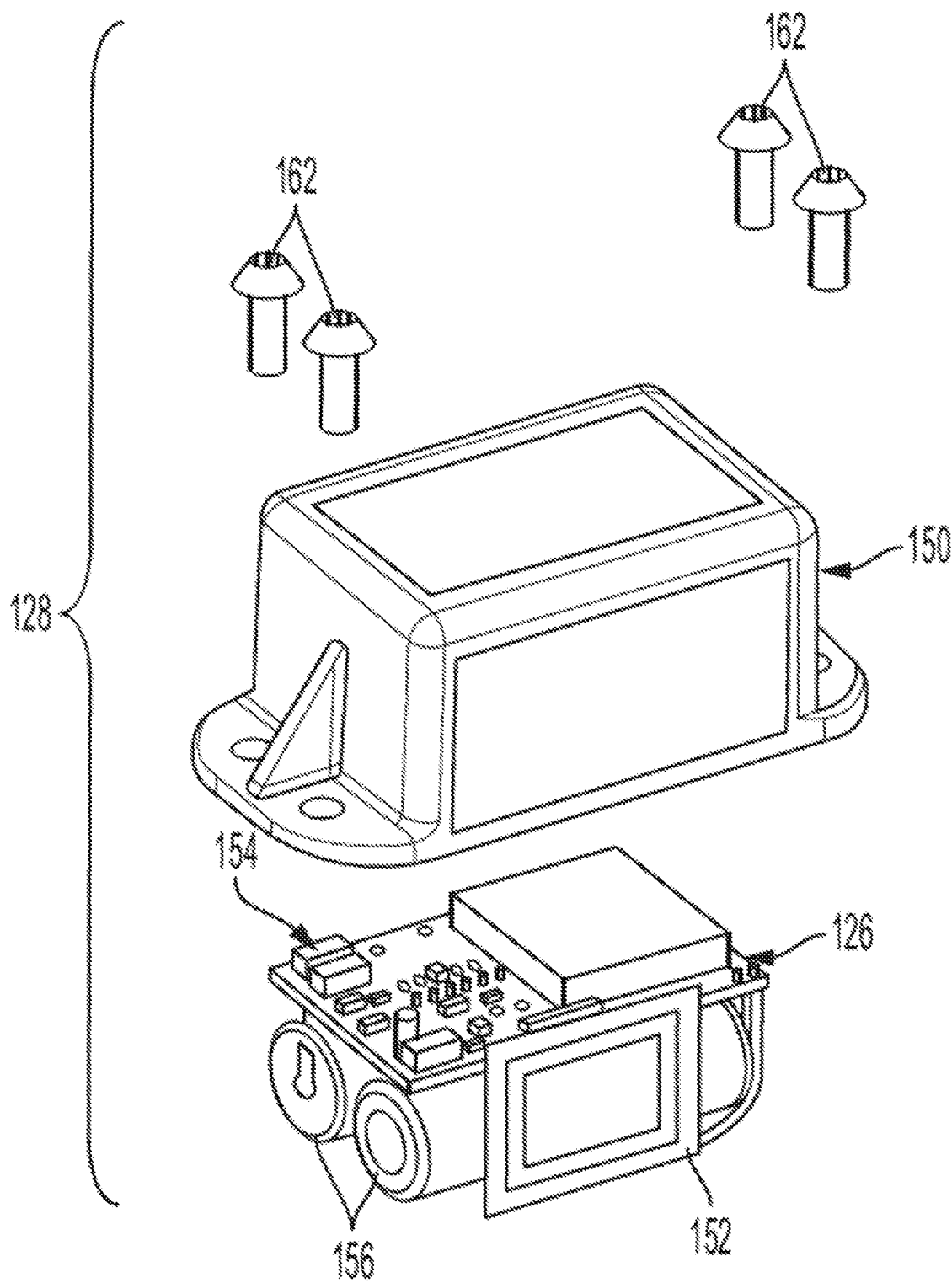
FIG. 4 provides an exploded view of a WSN for use sensing the status of a discharge gate.
Figure 4A:
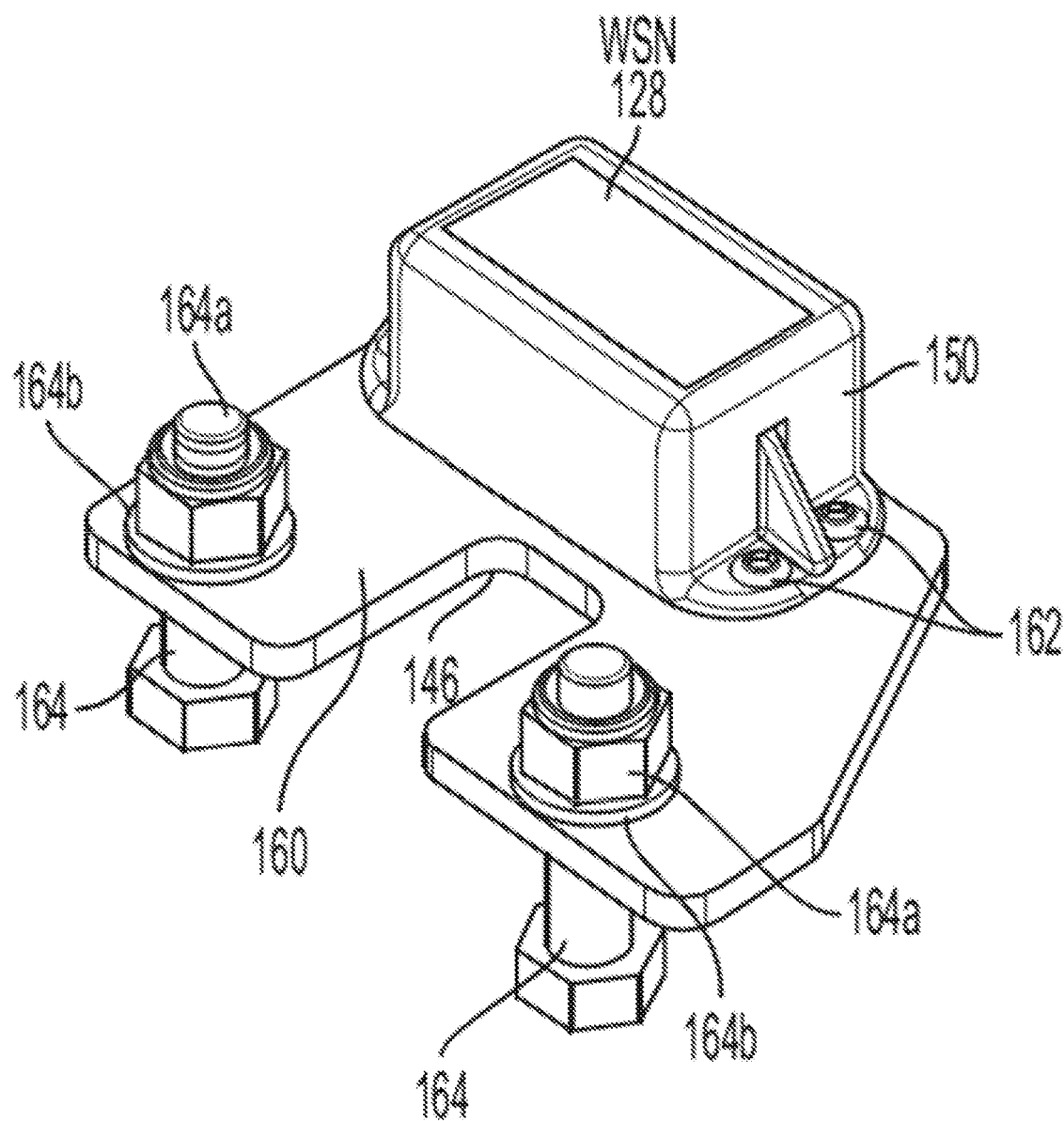
FIG. 4A provides a perspective view of the WSN of FIG. 4 attached to a bracket to be attached to the discharge gate assembly for sensing whether the discharge gate is open or closed.

The sensor device 126 can include a WSN 128 as shown in FIGS. 4, 4A and 6. WSNs 128 can be located at various locations on a railcar 100 and configured to collect data from internal sensor devices. The WSNs 128 can process and analyze the collected data to determine if the data needs to be transmitted immediately, held for later transmission, or aggregated into an event or alert, among other actions. Such WSNs 128 can be specific for collecting one type of data, or can include multiple internal sensors for collecting multiple types of data. WSNs 128 can include temperature sensors, load sensors, strain sensors, pressure sensors, hall effect sensors, accelerometers, gyroscopes, location sensors (e.g., GNSS devices), proximity sensors and/or other sensors depending on the operational parameter desired to be monitored (e.g., an outdoor temperature, a bearing temperature, vibrations, a location, a speed, a brake status, railcar acceleration, a valve state, a cover position, etc.). One or more WSNs 128 may be provided to sense the status of the discharge gates 106, the status of an outlet valve 184, and/or the status of a passageway 124 as described below.

As discussed above, the discharge gate 106, outlet valve 184 and passageways 124 have operable components that move or change as part of the operation to open and close the same. The movement, position and/or other changes of these operable components are indicative of whether the discharge gate, outlet valve or passageway is in an open state or a closed state. Accordingly, one or more of the operable components can be monitored with sensors 126 (such as the WSNs 128) to obtain information as to whether the discharge gate, outlet valve or passageway is in an open state or a closed state. For example, the rotational position of the discharge gate's operating shafts 110a, 110b are monitored by the sensors 126. Any suitable sensors can be used depending on the particular operable components to be monitored and the particular operation of the operable components. Such sensors can include, but are not limited to, motion sensors, displacement sensors, optical sensors, position sensors, reed switch sensors, and/or magnetic field sensing sensors.

Referring to FIGS. 5 and 6, the discharge gate 106 has two operating levers 108a, 108b, each of which can rotate a respective operating shaft 110a, 110b. In turn, the operating shaft 110a, 110b operates a respective internal rotatable valve (not shown) for opening and closing the discharge gate 106. The specific lever 108a, 108b is chosen depending on which side of the railcar the commodity will be discharged. FIG. 6 is a view from underneath the discharge gate 106 between the tracks 130a, 130b looking towards the end 122a of the discharge gate as indicated by arrow 132 in FIG. 5, so as to see the inner face 134 of the support plate 120 and the underside 136 of the discharge opening (or conduit) 115. A WSN 128 is provided for each operating shaft 110a, 110b to sense the rotational position of the respective operating shaft, which rotational position is indicative of the status of the discharge gate valve associated therewith. Since the operating shafts 110a, 110b are operable by either set of operating levers 108a, 108b on either side of the railcar 100, the two WSNs 128 are sufficient to monitor the discharge gate status regardless on which side of the railcar 100 the levers 108a, 108b are operated.

As shown in FIG. 6, a WSN 128 is provided adjacent the operating shaft 110a (right side of the figure) mounted on the inner face 134 of the support plate 120. The WSN 128 cooperates with a complementary sensor magnet 138 attached to the operating shaft 110a adjacent to the WSN 128 associated therewith. As the operating lever 108a rotates the operating shaft 110a, the attached magnet 138 moves either away from or closer to the associated WSN 128 depending on whether the particular internal rotatable valve is being opened or closed. Operating shaft 110b (left side of FIG. 6) has a similar configuration with a WSN 128 and magnet 138. Based on the proximity of the magnets 138 to their respective WSNs 128, the status of each of the internal rotatable valves can be determined indicating the state of the discharge gate 106. Again, if any one lever 108a or 108b is open, i.e., any one of the internal rotatable valves is open, the status of the discharge gate 106 is open.

For example, if operating lever 108a as seen in FIG. 5 is rotated counterclockwise (arrow 140a) to open its respective internal rotatable valve, the operating shaft 110a as seen in FIG. 6 will rotate clockwise (arrow 142a) such that the magnet 138 will move away from the associated WSN 128 to a position detected by the WSN 128 indicating that the internal rotatable valve associated with that WSN 128 is in an open position. Similarly, if the operating lever 108b as seen in FIG. 5 is rotated clockwise to close the valve, the WSN will detect that the magnet 138 has moved to a position indicating that the internal rotatable valve is closed. The WSN 128 for the operating lever 108b and its respective operating shaft 110b rotate in the opposite directions as shown via arrow 140b and 142b to open the internal rotatable valve. The WSN 128 can be configured to indicate a change in state, between valve open and valve closed, based on movement of the magnet of a threshold distance relative to the WSN 128. The WSN 128 may also be configured and tuned to sense the various degrees of rotation of the operating shafts 110a, 110b to determine how much the respective internal rotatable valves of the discharge gate are opened.

With reference to FIG. 4, an illustrative WSN 128 is now described. The WSN 128 has a housing 150 composed preferably of a hard plastic resistant to environmental damage, such as a UV rated polymer and water (e.g., a polycarbonate/ABS blend). After the various components are installed within the housing 150 as described below, a potting material (not shown) is provided in the housing 150 to maintain, encapsulate and environmentally seal the components within. Any suitable electrical potting material capable of protecting the electric circuitry and components from the harsh railroad environment can be used, where harsh weather, UV exposure, humidity, vibration, mechanical impact, thermal shocks and abrasion might occur while the device is in operation. Such materials include epoxies, polyurethanes and silicone compounds. A flexible urethane suitable for electrical use and through which wireless signals of the frequencies to be used can be transmitted is preferred. An antenna for communications can be provided in a void within the housing not filled with the potting material to avoid interference.

A sensor 152 is provided within the housing 150. Sensor 152 can include, but is not limited to, a magnet sensing reed switch for sensing the proximity or position of the magnet 138. Electrical circuitry 154 includes the components and wiring to operate and/or receive and process the information from the reed switch 152 as is known in the art. This can include, but is not limited to, analog and digital circuitry, Central Processing Units (CPUs), processors, circuit boards, memory, firmware, controllers, power conditioning circuitry and other electrical items, as required to operate the sensor and process the information as further described below. In the illustrated embodiment, the circuitry 154 is in electrical communication with the reed switch 152 for receiving signals therefrom. The electrical circuitry 154 may also include intelligence sufficient to perform analysis of the data and may accept parameters from outside sources regarding when alarms should be raised.

The circuitry 154 also includes components for wireless communications such as WiFi. Each WSN 128 may be capable of forming an ad-hoc network with other WSNs on the same railcar and with a CMU 170 which may be mounted on the same railcar 100 as further described below. Circuitry also includes a long-term power source 156. The long-term power source 156 can include, but is not limited to, a battery, a solar cell, an energy harvester, an internal power-generating capability, and/or a military grade lithium-thionyl chloride battery. The circuitry may also provide power conditioning and management functions. The circuitry may include a feature to conserve battery life. Here, there is always an active input to the processor tied to the reed switch, and if it changes state then the processor is woken up to process the information, determine decisions based on a logic tree, and either send a message or go back to sleep based on the situation. In some scenarios, the WSN 128 can report its status or information independent of the CMU 170, and/or perform the same functions as the CMU 170. Accordingly, the WSN 128 can send information to, for example, a communication device (such as CMU 170), a PWG 176 located on the locomotive, a PWG located in a rail yard, or a remote server.

The WSNs 128 and the complementary magnets 138 are attached at the desired locations using any suitable means, including epoxy adhesives and mechanical fasteners. With reference to FIGS. 4A and 6, an illustrative mechanical mount for each WSN 128 is shown. With reference to the operating lever 108a and operating shaft 110a as seen in FIG. 6, the WSN 128 is fastened to a bracket plate 160 using four couplers (e.g., screws) 162. The bracket plate 160 with the attached WSN 128 is then attached to the inner face 134 support plate 120 of the discharge gate 106 with other couplers (e.g., bolts 164, nuts 164a and washers 164b). The bracket plate 160 is notched at 146 as shown to partially surround the operating shaft 110a, whereby the WSN 128 is positioned adjacent to or in close proximity to the complementary magnet 138 attached to the respective operating shaft 110a.

The magnet 138 is attached to the operating shaft 110a via epoxy. Although, mechanical means such as fasteners can additionally or alternatively be used. The WSN 128 is positioned to sense the position of the magnet 138 in relation to the respective WSN 128, and to sense a change in such position. The mount of the WSN 128 and its associated magnet 138 for operating lever 108b and operating shaft 110b are similar as shown.

FIGS. 7A, 7B, 7C, and 7D show the discharge gate operating levers 108a, 108b in various positions. Shown in broken line on the outer face 144 of the support plate 120 is the position of the WSNs 128 mounted on the inner face 134 (opposite side) of the support plate 120, adjacent the operating shafts 110a, 110b as described previously (see FIG. 6 showing the WSNs 128 on the inner face 134 of the plate 120 and FIG. 5 showing the WSN 128 on the inner face 134 of the supporting plate 120 at the end 122b adjacent the operating lever 110b).

FIG. 7A shows both operating levers 108a, 108b pointed upward, the security cap 112 covering the discharge conduit opening 114, and the security bar 116 extending across the security cap 112, indicating that the discharge gate 106 is in the closed position. As seen in FIG. 6, when the operating levers 108a, 108b are in this position, the magnet 138 is aligned with (adjacent to or in close proximity to) its respective WSN 128, which in this position is configured to indicate that the discharge gate is "closed".

FIG. 7B shows the security bar 116 and security cap 112 removed, but the operating levers 108a, 108b are still in an upward and thus closed position, although the levers 108a, 108b can now be moved. Nevertheless, with both operating levers 108a, 108b in the closed position, the status of the discharge gate 106 is "closed".

Figure 7C:
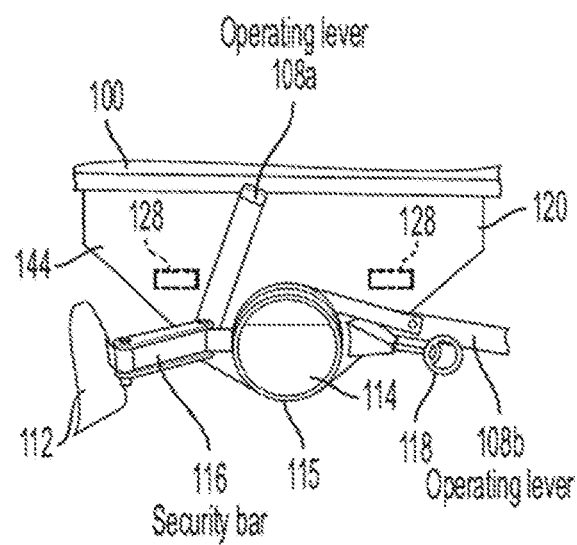
Figure 7D:
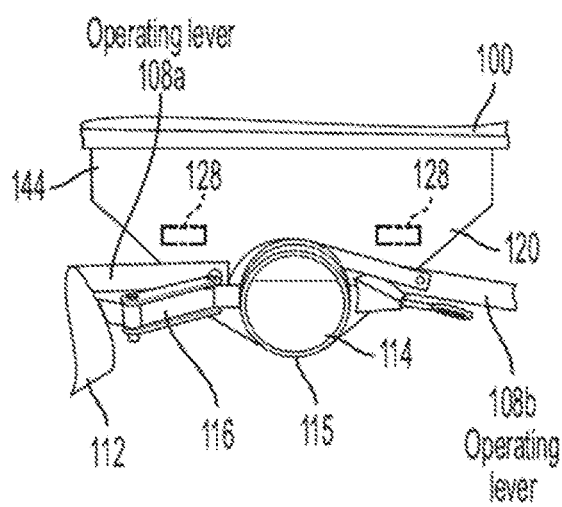

FIG. 7C shows operating lever 108a in the closed position, but operating lever 108b is in the open position, having been rotated clockwise. With reference to FIG. 6, the clockwise rotation of the operating lever 108b rotated the respective operating shaft 110b and the magnet 138 thereon a threshold distance away from the respective WSN 128, indicating that the section of the discharge gate 106 operated by the lever 108b is "open", allowing commodity within to discharge from the opening 114. Lever 110b opens an internal rotatable valve to discharge commodity from the opening 114 on the side of the railcar 100 shown. Lever 110a would operate the internal rotatable valve for discharging commodity on the opposite side of the railcar. With at least the one operating lever 110b in an open position, the status of the discharge gate 106 is "open".

FIG. 7D shows both operating levers 110a, 110b in the open position, and thus both respective operating shafts 110a, 110b and the respective magnets 138 thereon are rotated away from their respective WSNs 128 to indicate that both sections of the discharge gate 106 are "open". In this scenario, when the distance of the magnet 138 from its respective WSN 128 is greater than a predefined threshold, the system is configured to read this as an "open" event, and when less than the predefined threshold a "closed" event. Although both operating levers are in an open position, since at least one operating lever 110b in an open position, the status of the discharge gate 106 is "open".

The security bar 116 and security cap 112 of the discharge gate 106 are not monitored in this scenario. The operating levers 108a, 108b are not operable when the cap 112 is in place.

The discharge gate 106 described above is typical of a type of discharge gate 106 used in the industry. Other discharge gate configurations made by different manufacturers are suitable for use with the present solution. Depending on the particular configuration of the discharge gate and its operable components 107, suitable sensors to determine whether it is "open" or "closed" can include proximity and displacement sensors such as reed switches, contact switch sensors, limit switches, optical sensors and/or any other type of sensor that can work with the particular operable components of the discharge gate to sense a parameter indicative of the status of the discharge gate. For example, for some discharge gate configurations, it may be desirable to monitor directly the position and/or displacement of the operating lever or levers rather than the operating shafts as illustrated above.

The number of WSNs 128 used to monitor each discharge gate 106, outlet valve 184 and/or passageways 124 depend on the particular configuration of the same and the particular parameters to be monitored. Thus, as few as one WSN 128 may be suitable, for a given discharge gate 106 or outlet valve 184 having a single operating lever. Multiple WSNs 128 may be suitable for a given discharge gate 106 or outlet valve 184 having two or more levers to be monitored. Regardless of the total number of WSNs 128 for each discharge gate 106, outlet valve 184 and/or passageways 124, the status of the same is(are) to be determined.

The WSN 128 discussed above can monitor the status of a discharge gate 106, outlet valve 184 and/or passageway 124. Sensors 126 are also provided with the WSN 128 to monitor motion and location of the railcar 100. For monitoring railcar motion (e.g., moving or not), a motion sensor 166 is provided. The motion sensor can include, but is not limited to, an accelerometer or Global Navigation Satellite System (GNSS). For monitoring the location of the railcar 100 (in or not in an area where it is expected that the discharge gate 106 could be opened), a location sensor 168 is provided. The location sensor can include, but is not limited to, a GNSS.

The WSNs 128 are versatile and can include different types of sensors 126 for sensing different types of parameters, including railcar motion and railcar location. The sensors 126 can include, but are not limited to, sensors for detecting motion of the railcar 100 and the location of the railcar 100. FIG. 1 shows motion and location sensors 166 and 168 in their own WSNs 188 located on the railcar 100 as one alternative, although in the illustrated embodiment described herein the sensors for motion and location are provided in the CMU 170 as described below. Examples of WSNs for monitoring numerous different parameters are disclosed in U.S. Pat. No. 9,981,673 noted above.

With reference to FIGS. 1-2, a CMU 170 is located on the railcar 100. The CMU 170 is configured to control a railcar-based network 172 for the railcar 100. The railcar-based network 172 can include, but is not limited to, a wireless network overlaid on the railcar 100. The CMU 170 may comprise a single unit that serves as a communications link to other locations having remote receivers, such as the powered wireless gateway 176 and/or a remote railroad operations center 178. The powered wireless gateway 176 can be located on locomotive 104. CMU 170 is capable of processing data received from remote devices 176, 178. The CMU 170 is configured to also communicate with, control and monitor the WSNs 128 in the local railcar-based network 172. The CMU 170 can include hardware such as a processor, a power source (e.g., a battery, solar cell, energy harvester, and/or internal power-generating capability), a GNSS receiver, a GPS receiver, a Wi-Fi device, a satellite communication device, a cellular communication device, a wireless communications device configured to maintain the railcar based network 172, a wireless communication device enabling communications with a train-based network 174 (FIG. 2), and/or sensor(s) selecting based on operational parameters that are to be monitored. The sensor(s) include, but is(are) not limited to, an accelerometer, a gyroscope, a proximity sensor, and/or a temperature sensor.

Although the railcar-based network 172 is described as comprising a wireless network, other types of networks 172 may be used such as any suitable wired and wireless type networks.

In the present application, the CMU 170 includes sensors that complement the WSNs 128 monitoring the discharge gates 106, outlet valve(s) 184 and/or passageway(es) 124. These sensors include, but are not limited to, a motion sensor 166 for monitoring railcar motion (e.g., an accelerometer), and a sensor 168 for monitoring railcar 100 location (e.g., a GNSS such as GPS). Although these sensors could be provided in separate WSNs located on the railcar 100 or included in the WSNs 128 for the discharge gate 106, outlet valve 184 or passageway 124 as discussed above, in the illustrated embodiment they are provided in the CMU 170. Those skilled in the art will appreciate that GPS is just one form of GNSS. Other types of GNSS may be used which include, but are not limited to, GLONASS and BeiDou.

CMU 170 supports one or more WSNs 128 in a network configuration using open standard protocols, such as the IEEE 2.4 GHz 802.15.4 radio standard. Additionally, see FIG. 2, the CMU 170 is also a member of the train-based network 174, which consists of the CMUs 170 from all enabled railcars 100 in the train consist 102, controlled by a PWG 176. The PWG 176 may be located on a locomotive 104.

The CMU 170 is configured to: 1) manage a low-power railcar based network 172 overlaid on a railcar 100; 2) consolidate data from the WSNs 128 in the railcar based network 170 and apply logic to the data gathered to generate and communicate information such as warning alerts to a host (e.g., a locomotive 104 and/or remote railroad operations center 178); 3) support built-in sensors (e.g., an accelerometer to monitor railcar motion and a GPS to monitor location), and provide an analysis of this data to determine the facts and generate alerts; and/or 4) support bi-directional communication upstream to the host or control point (e.g., locomotive 104 and/or an off-train monitoring and remote railroad operations center 178 or remote server 192, and/or downstream to one or more WSNs 128 located on the railcar 100).

The CMU 170 may communicate wirelessly to the PWG 176 as defined below in the network configuration or may be configured to communicate through a wired connection, for example, through the Electronically Controlled Pneumatic (ECP) brake system.

The CMU 170 can perform advanced data analysis using data collected from one or more WSNs 128 and apply heuristics to draw inferences and conclusions from this data. The CMU 170 may issue alarms regarding the status of the discharge gate(s) 128, outlet valve(s) 184 and/or passageway(es) 124. For example, the CMU 170 may transmit data and a notification to a remote receiver (e.g., PWG 176 or off train operations center 178) indicating an open or closed state of a discharge gate 106, an outlet valve 184 and/or a passageway 124. The thresholds for each WSN 128 may be dynamically programmed by commands generated internally or received externally from the CMU 170. The CMU could be combined with one or more of the WSNs, particularly as components are miniaturized. Such a WSN with the CMU could be provided on the discharge gate 106 (as indicated above), an outlet valve 184 and/or a passageway 124. A WSN could communicate off-train to a remote railroad operations center or remote server.

With reference to FIG. 2, the PWG 176 is located on a locomotive 104. The present solution is not limited in this regard. The PWG 176 may be located elsewhere on the train consist 102 where there is a source of external power. The PWG 176 can include, but is not limited to, a processor, a GNSS receiver, sensor(s) (e.g., an accelerometer, a gyroscope, a proximity sensor, and/or a temperature sensor), a satellite and/or cellular communication system, a local wireless transceiver (e.g., a WiFi transceiver), an Ethernet port, a high capacity network manager, and/or other means of communication. The PWG 176 may have power supplied by the locomotive 104 if located on a powered asset such as a locomotive 104, or may derive its power from another source, for example, from a solar power generator or from a high-capacity battery. The PWG 176 controls the train-based network 174 overlaid on the train consist 102, consisting of multiple CMUs 170 from each railcar 100 in the train consist 102. Again, a train-based network may be employed.

The components and configuration of the PWG 176 are similar to that of the CMU 170, with the exception that the PWG 176 typically draws power from an external source, while the CMU 170 is self-powered. Additionally, the PWG 176 collects data and draws inferences regarding the performance of the train consist 102, and train-based networks 174, as opposed to the CMUs 170 or WSN 128 which draw inferences regarding the performance of individual railcars 100, railcar based network 172, the discharge gates 106, the outlet valves 184 and/or the passageways 124. A WSN 128 could draw inferences independent of a CMU 170 or PWG 176 regarding the performance of individual railcars 100.

WSNs 128 with sensors configured to determine the status (i.e., open or closed) of the discharge gates 106, outlet valves 184 and/or the passageways 124 were described above. In some scenarios, the WSNs 128 include magnetic reed switch sensors, and are positioned on the discharge gates 106, outlet valves 184 and/or the passageways 124 to sense the positions of operating shafts and/or covers, which are indicative of whether or not the discharge gates 106, outlet valves 184 and/or the passageways 124 are open or closed. A motion sensor 166 may be provided to determine whether the railcar is in motion. The motion sensor 166 can include an accelerometer incorporated in the CMU 166. A location sensor 168 may be provided for determining the location of the railcar 100. The location sensor 168 may include a GNSS device incorporated in the CMU 170. The CMU 170 can: receive data from the various sensors; determine whether an event related to one or more of the discharge gates 106, outlet valves 184 and/or the passageways 124 has occurred; determine whether a notification of an event (such as an alarm, alert or other communication) is to be sent to a remote receiver (e.g., PWG 176); and/or determine whether the notification is to be sent off train (e.g., via the PWG 176) to a remote site (e.g., remote railroad operation center 178). Having described various components, assemblies and systems for use in the present solution, illustrative methods using the data collected about the status of valves (e.g., discharge gates, and/or outlet valves), passageway (e.g., hatches and manways), motion of the railcar 100, and location of the railcar 100 are described below in further detail.

System Operation

Figure 3:
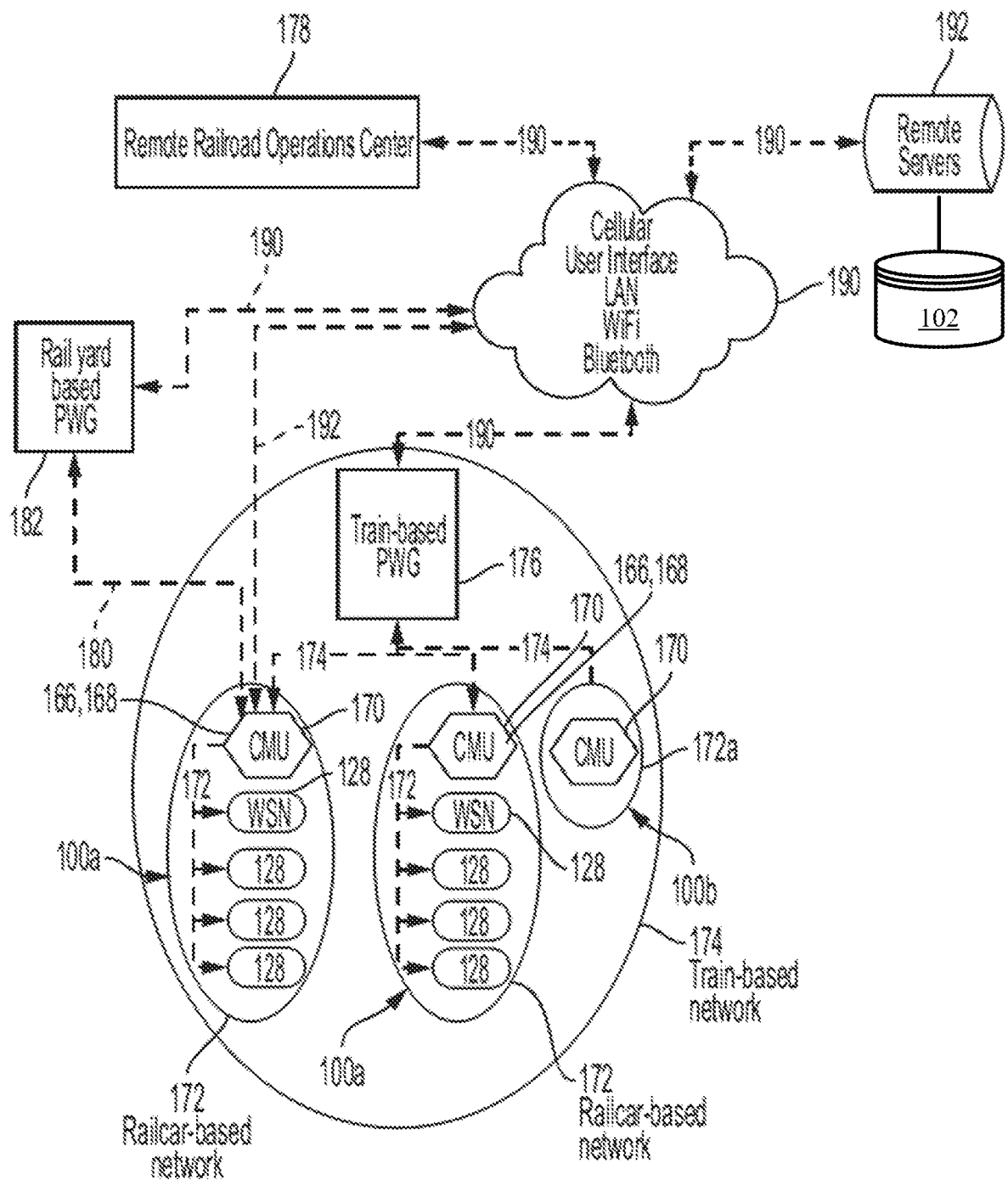
FIG. 3 provides a block diagram of the train-based network for the train consist shown in FIG. 2, and illustrates various means of communicating data off-train.

Referring to FIGS. 1-3, an overview of the illustrated system operation is described. Of the railcars in the train consist 102, two railcars 100a have a railcar-based network 172. The railcar-based network 172 includes the CMU 170 installed on the railcar 100a, and at least one WSN 128 on each discharge gate 106, outlet valve 184 and/or passageway 124 to monitor the statuses thereof. In FIG. 3, four WSNs 128 are shown within the railcar-based network 172 for each railcar 100a for illustrative purposes. Although, each railcar 100a can have any number of WSNs 128 selected in accordance with a particular application. For example, in some scenarios, each railcar 100a has a plurality of WSNs—two WSNs 128 on each of the four discharge gates 106, a WSN 128 on each outlet valve 184, and a WSN 128 on each passageway 124. The present solution is not limited to the particulars of this example. The CMU 170 and WSNs 128 work together to collect and analyze the data (information) from the sensors 126 in the WSNs 128. The CMU 170 also controls the railcar based network 172 on the railcars 100a and is able to configure one or a more of the WSNs 128 in a local network to transmit, listen, or sleep at precise times, or to change the parameters under which the WSNs 128 operate and detect events.

With reference to FIGS. 2-3, the railcar 100b of the train consist 102 includes a CMU 170 as part of its railcar based network 172a, but has no WSNs associated with valves (e.g., discharge gates and outlet valves) and/or passageway (e.g., hatches and manways). Railcar 100c does not have a CMU, a WSN or a railcar-based network, and thus is a dark car that does not communicate with the train-based network 174. The discharge gates 106, outlet valves 184 and passageways 124 of the railcars 100a can be monitored, while those of railcars 100b and 100c cannot.

Each WSN 128 is in two-way communication with its respective CMU 170 mounted on the railcar 100. The CMU 170 collects the data from each WSN 128 and can send instructions to the WSN 128. As previously discussed, the CMU 170 and each WSN 128 on the same railcar 100 form the local area ad-hoc railcar-based network 172 to facilitate communications between them. Message packet exchanges are synchronized so that no packets collide on the railcar-based network 172, and every packet is scheduled and synchronized for energy efficiency. Communication traffic on railcar-based network 172 can be protected by encryption, message integrity checking, and device authentication.

The train-based network 174 is overlaid on the train consist 102. The train-based network 174 includes the PWG 176 installed on a host or control point (e.g., locomotive 104) or on another asset with access to a power source, and at least one CMU 170. The CMU(s) 170 can belong to two networks, namely the respective railcar-based network 172 and the train-based network 174. However, the CMU(s) 170 is(are) only required to belong to the railcar-based network 172 such as when the individual railcar 100 is separated from the remainder of the train consist 102. The CMU(s) 170 and WSN(s) 128 installed on the railcars 100 form a railcar based network 172 and communicate with the PWG 176 on a host or control point, such as a locomotive 104 or other asset, forming the train-based network 174.

The train-based network 174 uses the overlay network to support low-power bi-directional communication throughout train consist 102 and with the PWG 176 installed on the locomotive 104. The overlaid train-based network 172 is composed of wireless transceivers embedded in the CMU 170 on each railcar 100. Each CMU 170 can initiate a message on the train-based network 174 or relay a message from or to another CMU 170. The overlay train-based network 172 is created independently of and operates independently of the railcar-based networks 172 created by each railcar 100 in the train consist 102.

The bi-directional PWG 176 manages the train-based network 174 and communicates notifications of events, alarms and alerts from the CMUs 170 installed on individual railcars 100 to the host or control point, such as the locomotive 104, wherein the alerts or event reports may be acted upon via human intervention, or by an automated system. Locomotive 104 may include a user interface for receiving and displaying alert messages generated by train-based network 174 or any of the individual railcar-based networks 172. The PWG 176 can receive communications such as notifications of events and alerts from the CMUs 170 on individual railcars 100 and can draw inferences about specific aspects of the performance of train consist 102.

Preferably, a Distributed Complex Event Processing (DCEP) engine is used, which is a hierarchical system for collecting and analyzing the data and for communicating data, events and alerts to a final destination where they can be acted upon. The DCEP is responsible for implementing the intelligence used to draw conclusions based on the data collected from WSNs 128, CMUs 170 and PWGs 176. The data processing platform may be distributed among all WSNs 128, CMUs 170 and PWG 176 on the locomotive 104, as well as utilizing a cloud-based infrastructure optimized to work closely with train-based networks 172, in conjunction with a variety of data streams from third-party providers or external sources.

If an alert or event condition is detected by a WSN 128 or other sensor (such as (i) when the status of the discharge gate 106, outlet valve 184 and/or passageway 124 changes from open to close or close to open, or (ii) when the train moves inside the geofence where it is safe to open the discharge gate 106, outlet valve 184 and/or passageway 124), the WSN 128 forwards a message to the CMU 170 within its network 172 for further analysis and action, for example, to confirm or coordinate alerts or event conditions reported by one WSN 128 with other WSNs 128 in the railcar based network 172. If an event requiring notification is confirmed by CMU 170, a notification of the event is sent to the PWG 176 installed on an asset such as the locomotive 104, and/or off train to a monitoring and remote railroad operations center 178.

As noted, the CMU 170 on each railcar 100 supports the motion detector sensor 166 (e.g., an accelerometer) and the location sensor 168 (e.g., a GNSS). These sensors may be internal (built in) to the CMU 170 or external to the CMU 170 such as in a WSN. Information from these sensors 166, 168 can be used to determine whether WSNs 128 should be looking for certain types of events. Additionally, the CMU 128 can receive instructions (e.g., from an off-train site such as operations center 178 through the PWG 176) to start or stop looking for certain types of events or provide a status update. Additionally, CMU 170 on each railcar 100 is capable of using built-in sensors and/or managing a railcar based network 172 on the railcar 100 to generate messages that need to be sent to a host or control point (e.g., a locomotive 104). Coordinates for geofence areas for use by the CMUs 170 can be programmed into the CMUs 170 and/or obtained via communications and updates from the remote railroad operations center 178 or other sources.

The bi-directional PWG 176 is capable of exchanging information with an external remote railroad operations center 178, data system 192 or other train management systems. This communication path 190 is shown in FIG. 3, and can include cellular, LAN, Wi-Fi, Bluetooth, satellite, or other means of communications. This link can be used to send notifications of events and alarms off-train when the train consist 102 is in operation. This link can also be used to send instructions and information from the remote railroad operations center 178 or other off train source to the individual railcar CMUs 170, such as updated geofence coordinates to be used by the CMUs 170 when determining if a discharge gate related event has occurred.

A railcar 100 can be decoupled from the train consist 102, for example, at a rail yard where commodity may be loaded or discharged. When decoupled, the railcar 100 is no longer part of the train-based network 174. In such situations, the CMU 170 and its associated WSNs 128 can become part of a rail yard-based network 180 having one or more land-based PWGs 182. The land-based PWGs 182 would interface with the CMU 170 and its WSNs 128 via bi-directional communications network 180 in a similar manner as would the train-based PWG 176 as described above, and provide bi-directional communications between the CMU 170 and off train sources such as the remote railroad operations center 178 via communication path 190 in a similar manner as would the train based PWG 176 as described above, and as illustrated in FIG. 3. A description of a railcar 100 having a railcar-based network incorporated into a rail yard-based network 180 can be found in U.S. Pat. Nos. 10,259,477 and 10,710,619. The disclosure of this publication is incorporated herein by reference in its entirety.

Event Detection and Notification

An operational status of the railcar is based upon the criteria of (i) discharge gate 106 (open or closed), (ii) the outlet valve 184 (open or closed), (iii) the passageway 124 (open or closed), (iv) railcar movement (stationary or moving), and (v) railcar location (inside or outside an acceptable area to open the discharge gate 106, outlet valve 184, and/or passageway 124). When any of the criteria change state, an event takes place that may trigger an action such as the notification of an alert or the cancellation of an alert.

A notification can provide information for inter alia, operational, security and customer billing purposes. The notification may include location of the event, time of the event, status of the discharge gate 106, status of the outlet valve 184, status of the passageway 124, and duration of the open event and alerts.

Figure 15:
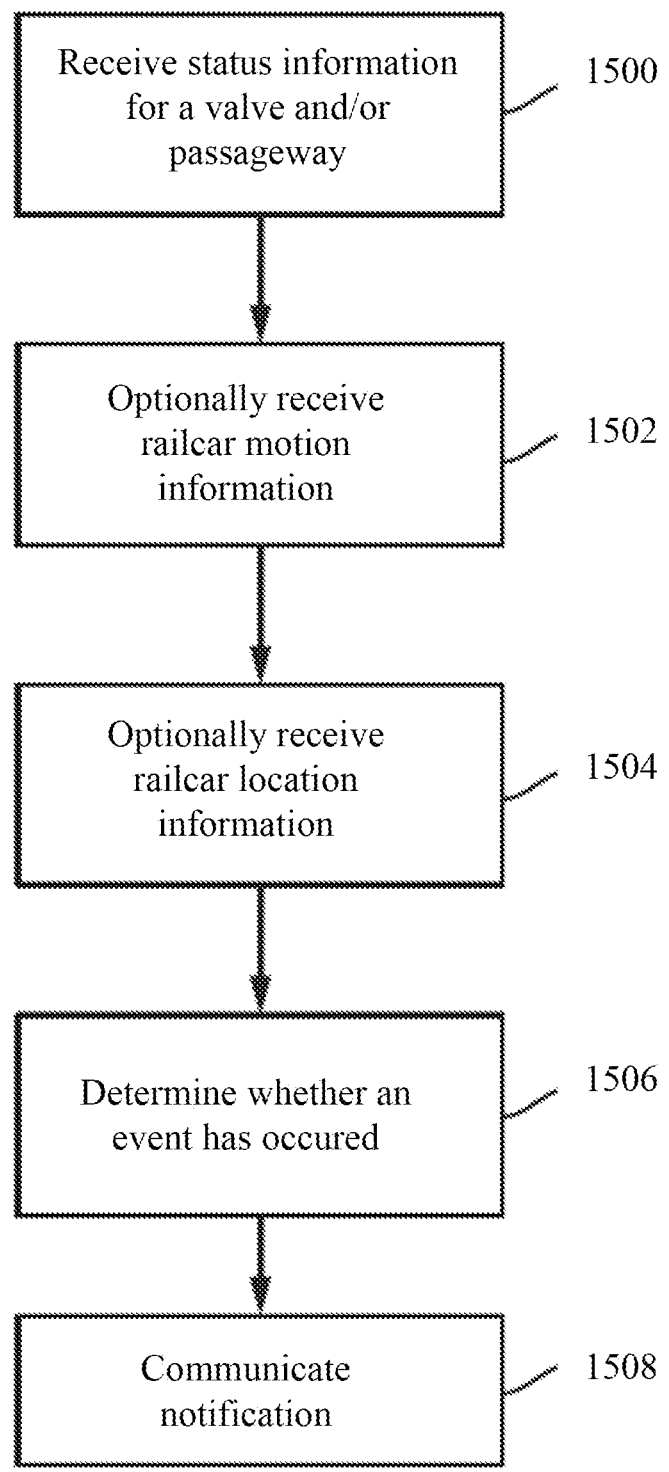
FIG. 15 provides a flow chart of an illustrative method for collecting data regarding the system related to the discharge gate and for determining the occurrence of an event.

FIG. 15 illustrates an illustrative method of detecting events due to the change in the monitored parameters. As illustrated in FIG. 15, status information pertaining to a valve (e.g., the discharge gate 106 and/or outlet valve 184 of FIG. 1) and/or passageway 124 of a railcar 100 may be received in 1500. This status information may be detected by at least one WSN 128 and received by a CMU 170 from the WSN(s). The status information may include an indication of whether the valve and/or passageway is in an open or closed position, whether a position of the valve and/or passageway has changed from open to closed, and/or whether a position of the valve and/or passageway has changed from closed to open. The CMU 170 may record time and date information of any status changes and/or when the status information was received thereat.

In optional 1502, the CMU 170 may receive motion information associated with the railcar 100. The motion information may be measured by a motion sensor 166 such as, for example, an accelerometer, a GNSS device and/or other types of device or sensor. The motion information may include, but is not limited to, data about the acceleration and/or vibration of a railcar 100 at a particular point in time. For instance, if a motion sensor 166 measures any acceleration of a railcar or acceleration that exceeds a threshold value, then the motion information may indicate that the railcar 100 is moving. Alternatively, if a motion sensor 166 does not measure acceleration of railcar 100 or an acceleration value that does not exceed a threshold value, the motion information may indicate that a railcar is stationary. The CMU 170 may record time and date information of any status changes or when the motion information was received.

In optional 1504, the CMU 170 may receive location information associated with the railcar 100. The location information may include, but is not limited to, an indication of whether the railcar is located inside or outside a geofence where it is or is not acceptable for a valve (e.g., a discharge gate, and/or outlet valve) and/or a passageway (e.g., a hatch and/or manway) to be open. The location information may be received from a location sensor 168 such as a GNSS. The geofence information may be programmed into the CMU 170 or uploaded and updated from a remote railroad operations center 178 through the networks discussed above. The CMU 170 may record time and date information of any status changes or when the location information was received.

In 1506, the CMU 170 may determine whether one or more events have occurred. This determination can be made based on the status information, the railcar motion information and/or the railcar location information. A change in any one of these listed types of information may trigger performance of operations to make such a determination by the CMU 170. The operations of 1506 may also involve determining whether alerts or other information should be communicated.

When a determination is made that at least one event has occurred, the CMU 170 communicates a notification in 1508 to a remote receiver off the railcar 100 (e.g., a PWG 176 located on a locomotive 104 of the train consist 102 or a PWG 182 in a rail yard). The notification may be forwarded further off train or out of the rail yard such as to a remote railroad operations center 178. The term notification can include any information such as alarms, alerts, event details, and data communicated by the CMU for the purpose of notifying persons or other systems of the information.

In summary and as part of the process, each WSN 128 is capable of analyzing data collected from sensors to determine whether an event, alert message and/or data should be uploaded to a next higher level in the hierarchy (in this case the CMU 170). The WSN 128 can upload information to the next higher level in the hierarchy or upload information off train directly to a remote server or remote train operations center. Each WSN 128 can be programmed with multiple thresholds for position change readings associated with components of the valves (e.g., discharge gate(s), and/or outlet valves) and/or passageways (e.g., hatches and/or manways) (e.g., levers 108a, 108b, handle 1700, shaft 1706 and/or cover 3502) received from one or more sensors. Recordation of a status change provides an indication of a possible notification event or alert condition. In response to such an indication, a notification or other message is generated and sent to the CMU 170 in the same railcar-based network 172.

The WSNs 128 are programmed with thresholds that indicate specific types of alerts or events. For example, the WSNs 128 mounted on the discharge gate 106 may generate a possible open message or a close message depending upon the status change observed. Examples of messages generated are gate "open" and gate "closed". The WSNs 128 may not determine whether each of the possible conditions actually exists. This determination may be made at the next level up device of the hierarchy (e.g., at CMU 170). The next level up device can use the readings from other types of sensors (e.g., a location sensor 168 and/or a motion sensor 166) to make a determination that an actual event has occurred. Different thresholds suggesting the occurrence of other types of events may be programmed into the various sensors.

In regard to operations 1502 and 1504 of FIG. 15, each railcar 100 can have sensors for determining railcar movement and railcar location. Recordation of a status change, a motion reading and/or a location reading indicates a possible event or alert condition that is to be analyzed by the CMU 170 (and communicated to the CMU 170 if such sensors are located separate from the CMU 170).

The logic, carried out by the CMU 170 for determining whether an event has occurred in 1506, is capable of (i) analyzing both open and close events received from each of the WSNs 128 under its control and (ii) determining if an event condition or alarm actually exists. The open and close events may be independent for each WSN 128 installed near an operating component (e.g., a shaft). The CMU 170 may be configured to either analyze only open or close events, to analyze only other types of events, or to analyze open or close events and other types of events. Thus, the CMU 170, and WSNs 128 under the CMU's control, form a distributed event processing engine that can determine various types of events.

When the CMU 170 determines that an event has occurred which necessitates a notification such as an alert/alarm or other information, a notification (e.g., message) is sent in 1508 to the next level in the hierarchy (e.g., the PWG 176 located elsewhere on train consist 102) and possibly further up the hierarchy (e.g., to a remote railroad operation center 178), depending upon the severity of the event and the need to immediately address it, perhaps by altering the operating condition of the train consist 102. The term "notification event" as used herein refers to an event for which a notification, such as an alarm, alert or other information about the event is to be communicated. The notification event is communicated immediately or at some future time depending on the urgency and/or criticalness of the event.

A logic table showing an illustrative set of operational status event determinations based on data collected for the discharge gate 106 is provided in FIGS. 8-10. The operational status events are determined based on the following criteria: (i) discharge gate status (open or closed); outlet valve status (open or closed); (iii) hatch status (open or closed); (iv) railcar motion (moving or not); and/or (v) railcar location (in or not in an area where an open discharge gate is acceptable).

For the illustrated logic tables, the status of all discharge gates 106 are sampled prior to railcar 100 departure from where it was loaded with commodity. In addition, alerts or alarms are assigned a priority, such as high, medium and low.

FIGS. 8-10 provide charts defining a table which describes a variety of discharge gate-related events and associated alerts/alarms that can be provided immediately. The charts also show for each operational status the change in the discharge gate, railcar motion or railcar location (geofence) status that triggered the determination of the operational status, the triggering change being shown by an arrow.

Terminology as used in the table and charts:
a. Operational Status—condition of the discharge gate, railcar motion and railcar location after a change to one or more of these monitored parameters;
b. Event/Alert/Alarm—a possible activity responsible for the Operational Status and the Alerts or Alarms or other notification to be generated.
c. Typical event—a typical operating event during the supply chain cycle;
d. Non-typical event—an event that normally should not happen in normal operating conditions of the supply chain;
e. Alarm—a non-typical event that needs to be acted on immediately;
f. Status Change—when operations change in the supply chain but no notifications are necessary;
g. Geofence—a virtual geographic area where it is acceptable for a discharge gate to be open.

| Operational Status | Status Of The Discharge Gate, Railcar Motion, And Railcar Location | Event/Alert/Alarm |
|---|---|---|
| 1 | Gate valve has changed from open to close, railcar is stationary and is located outside a geofence. | Alarm - End security event, also possible undefined geofence for unloading or sampling event |
| 2 | Gate valve has changed from open to close, railcar is moving and is located outside a geofence. | Non-Typical Event - Unsecured gate chatter |
| 3 | Gate valve has changed from open to close, railcar is stationary and is located inside an unloading, maintenance, railcar wash, or Generic geofence. | Typical Event - End unloading in unloading, or maintenance, railcar wash, or Generic geofence event |
| 4 | Gate valve has changed from open to close, railcar is moving and is located inside a geofence. | Non-Typical Event - Unsecured gate chatter event |

| Operational Status | Status Of The Discharge Gate, Railcar Motion, And Railcar Location | Event/Alert/Alarm |
|---|---|---|
| 5 | Gate valve has changed from closed to open, railcar is stationary and is located outside a geofence. | Alarm - Security alert, also possible undefined (not yet programmed) geofence for unloading or sampling event |
| 6 | Gate valve has changed from closed to open, railcar is moving and is located outside a geofence. | Alarm - Security alert/ unsecured gate |
| 7 | Gate valve has changed from closed to open, railcar is stationary and is located inside a geofence. | Typical Event - Begin unloading event or Product sampling, or maintenance, railcar wash, or Generic event. (these 5 events are defined by geofence type where the event takes place) |
| 8 | Gate valve has changed from closed to open, railcar is moving and is located inside a geofence. | Non-Typical Event - Unsecured gate chatter event |
| 9 | Railcar motion has changed from moving to stationary, gate is closed and railcar is located outside a geofence. | Status Change - Stopping event |
| 10 | Railcar motion has changed from stationary to moving, gate is closed and railcar is located outside a geofence. | Status Change - Moving event |
| 11 | Railcar motion has changed from moving to stationary, gate is closed and railcar is located inside a geofence. | Status Change - Stopping event in geofence (plant) |
| 12 | Railcar motion has changed from stationary to moving, gate is closed, and railcar is located inside a geofence. | Status Change - Moving event in geofence (plant) |
| 13 | Railcar motion has changed from moving to stationary, gate is open and railcar is located outside a geofence. | Status Change - Still in Alarm condition - Stopping event |
| 14 | Railcar motion has changed from stationary to moving, gate is open and railcar is located outside a geofence. | Status Change - Still in Alarm condition - Moving event |
| 15 | Railcar motion has changed from moving to stationary, gate is open and railcar is located inside a geofence. | Status Change - Still in Alarm condition - change in movement status after unloading event, sample event, or wash, or maintenance, or generic event. Also non-typical - Stopping event in geofence (plant) |
| 16 | Railcar motion has changed from stationary to moving, gate is open and railcar is located inside a geofence. | Alarm - Railcar movement status change after unloading event, sample event, or wash, or maintenance, or generic event. |
| 17 | Railcar location has changed from inside a geofence to outside a geofence, railcar is stationary and gate is closed | Not-logically possible. Conflicting event |
| 18 | Railcar location has changed from inside a geofence to outside a geofence, railcar is moving and gate is closed. | Typical Event - Geofence exit event |
| 19 | Railcar location has changed from outside a geofence to inside a geofence, railcar is stationary and gate is closed. | Not-logically possible. Conflicting event |
| 20 | Railcar location has changed from outside a geofence to inside a geofence, railcar is moving and gate is closed. | Typical Event - Geofence entry event |
| 21 | Railcar location has changed from inside a geofence to outside a geofence, railcar is stationary and gate is open. | Not-logically possible. Conflicting event |
| 22 | Railcar location has changed from inside a geofence to outside a geofence, railcar is moving and gate is open. | Alarm - Geofence exit with gate unsecured. Give alert. |
| 23 | Railcar location has changed from outside a geofence to inside a geofence, railcar is stationary and gate is open. | Not-logically possible. Conflicting event |
| 24 | Railcar location has changed from outside a geofence to inside a geofence, railcar is moving and gate is open. | Status Change - Still in Alarm condition - Geofence entry with gate unsecured |

The events, alarms and other indication in the above table are based on data collected by individual sensors and may not require any analysis other than the exceeding of a predetermined threshold (e.g., proximity of the magnet 138 to the WSNs 128). For example, a WSN 128 indicates a discharge gate open or closed event, which is transmitted to the CMU 170. The CMU 170 will complete an analysis using the railcar motion and location data.

For example, in the table above and in FIG. 8, Operational Status 5 indicates that a discharge gate valve 106 has changed from closed to open, the railcar 110 is stationary and is located outside a geofence. In this Operational Status 5, the discharge gate 106 is open outside of a geofence, which is not a common operating practice. It could indicate a failure to close the discharge gate 106 prior to departure from a rail yard. It could also indicate unauthorized access to the gate 106, such as in a theft. A high priority Alarm is transmitted.

For example, FIG. 8, Operational Status 6 indicates a discharge gate valve 106 has changed from closed to open, the railcar 100 is moving and is located outside a geofence. An open discharge gate 106 when a railcar 100 is moving and is located outside a geofence is regarded as a high priority type of event that requires an Alarm. When a railcar 100 begins to move, a WSN 128 samples the status of the discharge gate 106 to determine if the discharge gate 106 is in an open position. If the WSN 128 determines that the discharge gate 106 is open and the railcar 100 is moving, it then samples to determine where a railcar 100 is located in relation to a geofence. The CMU 170 starts a processing timer and immediately transmits an open discharge gate 100 notification to the PWG 176 or a remote operations center 178. If additional WSNs 128 generate an open discharge gate 106 event, the CMU 170 will raise the alert level to the highest level and transmit to a PWG and/or a remote operations center such as center 178 or servers 192. It is understood that the notification sent by the CMU 170 to the PWG 176 can be forwarded off train through a PWG 176, 182, or in some cases, the CMU 170 can communicate directly off train through a communication network 192 as seen in FIG. 3. An open discharge gate 106 on a moving railcar 100 may indicate a lapse in operational procedures or may indicate a discharge gate 106 was opened at a point in time by an authorized person and the discharge gate was not closed properly. The consequence of an open discharge gate 106 outside of a geofence is a potential loss of the contents of that particular hopper car.

For example, in FIG. 8, Operational Status 7 indicates a discharge gate 106 has changed from closed to open, the railcar 100 is not moving and is located inside a geofence. In this illustration, the railcar 100 is known to be in a location where opening of a discharge gate is acceptable, such as in a factory rail yard. The priority of this status event is given a lower priority than those described in other status levels. The event message generated can indicate the beginning of product unloading or if the duration of the open discharge gate state is within a predetermined period of time followed by a closed discharge gate state then a "Product sampling" event is transmitted. A standard operating practice is for product in a hopper car 100 to be sampled prior to the beginning of an unloading process, For example, in FIG. 8, Operational Status 8 indicates a discharge gate 106 has changed from closed to open, the railcar 100 is moving and is located inside a geofence. In this illustration, the railcar 100 is in a location where an open discharge gate is acceptable, such as in a factory rail yard. The result of the railcar 100 moving with an open discharge gate 106 will cause "gate chatter", therefore an "Unsecured Gate Chatter" event notification will be transmitted. The priority of this status event is given a lower priority than those described in other Status levels.

FIG. 9, based on the above table, illustrates the types of events triggered when railcar motion changes from moving to stationary or stationary to moving.

FIG. 10, based on the above table, illustrates the types of events triggered when a railcar 100 moves from inside a geofence to outside or move from outside a geofence to inside a geofence.

The operational status and the associated event to be determined may be different depending on the change in the particular parameters being sensed. For example, with reference to FIGS. 8-10, Operational Statuses 2, 10 and 18 all have the same gate status (closed), railcar motion (moving) and location (outside a geofence). Nevertheless, the operational status and events are different for all three based on the change that triggered the determination. In Operational Status 2, the gate changed from open to closed, in Operations Status 10 the railcar motion changed from stationary to moving, and in Operational Status 18 the geofence changed from inside to outside.

The proceeding events are all events that are detected by the sensors on the discharge gate 106 indicating whether the discharge gate is open or closed (e.g., WSNs 128), the motion detector 166 (e.g., accelerometer), and location sensor 168 (e.g., GPS). A change in the status of any one of these causes the CMU 170 to determine the event and if an alarm/alert is warranted. Similarly, a status inquiry can be requested from off train through the communication network 190 and the PWG as to the current status, for which the data is collected and the event determined as indicated above and then communicated back.

The alarm/alert algorithms include rules to include, but are not limited to, common operating practices related to discharge gate 106 operation inside a factory rail yard, when transiting between origin and destination and the operation of hopper cars 100.

CMU 170 preferably detects long term trends and keeps data regarding trends in the analysis of the gate activity. The total number of valid open and close reading statistics can be collected for every operating shaft being monitored by a WSN 128 in the railcar-based network 172.

The collected statistics may be used to calculate information that indicates discharge gate 106 activity trends. In some scenarios, a CMU 170 provides a report upon request of the following quantities for every operating lever 108a, 108b.

Average, minimum, maximum, standard deviation for times an operating lever 108a, 108b was moved over a period of time.

Average, minimum, maximum, standard deviation for distance an operating lever 108a, 108b was moved over a period of time.

Average, minimum, maximum, standard deviation for amount of time an operating lever 108a, 108b was in an open position over a period of time.

Average, minimum, maximum, standard deviation for amount of time an operating lever 108a, 108b was in a close position over a period of time.

Statistics can be used to improve the operations and cycle times of the commodities and railcars. Identifying time spent at each stage in the supply chain can help identify areas of improvement for decreasing unneeded time at each stage. Examples of stages include: duration of loaded railcar in transit, duration of loaded railcar storage at destination, time of product sampling, duration of unloading event, duration of unloaded railcar at destination, duration of unloaded railcar in transit, duration of railcar at inbound inspection, duration of unloaded railcar at origin, duration of loading event, duration of loaded railcar at origin.

Figure 11:
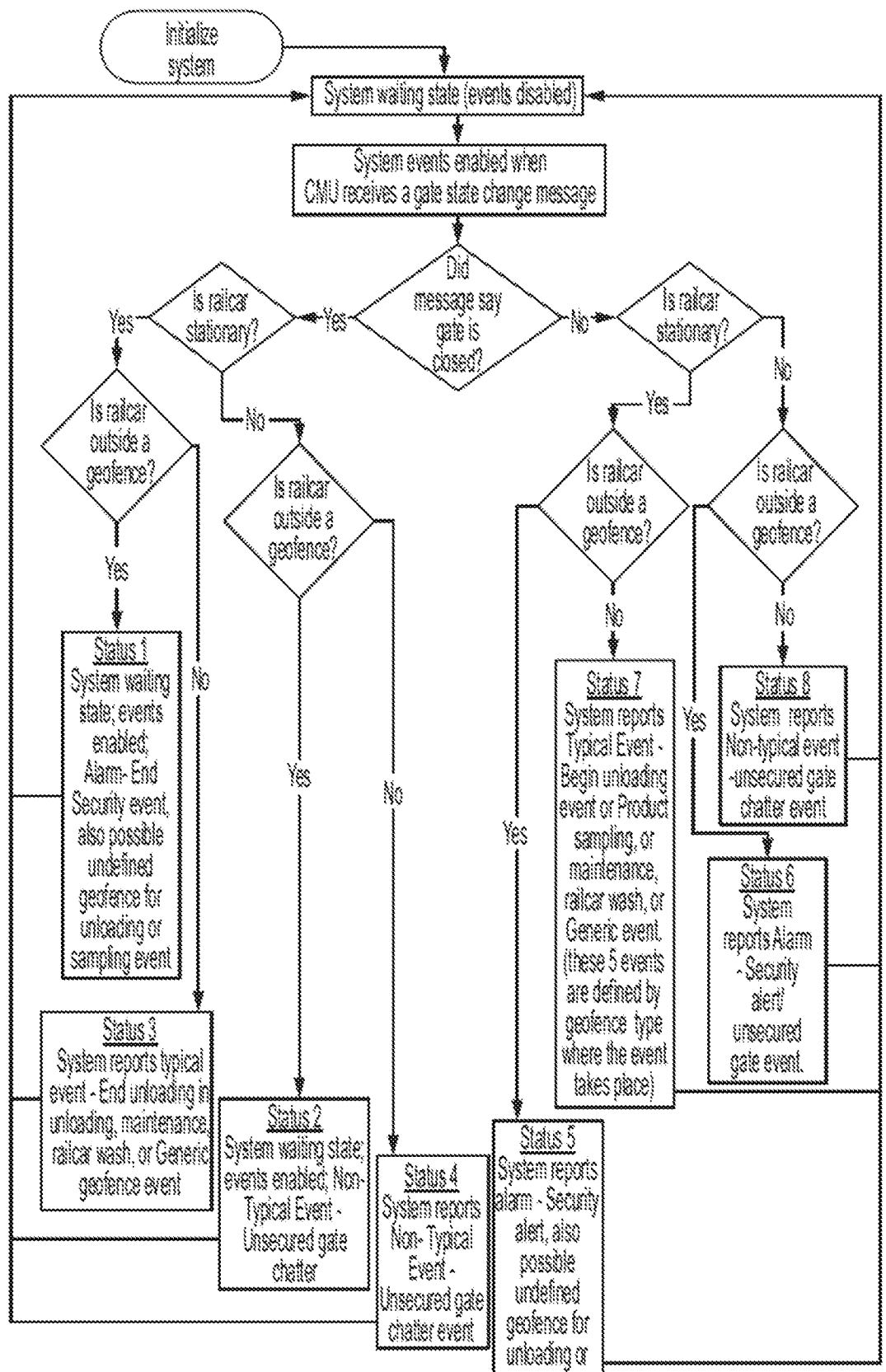
FIG. 11 provides a flow chart illustrating an implementation of the data analysis portion by data collection unit(s) (e.g., a CMU and/or a WSN) based on discharge gate status.
Figure 12:
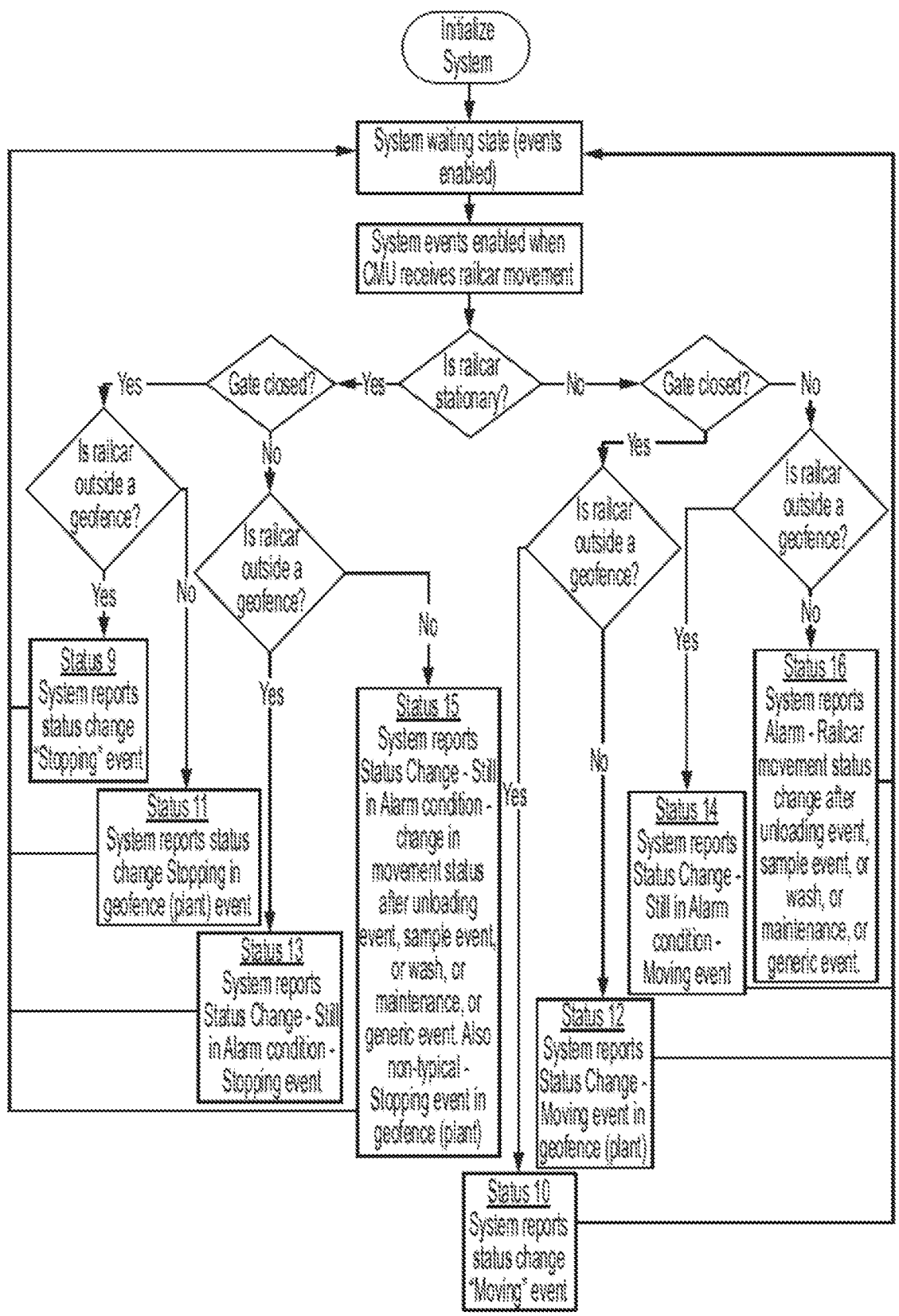
FIG. 12 provides a flow chart illustrating an implementation of the data analysis portion by data collection unit(s) (e.g., a CMU and/or a WSN) based on railcar movement status.
Figure 13:
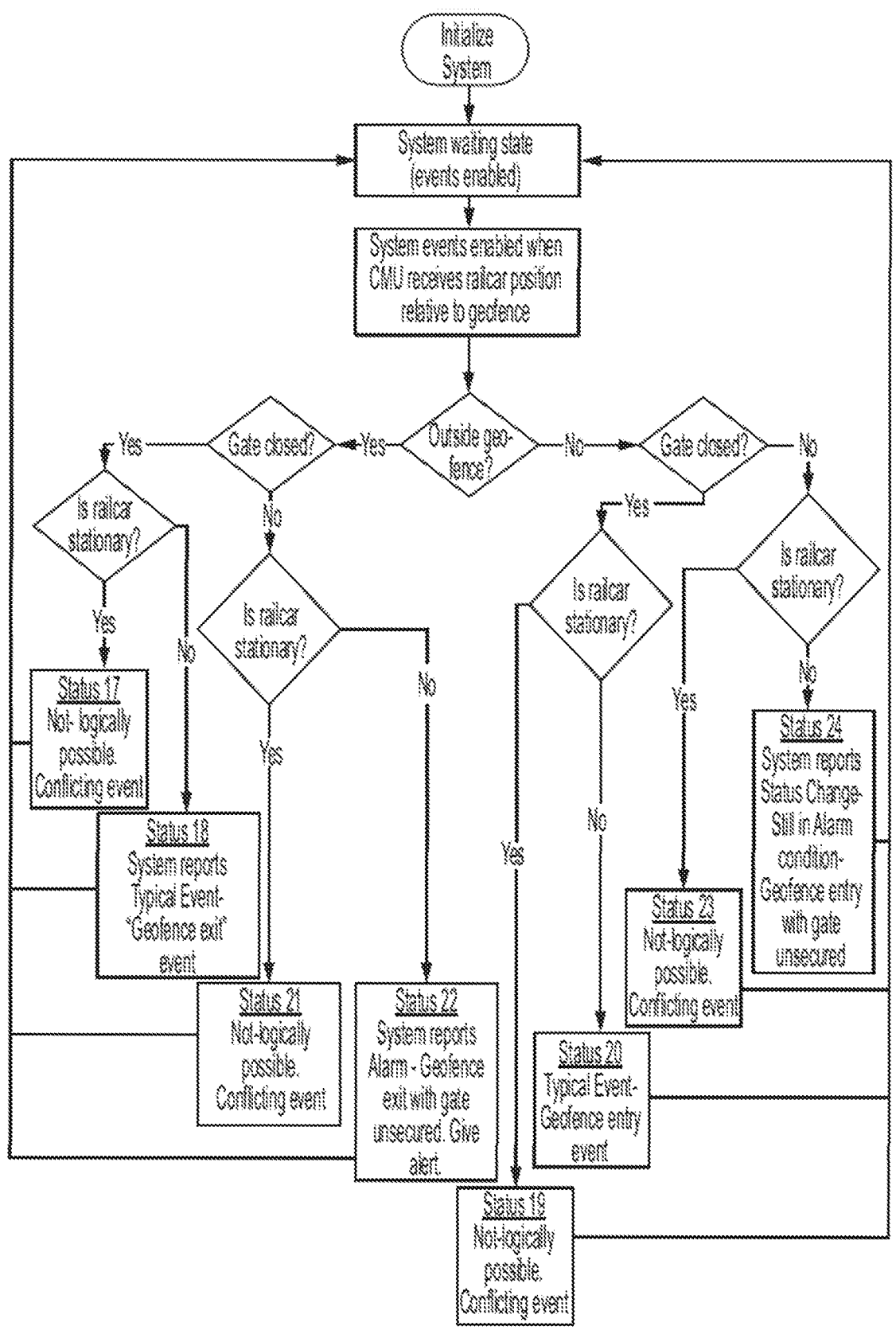
FIG. 13 provides a flow chart illustrating an implementation of the data analysis portion by data collection unit(s) (e.g., a CMU and/or WSN) based on railcar location relative to a geofence.
Figure 14:
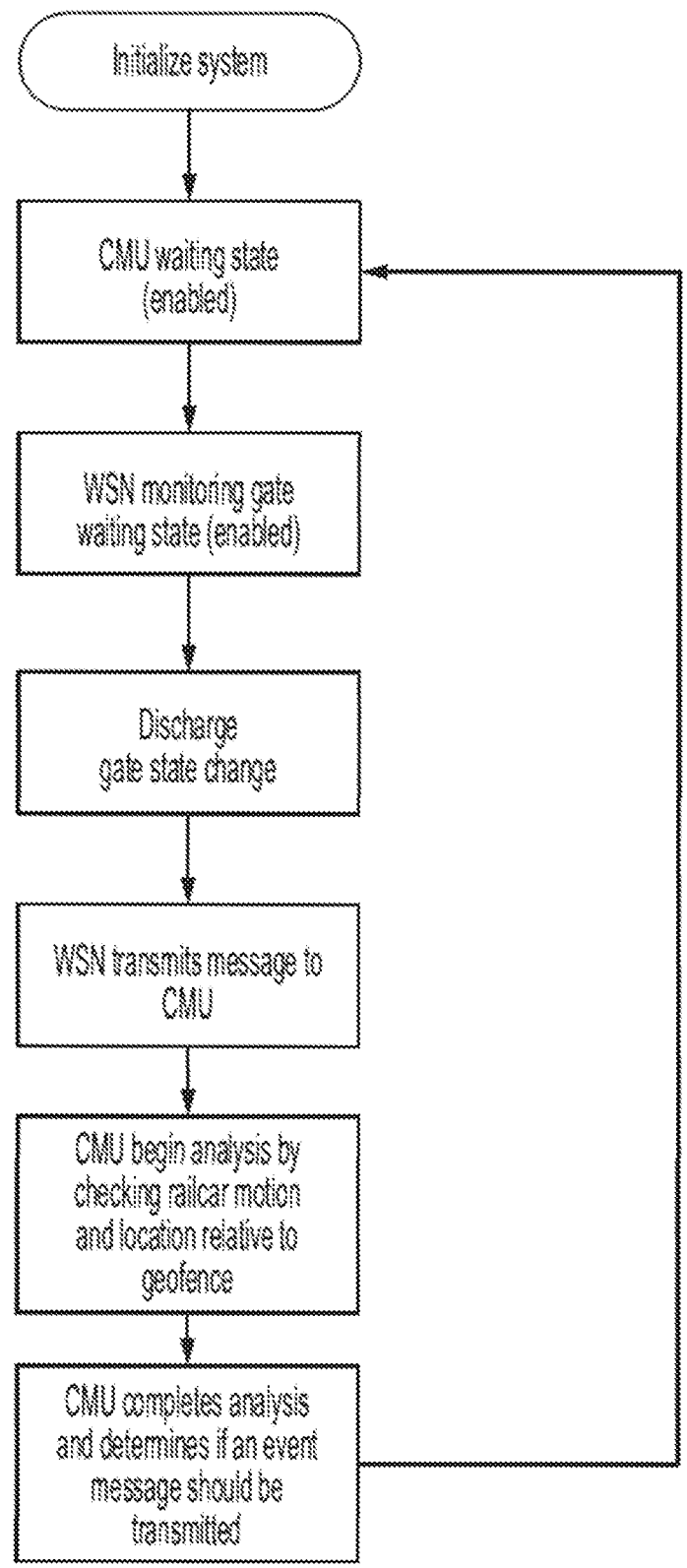
FIG. 14 provides a flow chart illustrating a decision making process from the WSN open or close event message to the data analysis of a data collection unit (e.g., a CMU).

FIG. 11 provides a flow chart illustrating an illustrative implementation of the data analysis portion by the CMU 170 and WSNs 128 based on discharge gate status (the figures also use the term "gate" to refer to the discharge gate). FIG. 12 provides a flow chart illustrating an illustrative implementation of the data analysis portion by the CMU 170 and WSNs 128 based on railcar movement status. FIG. 13 provides a flow chart illustrating an illustrative implementation of the data analysis portion by the CMU 170 and WSNs 128 based on railcar location relative to a geofence. FIG. 14 provides a flow chart illustrating an illustrative decision making process from a WSN 128 open or close event message to the data analysis of the CMU 170.

To summarize, systems, assemblies, and methods have been described for monitoring and detecting events related to valves (e.g., the discharge gates 106 and/or the outlet valve 184) and/or passageways 124 (e.g., hatches and/or manways) of a railcar 100 and the commodity carried by the railcar. The present solution carries this out by monitoring (i) the status of the valve(es) (e.g., discharge gate, and/or outlet valve) and/or passageway (e.g., a hatch and/or manway) (e.g., open or closed), (ii) railcar movement (e.g., stationary or moving), and (iii) railcar location (e.g., is the railcar in an area, such as a programmed geofence, where it is acceptable for the valve and/or passageway to be open). The CMU 170 or WSN 128 collects the data, makes determinations as to whether an event has occurred, and makes determinations as to whether or not such event merits an alarm or other action. Such events for discharge gates are illustrated in the table above and in FIGS. 8-10. The same such events can be applied to outlet valves and hatches.

The train consist 102 has a train-based network 174 overlaid thereon and includes the PWG 176 that manages the train-based network 174 and receives alerts from the CMUs 170 on the individual railcars 100. The PWG 176 is capable of forwarding alarms and other information from the CMUs 170 or WSN 128 concerning the valves and/or passageways off train to external remote railroad operations center 178, data systems 192 or other train management systems. Alternatively, the PWG 176 can forward the information to the host or control point, such as the locomotive 104, where the alerts or event reports may be acted upon via human intervention, or by an automated system. Locomotive 104 may include a user interface for receiving and displaying alert messages.

Figure 16:
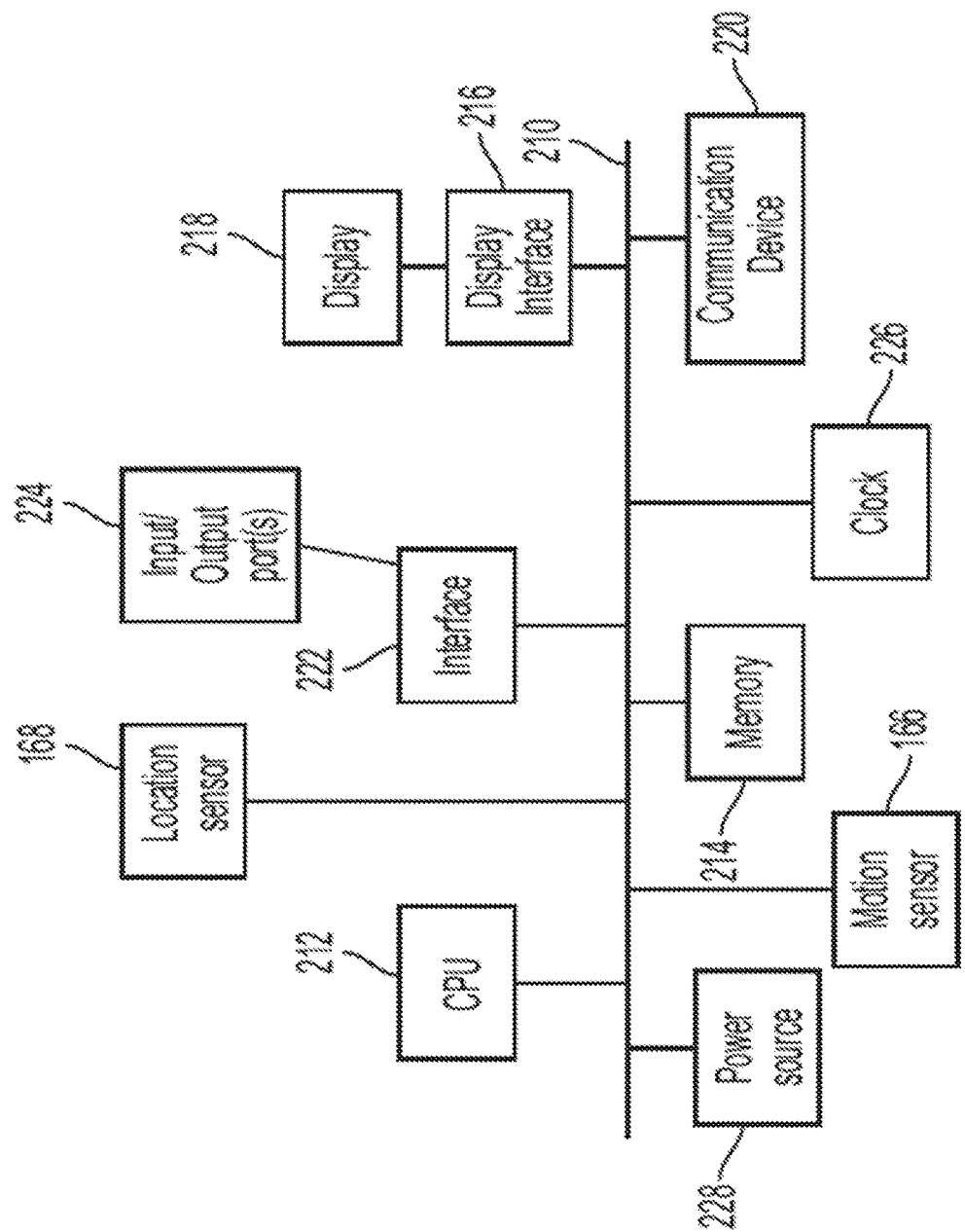
FIG. 16 provides illustrative internal hardware that may be included in any of the electronic components of a system.

FIG. 16 provides an illustration of illustrative internal hardware that may be included in any of the electronic components of the system, such as, for example, a CMU (e.g., CMU 170), a PWG (e.g., PWG 176), or a remote computing device in the system. An electrical bus 210 serves as an information highway interconnecting the other illustrated components of the hardware. Processor 212 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a CPU, a Graphics Processing Unit (GPU), a remote server, or a combination of these.

Read Only Memory (ROM), Random Access Memory (RAM), flash memory, hard drives, and other devices capable of storing electronic data constitute examples of a computer-readable storage medium device 214. The terms "memory," "memory device," "data store," "data storage facility" and the like each refer to a non-transitory device or storage medium on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. Various embodiments of the invention may include a computer-readable storage medium containing programming instructions that are configured to cause one or more processors, or other devices to perform the functions described in the context of the previous figures.

An optional display interface 216 may permit information from the bus 210 to be displayed on a display device 218 in visual, graphic or alphanumeric format. An audio interface and audio output (such as a speaker) also may be provided. Communication with external devices may occur using various communication devices 220 such as a wireless antenna, an RFID tag and/or short-range or near-field communication transceiver, each of which may optionally communicatively connect with other components of the device via one or more communication system. The communication device(s) 220 may be configured to be communicatively connected to a communications network, such as the Internet, a local area network, radio network, satellite or a cellular telephone data network.

The hardware may also include an interface sensor 222 that allows for receipt of data from one or more input ports and/or input devices 224 such as a keyboard, a mouse, a joystick, a touchscreen, a touch pad, a remote control, a pointing device and/or microphone. The interface sensor 222 may allow for provision of data via one or more output ports and/or output devices 224.

The hardware may include a power source 228, such as for example, a battery. The hardware may also include a clock 226 such as, for example, a system clock, a CPU clock and/or the like. The hardware may include a motion sensor 166, such as, for example, an accelerometer. In various embodiments, the hardware may include a location sensor 168, such as, for example, a GPS-enabled device.

Figure 18:
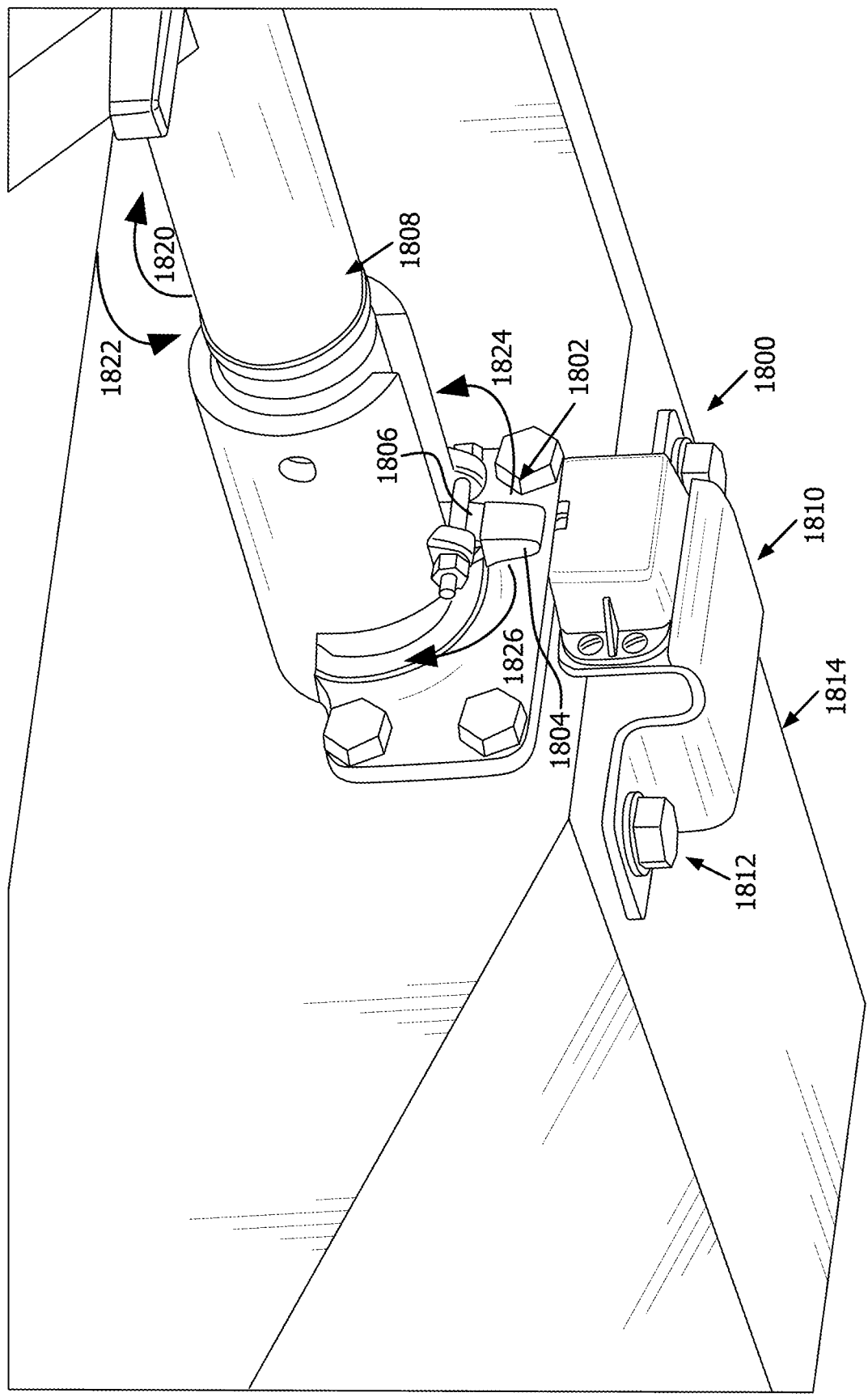
FIG. 18 provides an illustration of an actuator and a data collection unit (e.g., a WSN) coupled to an outlet valve.
Figure 19:
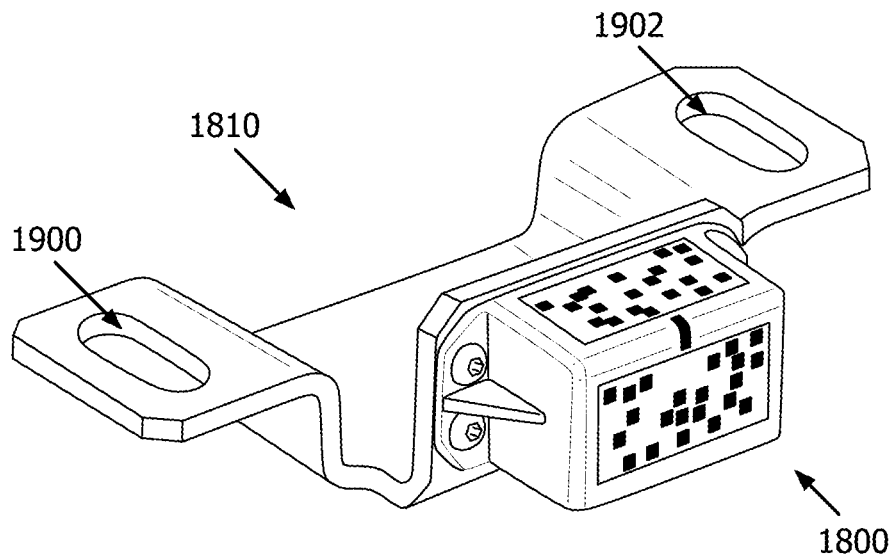
FIG. 19 provides an illustration of an illustrative data collection device assembly.
Figure 20A:
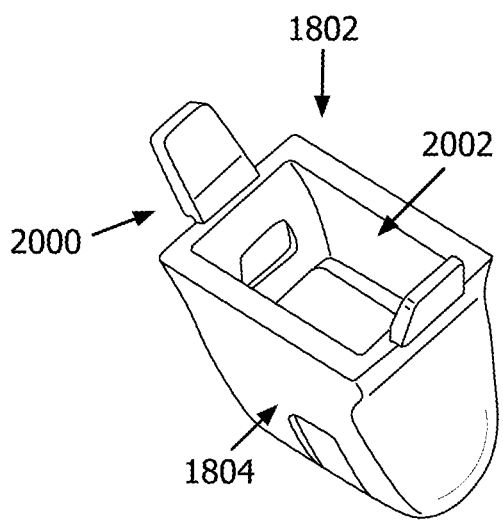
FIGS. 20A-20D (collectively referred to as "FIG. 20") provide illustrations of an illustrative actuator.
Figure 20B:
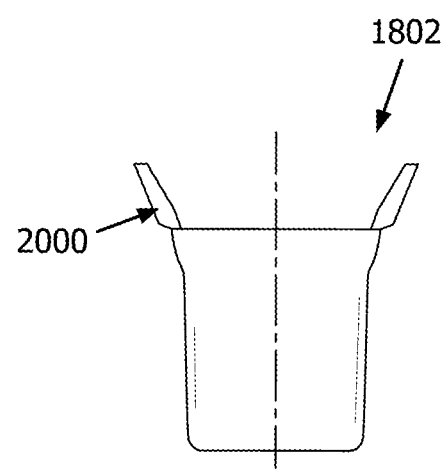
Figure 20C:
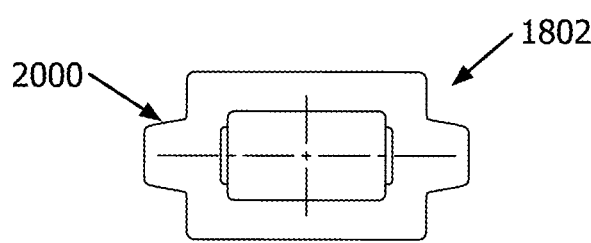
Figure 20D:
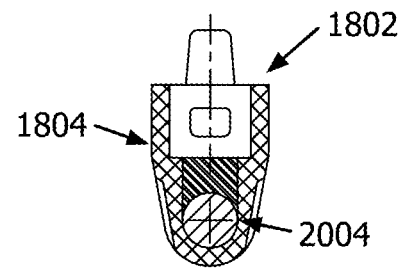

Referring now to FIGS. 18-20, systems and methods for detecting a status of an outlet valve (e.g., outlet valve 184 of FIG. 1 and/or 1700 of FIG. 17) will be described in more detail. The status detection feature of the present solution has many advantages. For example, railcar owners, railcar fleet manager and/or hazardous commodities shipping companies could use the present solution to (i) add security against theft and vandalism to railcar transport of valuable and hazardous commodities, and/or (ii) add safety against spills and unauthorized railcar tank access to the railcar transport of hazardous commodities.

The status detection is achieved using a WSN 1800 and an actuator 1802 installed on the outlet valve as shown in FIG. 18. WSN 1800 can be the same as or substantially similar to WSN 128 described above. WSN 1800 is coupled to the outlet valve via a bracket 1810 and mechanical couplers 1812 (e.g., bolts, screws, washers and/or nuts). Actuator 1802 comprises a sensor magnet (e.g., magnet 2004 visible in FIG. 20D) disposed and secured within a housing 1804. The sensor magnet is the same as or substantially similar to the complementary sensor magnet 138 described above. The housing 1804 is sized and shaped to receive a position indicator 1806 of the outlet valve. Position indicators are well known in the art for indicating whether the outlet valve is in an open position or a closed position. The position indicator is shown as comprising a structure coupled to (or integrally formed with) and protruding out from an operative component (e.g., shaft) of the outlet valve. Thus, the position indicator moves with the operative component when being used to open or close the outlet valve. The WSN 1800 and actuator 1802 are aligned with each other so that changes in a position of the sensor magnet relative to the WSN 1800 can be detected. As the operative component (e.g., shaft) 1808 of the outlet valve is rotated (e.g., via a handle 1702 of FIG. 17), the actuator 1802 rotates away from and towards the WSN 1800 depending on whether the outlet valve is being opened or closed. For example, rotation of the shaft 1808 in a clockwise direction causes the outlet valve to open and the WSN 1800 to be in a magnetically neutral sensing condition. Rotation of the shaft 1808 in a counterclockwise direction causes the outlet valve to close and the WSN 1800 to be in a magnetically polarized sensing condition. The status of the outlet valve can be detected based on the proximity of the actuator 1802 to the WSN 1800. The WSN's sensing condition remains magnetically polarized while the sensor magnet is in close proximity to the WSN. The WSN's sensing condition remains neutrally polarized while the sensor magnet is distant to the WSN. Reed switch technology can be used to accomplish the magnetic polarization field proximity sensing function.

The WSN 1800 and an actuator 1802 are described herein as implementing magnetic polarization proximity sensing technology. The present solution is not limited in this regard. Orientation sensing technology can additionally or alternatively be employed to detect changes in the state of the outlet valve. Orientation sensing technology could facilitate a reduction in components and/or overall size of the detection system, as well as an easier installation process.

Figure 21:
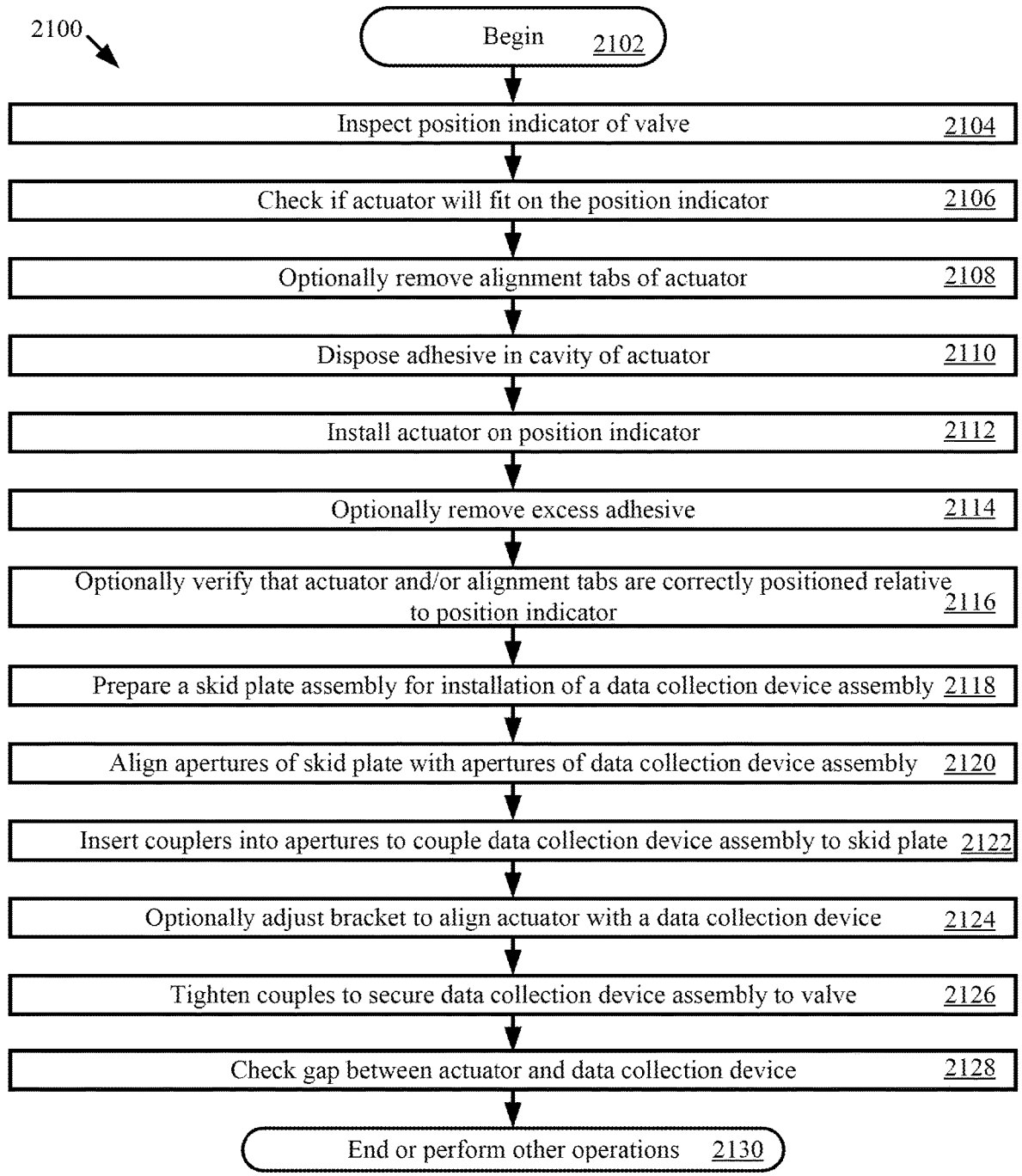
FIG. 21 provides a flow diagram of an illustrative method for installing a data collection device assembly and an actuator on an outlet valve.

Referring now to FIG. 21, there is provided a flow diagram of an illustrative method 2100 for installing WSN 1800 and actuator 1802 on an outlet valve (e.g., outlet valve 184 of FIG. 1 and/or 1700 of FIG. 17). Method 2100 provides a safe and efficient installation process (e.g., in an explosive environment) in which the components 1800 and 1802 do not interfere with safe and efficient railcar operation and maintenance. The components 1800 and 1802 are installed without drilling or welding. In this regard, the bracket 1810 provides a means to securely and/or permanently mount the WSN 1800 to a surface of the outlet valve's roll over skid plate 1814. An adhesive is used to mount the actuator 1802 to a tip of the outlet valves position indicator 1806.

Figure 22:
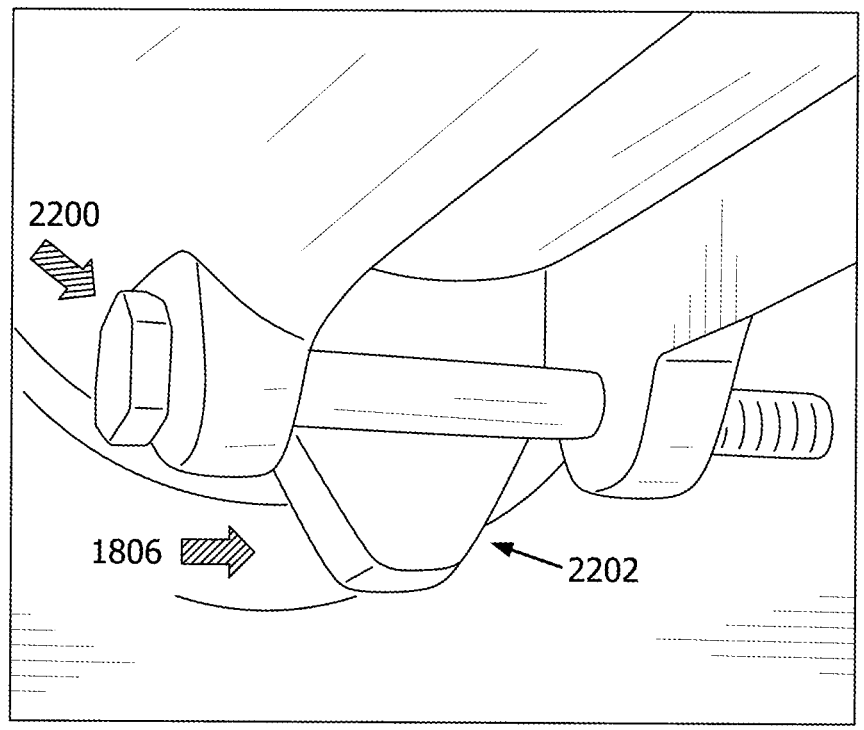
FIGS. 22-33 provide illustrations that are useful for understanding how a data collection device assembly and an actuator are installed on an outlet valve.

As shown in FIG. 21, method 2100 begins with 2102 and continues with 2104 where an individual visually inspects a position indicator (e.g., position indicator 1806 of FIG. 18) of the outlet valve. For example, with reference to FIG. 22, the individual ensures that a hex bolt 2200 of the outlet valve is in place and that the position indicator 1806 is located behind the hex bolt 2200. The individual also prepares a tip 2202 of the position indicator for attachment of the actuator 1802 thereto. A wire brush and isopropyl wipes can be used to remove any oil, paint, rust or other contaminates from the position indicator.

Figure 23:
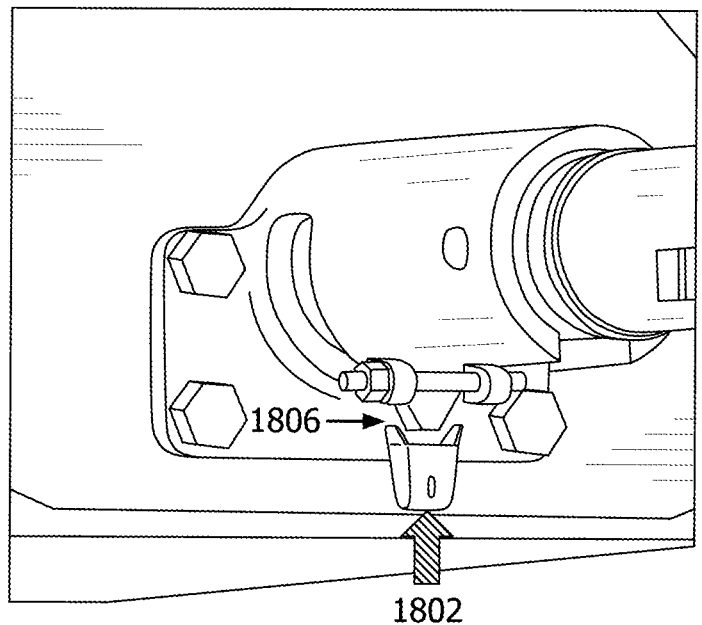
Figure 24:
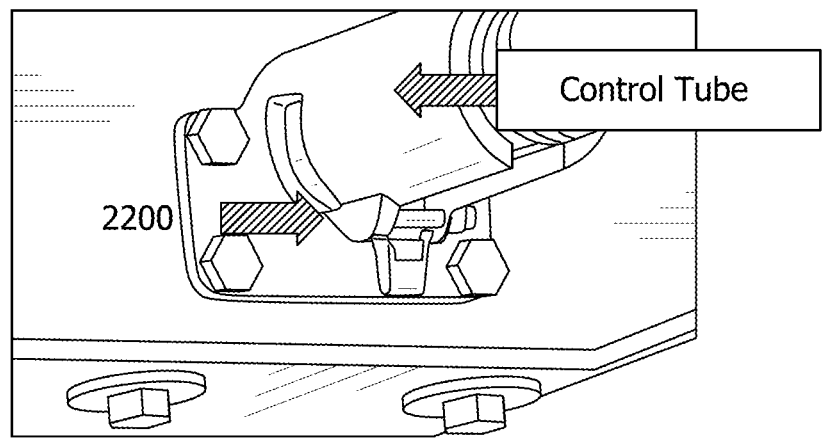
Figure 25:
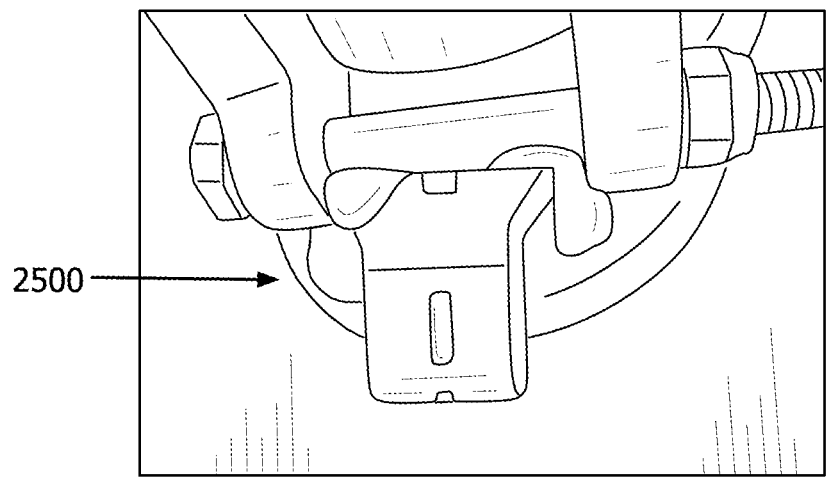

In 2106, the individual checks whether the actuator 1802 will fit on the position indicator. Notably, the actuator 1802 may comprise one or more alignment tabs 2000 as shown in FIG. 20. The alignment tabs 2000 can be optionally removed in 2108 from the actuator 1802, for example, when the alignment tabs 2000 interfere with operation of one or more other parts of the outlet valve. Next, in 2110, an adhesive is disposed in a cavity 2002 of the actuator 1802. The actuator 1802 is then slid onto or otherwise installed on the outlet valve's position indicator in 2112. An illustration showing the actuator 1802 being installed on the position indicator 1806 is provided in FIG. 23. An illustration showing the actuator 1802 installed on the position indicator 1806 is provided in FIG. 24. In 2114, any excess adhesive is removed. An illustration of excess adhesive 2500 that is to be removed from the assembly is provided in FIG. 25.

Figure 26:
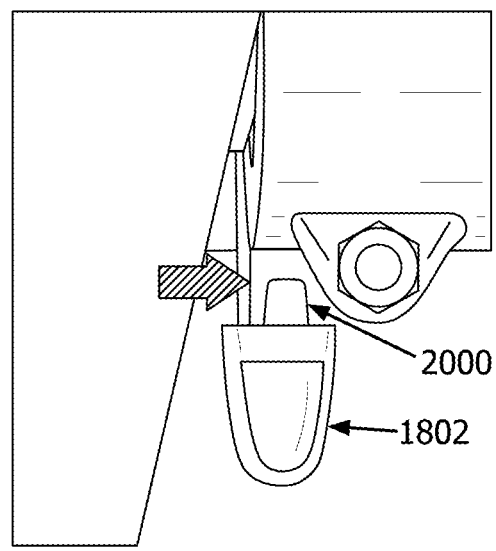

Method 2100 may include optional 2116. In 2116, the individual verifies that the actuator 1802 and/or alignment tabs 2000 are properly positioned relative to the outlet valve's position indicator 1806. For example, the individual can verify that (i) the actuator 1802 is lined-up and/or centered on the position indicator 1806, (ii) the alignment tabs 2000 are lined-up and/or centered on the position indicator 1806, and/or (iii) the alignment tabs 2000 are not interfering with one or more other parts of the outlet valve. An illustration showing properly positioned actuator 1802 and/or alignment tabs 2000 is provided in FIG. 26.

Figure 27:
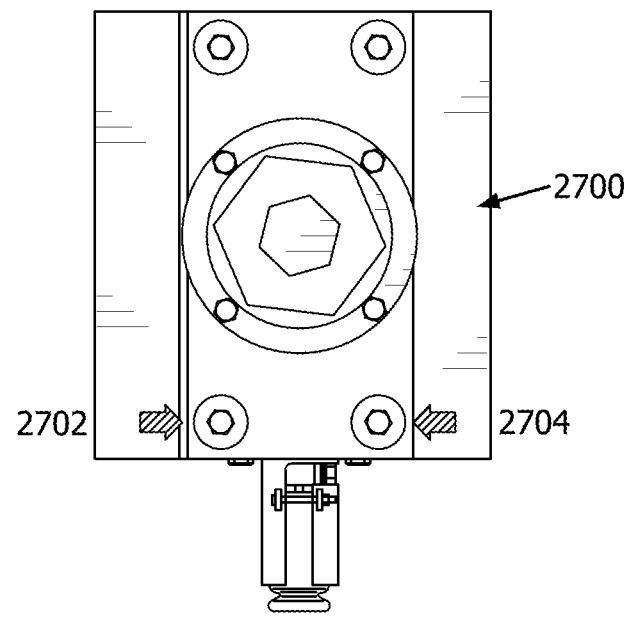

In 2118, a skid plate assembly of the outlet valve is prepared for installation of a data collection device assembly. The data collection device assembly includes, but is not limited to, the WSN 1800 and bracket 1810. 2118 can involve: removing bolts or other mechanical couplers from the skid plate assembly; and cleaning an area where the bolts or other mechanical couplers were removed from (e.g., using a wire brush) to remove rust, excess paint, dirt and/or other contaminate from a surface of the skid plate assembly. An illustration is provided in FIG. 27 that shows bolts 2702 and 2704 that are to be removed from a skid plate assembly 2700. Skid plate assemblies of outlet valves are well known in the art.

Figure 28:
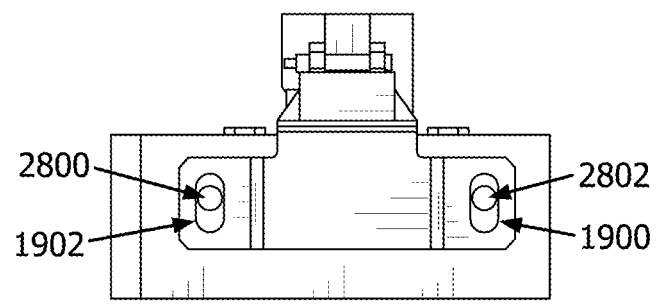
Figure 29:
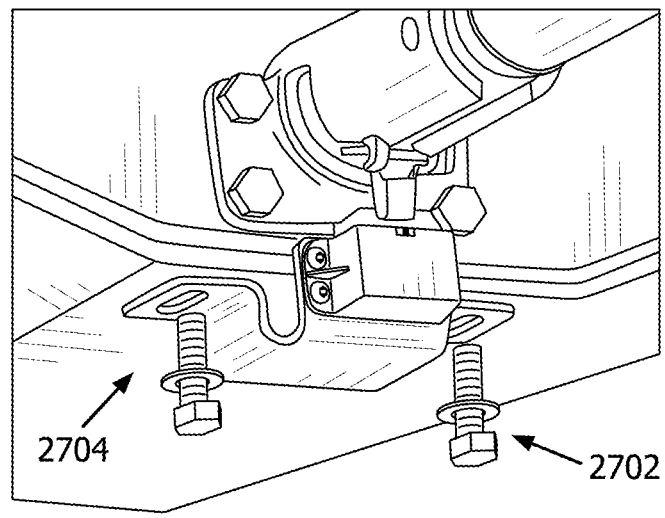

In 2120, apertures of the skid plate assembly are aligned with apertures of the data collection device assembly. An illustration is provided in FIG. 28 that shows apertures 2800, 2802 of the skid plate assembly aligned with apertures 1900, 1902 of the data collection device assembly. Next in 2122, the bolts or other mechanical couplers are inserted into the apertures for coupling the data collection device assembly to the skid plate assembly. An illustration is provided in FIG. 29 that shows the bolts 2702, 2704 being inserted into apertures of the data collection device assembly and skid plate assembly.

Figure 30:
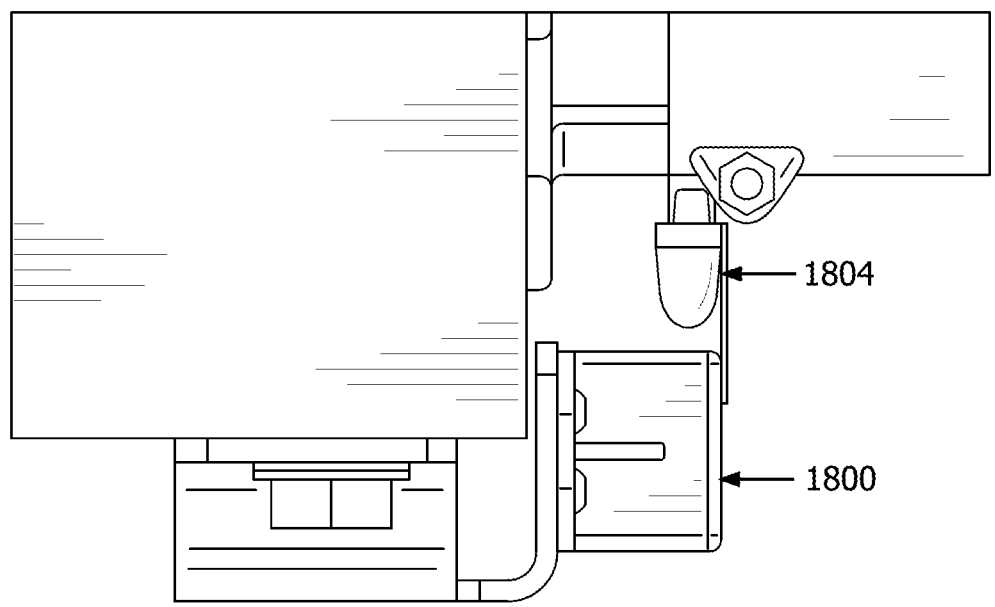
Figure 31:
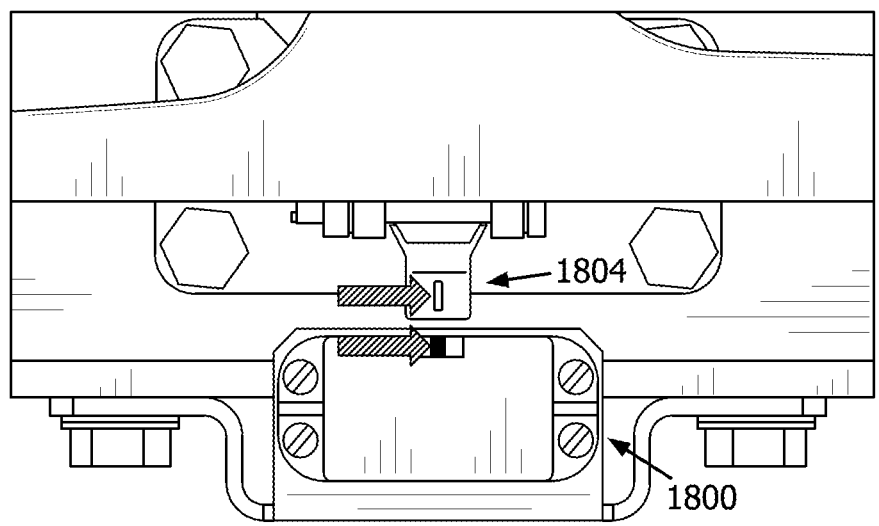

In 2124, the position of the bracket relative to the outlet valve is optionally adjusted to align the actuator with a data collection device of the data collection device assembly. The data collection device can include, but is not limited to, the WSN 1800. Illustrations are provided in FIGS. 30-31 that show the WSN 1800 aligned with the actuator 1804 in accordance with a given application.

Figure 32:
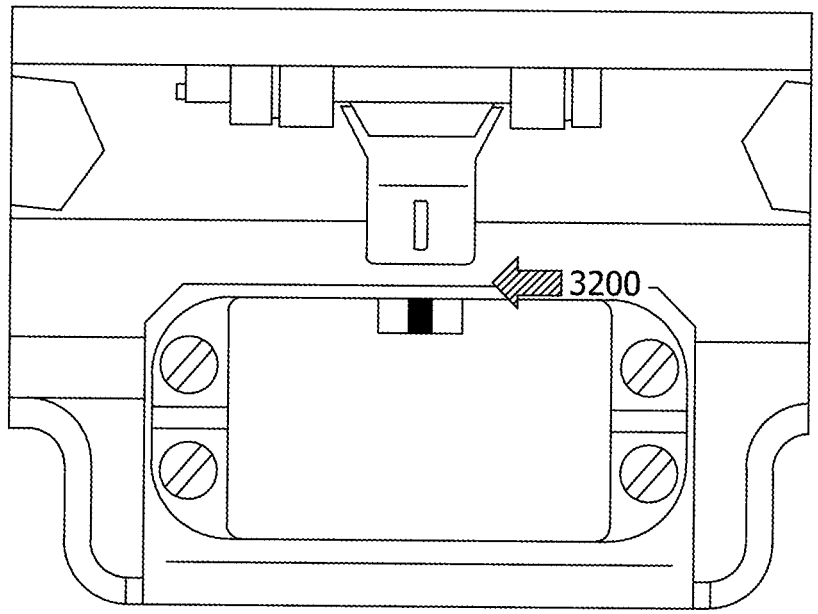
Figure 33:
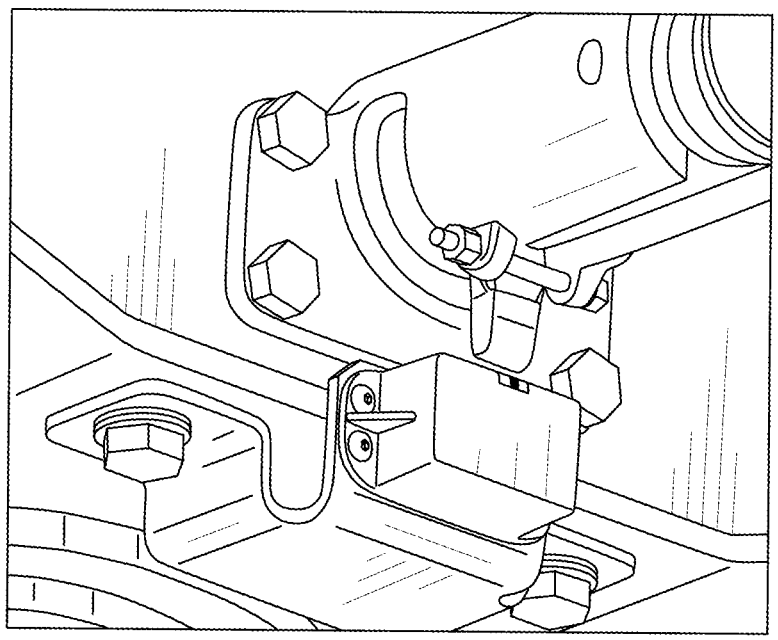

In 2126, the bolts or other mechanical couplers are tightened to the skid plate assembly, whereby the data collection device assembly is securely coupled to the outlet valve. In 2128, the individual may measure a gap between a tip of the actuator and an edge of the data collection device. An illustration of a gap 3200 is provide in FIG. 32. If the gap 3200 is larger than a first threshold distance or less than a second threshold distance, then the individual can take one or more remedial measures. The remedial measures can include, but is not limited to, notifying an entity or other person, and/or replacing the data collection device assembly with another data collection device assembly. If the gap 3200 is smaller than the first threshold distance or greater than the second threshold distance, then the data collection device assembly is considered properly installed. An illustration is provided in FIG. 33 showing a properly installed data collection device. Subsequently, 2130 is performed where method 2100 ends or other operations are performed.

It should be noted that a distance between the data collection unit 1800 and the actuator 1802 increases and decreases when the operative component (e.g., shaft) 1808 of the outlet valve is actuated (e.g., rotated in the clockwise direction 1820 and counterclockwise direction 1822), respectively. This is because the position indicator 1806 moves (e.g., rotates) with the operative component (e.g., shaft) 1808, which in turn causes the actuator to move (e.g., rotate) away from and towards the data collection unit (as shown by arrows 1824, 1826 of FIG. 18). In this way, the data collection unit transitions between the magnetically neutral condition since the magnet is not proximate thereto and the magnetically polarized condition since the magnet is proximate thereto.

Figure 35:
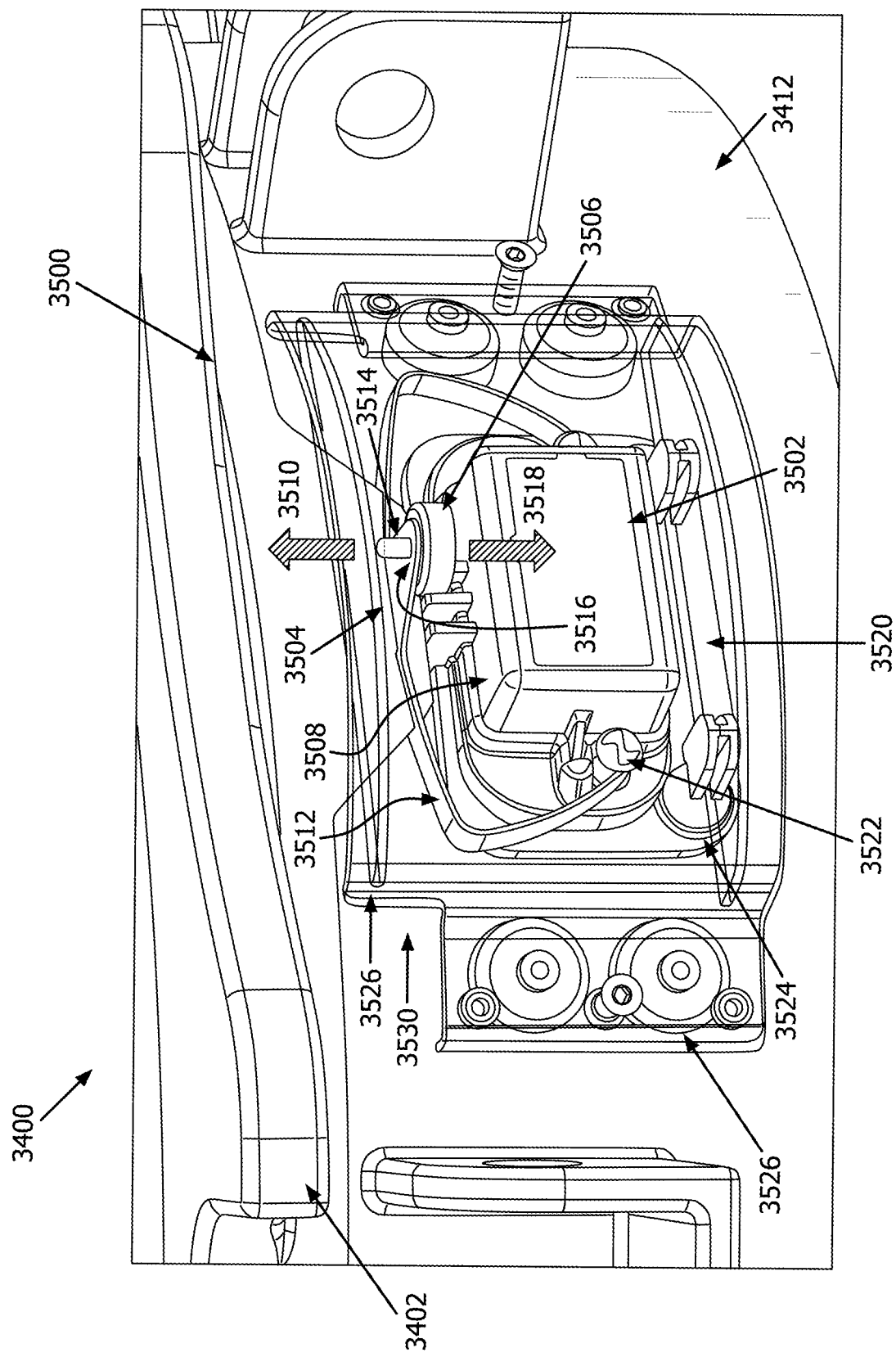
FIG. 35 provides an illustration of a data collection device assembly coupled to a manway port's nozzle.

Referring now to FIG. 35, there is provided an illustration of an illustrative data collection device assembly 3500 coupled to the manway 3400 of FIG. 34. The data collection device assembly 3500 comprises a WSN 3502 and an actuator 3504. WSN 3502 is the same as or similar to WSN 128 of FIG. 1 and/or WSN 1800 of FIG. 18. The discussion provided above for WSNs 128, 1800 are sufficient for understanding WSN 3502. Generally, WSN 3502 is configured to automatedly periodically or continually determine a status of the manway 3400 (e.g., open or close), report the status to the CMU and/or one or more remote devices. The CMU will report the status to one or more remote devices (e.g., remote railroad operations center 178 of FIG. 3 and/or remote server(s) 192 of FIG. 3) via network communications, and/or cause the manway's status to be stored in a datastore (e.g., datastore 102 of FIG. 3 and/or memory 214 of FIG. 16).

The WSN 3502 determines the status of the manway 3400 using proximity detection technology. For example, the WSN 3502 uses magnetic field sensing technology to determine a difference between binary positions (open or close) of cover 3402. The WSN 3502 determines that the cover 3402 is open when a magnet 3506 of the actuator 3504 is not in proximity to a sidewall 3508 of the WSN (as shown in FIG. 35). At this time, the WSN 3502 is in a magnetically neutral state. The WSN 3502 determines that the cover 3402 is closed when magnet 3506 of the actuator 3504 is in proximity to the sidewall 3508 of the WSN (not shown in FIG. 35). At this time, the WSN 3502 is in a magnetically polarized state.

The magnet 3506 is normally resiliently biased in direction 3510 away from the WSN by a resilient member 3512. As such, the magnet 3506 is resiliently biased in a distal position that is not in proximity to the WSN as shown in FIG. 35. The magnet 3506 is moved into a proximal position (i.e., is moved in proximity to the WSN) when the magnet is pushed in a direction 3518 towards the WSN by the cover 3402 (e.g., as the cover is being closed). The magnet 3506 automatically returns to its distant position when the cover 3402 is lifted away from the manway's nozzle (e.g., as the cover is being opened). Resilient member 3512 can include, but is not limited to, a leaf spring. The magnet 3506 is coupled to the resilient member 3512 via a coupler 3514. Coupler 3514 can include, but is not limited to, a threshold screw or bolt that threadingly engages a threaded aperture 3516 of the resilient member 3512 and/or the magnet 3506.

A support structure 3520 is provided to mechanically support and maintain the WSN 3502 and actuator 3504 in a given position relative to each other, while allowing the magnet 3506 to be transitioned between a distal position and a proximal position. The WSN is coupled to the support structure 3520 via an adhesive and/or a mechanical coupling means (not visible in FIG. 35) (e.g., a snap-fit coupling means or other interlocking mechanism). The resilient member 3512 of the actuator 3504 is coupled to the support structure 3520 via mechanical couplers 3522 (e.g., screws). The support structure 3520 can be formed of any suitable material such as a metal or a plastic.

The support structure 3520 comprises various components to facilitate a relatively strong and durable mounting of the same to the manway's nozzle 3412 without any drilling or welding. These components comprise one or more magnets 3524. The magnet(s) 3524 retain(s) the support structure 3520 in a given position relative to the nozzle 3412 while an adhesive cures. The adhesive can include, but is not limited to, an epoxy. The adhesive is applied to a bottom surface of the support structure 3520 to also facilitate the relatively strong, durable and permanent coupling between components 3412, 3520.

A cover 3526 is provided to protect the WSN 3502, actuator 3504 and support structure 3520. The cover 3526 may be coupled to the support structure 3520 via a tether (not shown in FIG. 35). The cover 3526 comprises a plurality of magnets 3526 to facilitate a securement of the cover to the manway's nozzle 3412. The cover 3526 may also be designed such that it interlocks with the support structure 3520 when both are mounted on the manway's nozzle 3412. The cover 3526 can be formed of any suitable material such as a metal or a plastic. The cover 3526 is designed such that at least a gap 3530 is provide between top portion thereof and the manway's nozzle 3412 for allowing the cover 3402 to engage the coupler 3514 for pushing the magnet 3506 towards the WSN 3502 when being closed.

The present solution is not limited to the architecture of the data collection device assembly 3500 shown in FIG. 35. In other scenarios, the magnet 3506 is mounted to the cover 3402 rather than the nozzle 3412. The magnet 3506 is placed in proximity to the WSN 3502 via closure of the cover and is moved away from the WSN via opening of the cover.

Figure 36:
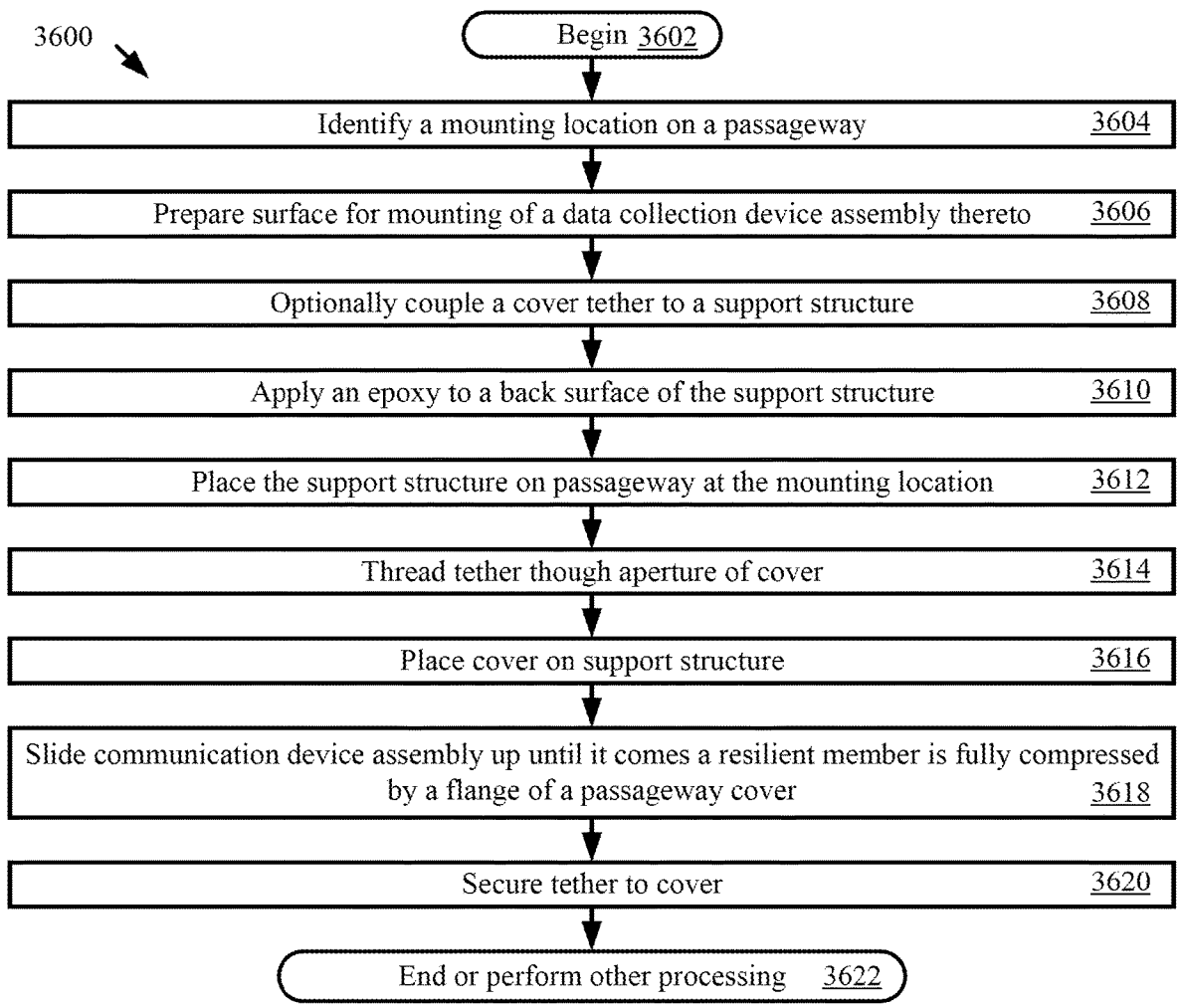
FIG. 36 provides a flow diagram of an illustrative method for installing a data collection device assembly on a passageway (e.g., a manway).

Referring now to FIG. 36, there is provided a flow diagram of an illustrative method for installing a WSN 1800 and actuator 1802 on a passageway (e.g., a hatch and/or manway 3400 of FIG. 34). Method 3600 provides a safe and efficient installation process (e.g., in an explosive environment) in which the data collection device assembly 3500 does not interfere with safe and efficient railcar operation and maintenance. The data collection device assembly 3500 is installed without drilling or welding. In this regard, the support structure 3520 provides a means to securely and/or permanently mount at least the WSN 1800 to a surface of the manway's nozzle without requiring any drilling or welding.

Figure 37:
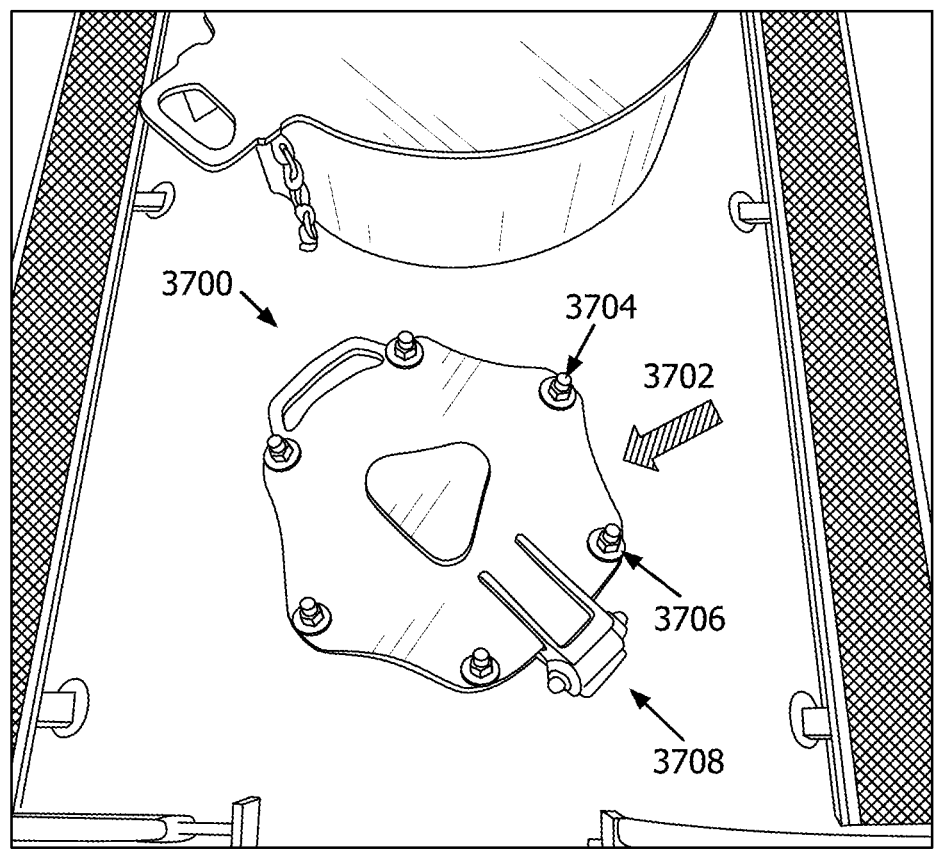
FIGS. 37-46 provide illustrations that are useful for understating how a data collection device assembly is installed on a passageway (e.g., a manway).
Figure 38:
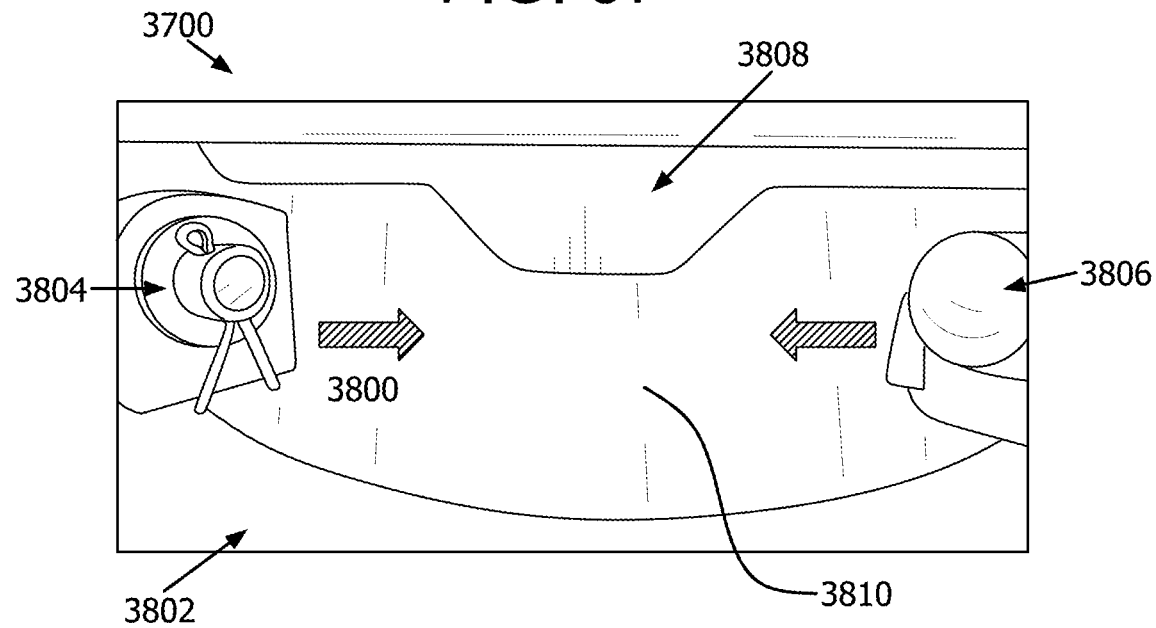

As shown in FIG. 36, method 3600 begins with 3602 and continues with 3604 where an individual identifies a mounting location on the passageway. An illustration is provided in FIG. 37 of such a suitable mounting location 3702 on a passageway 3700. The mounting location resides on a nozzle (not visible in FIG. 37) between cover bolts 3704, 3706 and adjacent to a cover hinge 3708. The present solution is not limited in this regard. An alternative mounting location 3800 is shown in FIG. 38. This alternative mounting location 3800 resides on the nozzle 3802 between cover bolts 3804, 3806 and adjacent to a cover handle 3808.

Next in 3606, a surface of the nozzle is prepared for mounting of the data collection device assembly thereto. For example, surface 3810 of FIG. 38 is cleaned using a wire brush and/or isopropyl alcohol wipes to remove any oil, dirt, rust and/or other contaminants therefrom.

Figure 39:
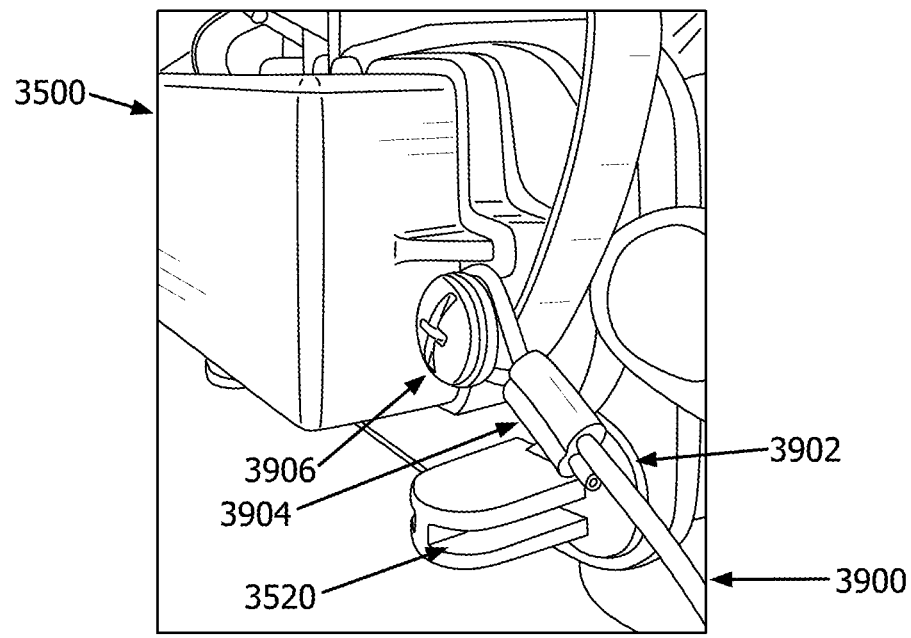

In 3608, a cover tether is optionally coupled to a support structure of the data collection device assembly. Alternatively, the cover tether could be coupled to a base bracket. An illustration showing a tether 3900 being coupled to the support structure 3520 of the data collection device assembly 3500 is provided in FIG. 39. This coupling may be achieved by: threading a wire rope 3902 through a first aperture of a ferrule 3904, around a post of a mechanical coupler 3906, and through a second aperture of the ferrule 3904; crimping the ferrule 3904 so that the wire rope 3902 cannot be removed therefrom; and tightening the mechanical coupler 3906.

Figure 40:
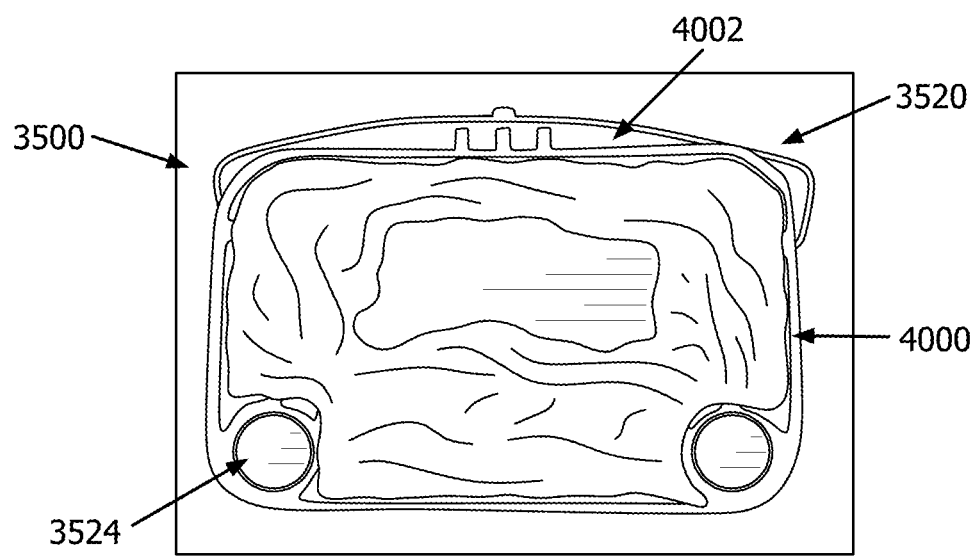

In 3610, an epoxy is disposed on a back surface of the data collection device assembly's support structure. An illustration is provided in FIG. 40 showing an adhesive 4000 (e.g., an epoxy) applied to a back surface 4002 of the support structure 3520. Notably, the adhesive is applied so that the magnets 3524 are not covered thereby.

Figure 41:
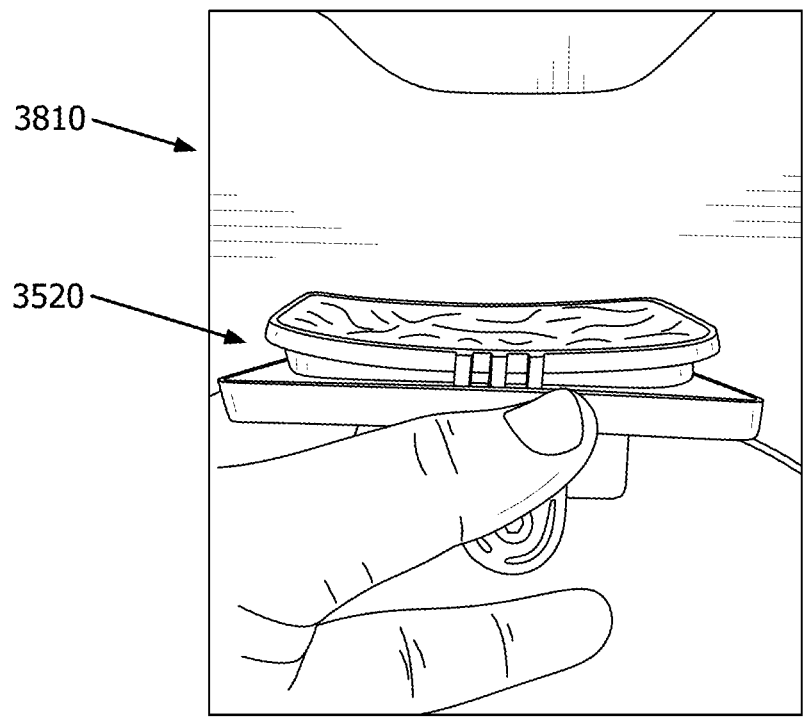
Figure 42:
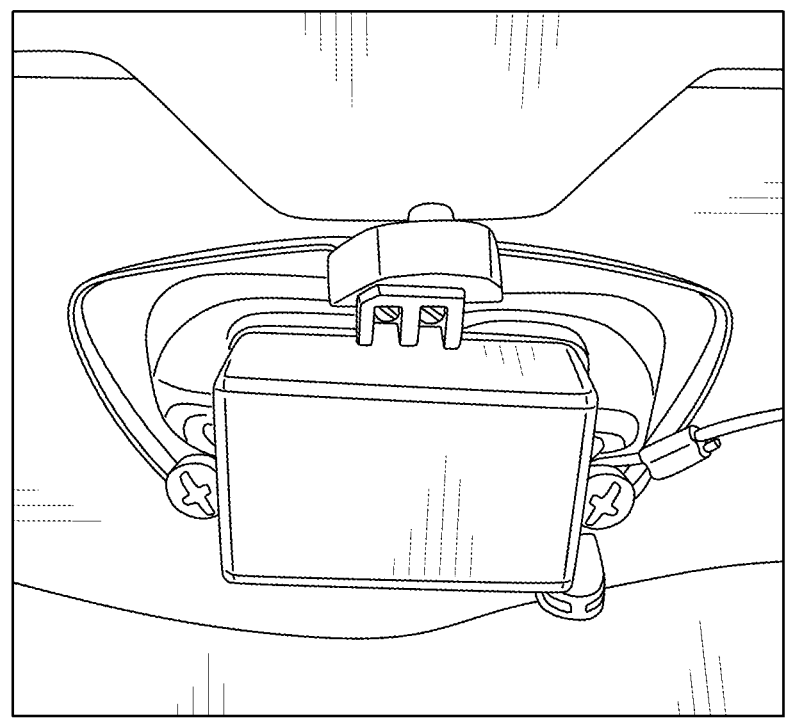

In 3612, the support structure is placed on the passageway at the mounting location. Notably, the WSN and/or actuator are coupled to the support structure at the time of this mounting. An illustration showing the support structure 3520 being placed on surface 3810 of the passageway is provided in FIG. 41. An illustration showing the support structure 3520 placed on surface 3810 of the passageway is provided in FIG. 42. At this time, the individual can confirm that the adhesive has not spread to the magnet 3506 and/or resilient member 3512. A cloth can be used to remove any excess adhesive that spread to the magnet 3506 and/or resilient member 3512.

Figure 43:
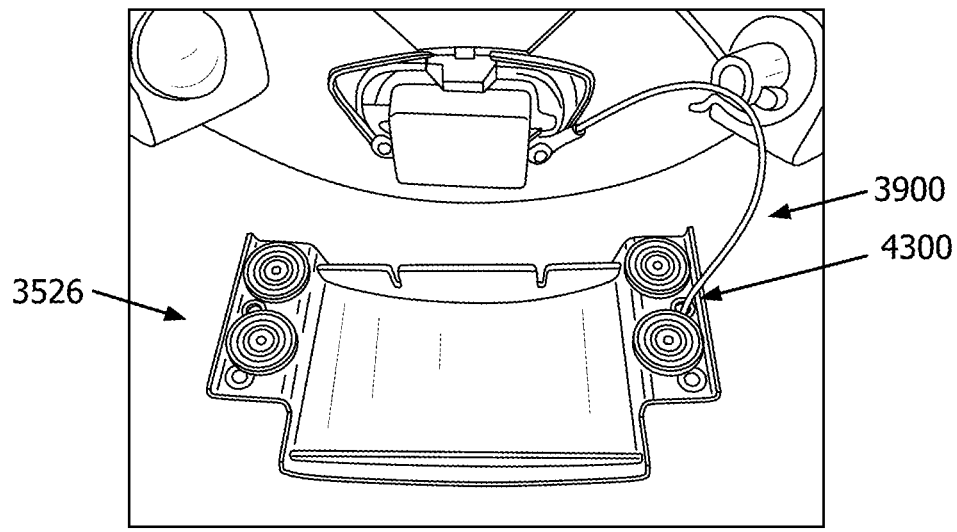

In 3614, the tether is threaded through an aperture formed in the cover of the data collection device assembly. An illustration showing the tether 3900 threaded through an aperture 4300 formed in the cover 3526 of the data collection device assembly is provided in FIG. 43.

Figure 44:
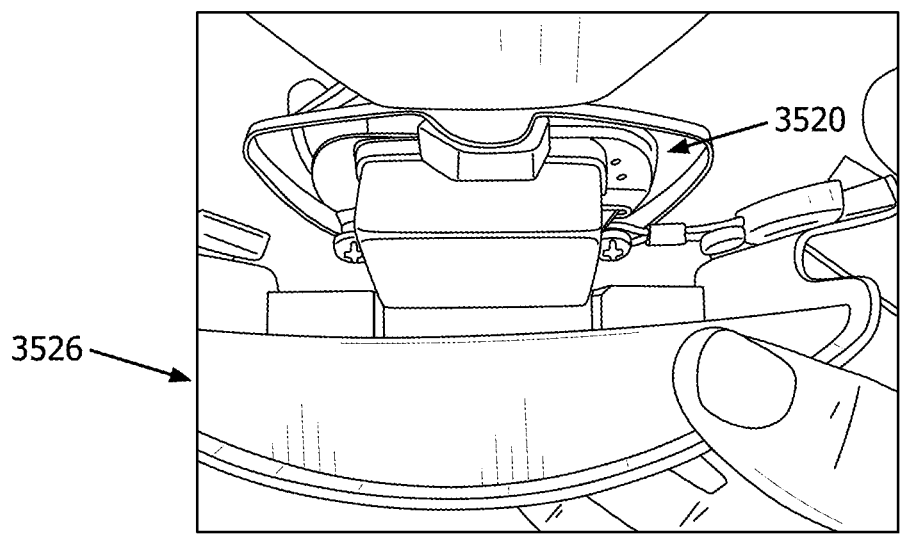

In 3616, the cover is placed on the support structure. An illustration showing the cover 3526 of the data collection device assembly being placed on top to the support structure 3520 is provided in FIG. 44. The present solution is not limited to the illustrated architecture. For example, the data collection device can be placed on other location of the support structure.

Figure 45:
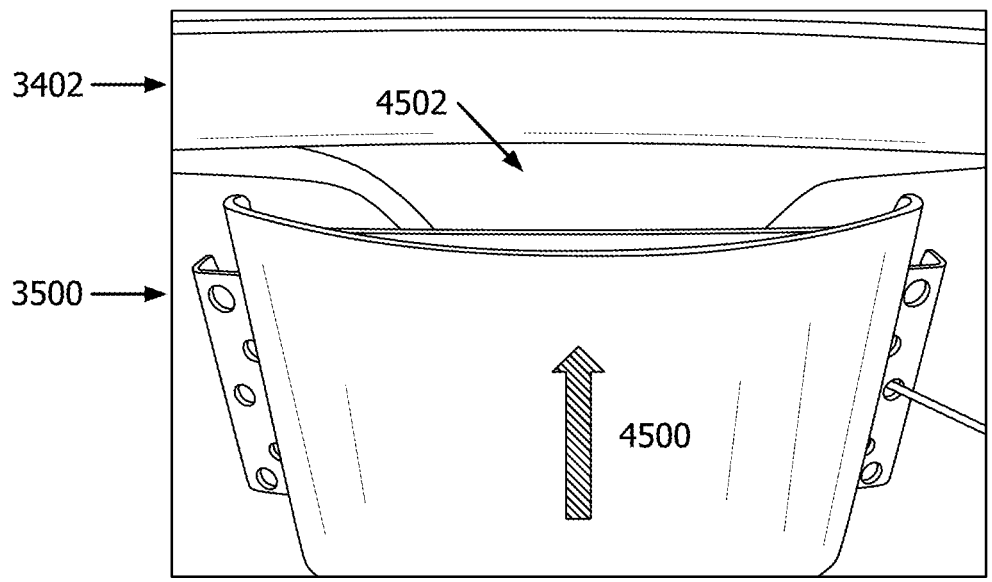

In 3618, the data collection device assembly is slid in an upward direction until a resilient member (e.g., resilient member 3512 of FIG. 35) is fully compressed by a flange of a passageway cover. An illustration is provided in FIG. 45 that shows the data collection device assembly 3500 being slid in direction 4500 such that a flange 4502 of the passageway cover 3402 comes in contact with and compresses the resilient member 3512 of the data collection device assembly until it is fully compressed.

Figure 46:
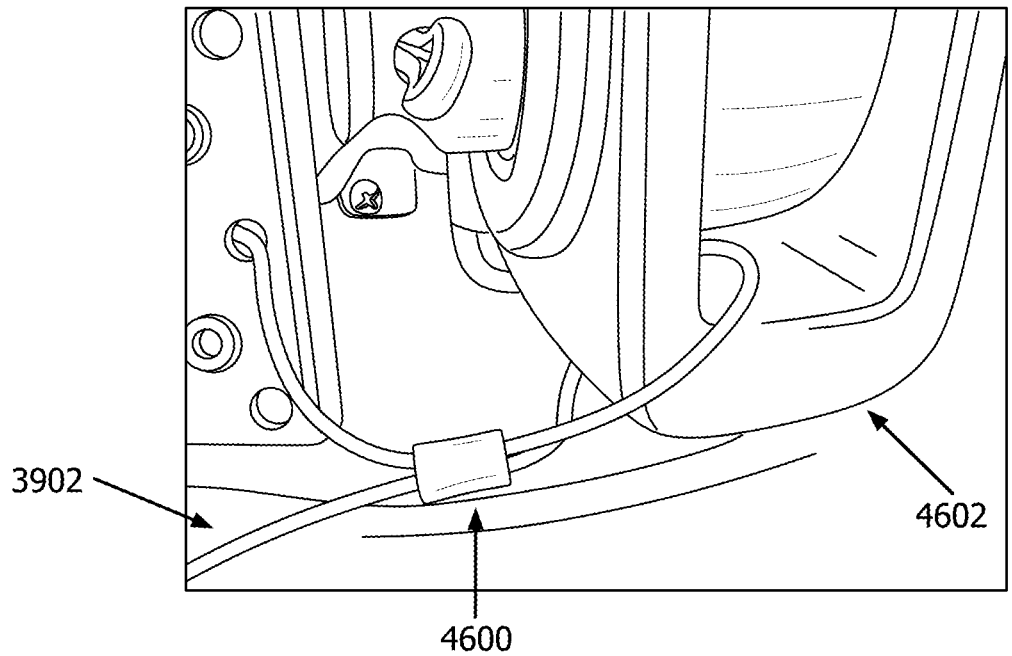

In 3620, the tether is secured to the cover. For example, as shown in FIG. 46, this securement can be accomplished by: threading the wire rope 3902 through a first aperture of a ferrule 4600; threading the wire rope 3902 through an aperture of a passageway bracket 4602; threading the wire rope 3902 through a second aperture of the ferrule 4600; pulling the wire rope 3902 through ferrule 4600; and crimping the ferrule 4600 so that the wire rope 3902 is secured thereto. In some scenarios, excess wire rope 3902 is cut and discarded. Subsequently, 3622 is performed where method 3600 ends or other processing is performed.

Figure 47:
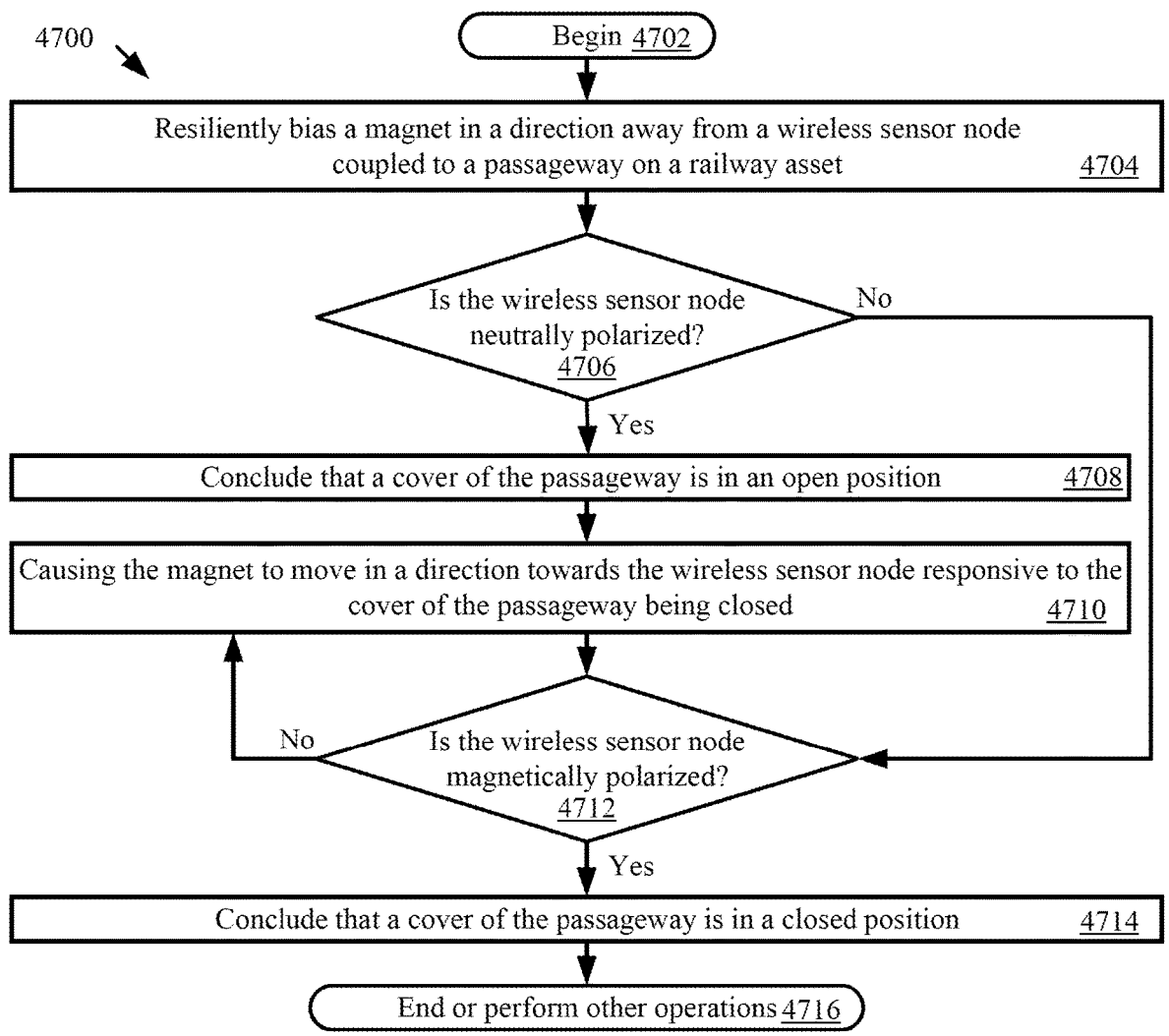
FIG. 47 provides a flow diagram of an illustrative method for detecting an operational status of a passageway on a railway asset.

Referring now to FIG. 47, there is provided a flow diagram of an illustrative method 4700 for detecting an operational status of a passageway (e.g., passageway 124 of FIG. 1 and/or manway port 3400 of FIG. 34) on a railway asset (e.g., railcar 100 of FIG. 1). Method 4700 begins with 4702 and continues with 4704 where a magnet (e.g., magnet 3506 of FIG. 35) is resiliently biased by a resilient member (e.g., resilient member 3512 of FIG. 35) in a direction away from a WSN (e.g., WSN 3502 of FIG. 35) coupled to the passageway. The WSN is coupled to the passageway without any modifications to a physical structure of the passageway. Such a coupling can be achieved using, for example, an adhesive and magnet(s).

Next, a determination is made by the wireless sensor node as to whether it is in a neutrally polarized state or condition. If not [4706:NO], method 4700 continues with 4712 which will be discussed below. If so [4706:YES], the wireless sensor node or an external device (e.g., CMU 170 of FIG. 1, PWG 176 of FIG. 2, and/or remote servers 192 of FIG. 3) concludes that the cover (e.g., cover 3402 of FIG. 34) of the passageway is in an open position 4708.

Thereafter, the magnet may be caused to move in a direction towards the WSN as shown by 4710. This movement can occur responsive to the cover of the passageway being closed. The magnet may be caused to move in the direction towards the WSN by the cover's compression of the resilient member. In 4712, the WSN determines whether it is in a magnetically polarized state or condition. If not [4712:NO], then method 4700 returns to 4710. Otherwise [4712:YES], the WSN or external device concludes that the cover of the passageway is in a closed position 4714. Subsequently, method 4700 ends or other operations are performed in 4716.

It is appreciated that described above are novel systems, devices and methods. It is also understood that the invention is not limited to the embodiments and illustrations described above, and includes the full scope provided by the claims appended hereto. For example, the methods, systems and assemblies discussed above could be applied to the railcar passageways 124 for determining events, alarms, and other information.

What is claimed is:

1. A valve assembly, comprising:
a valve comprising an operative component configured to facilitate a change in a position of the valve between an open position and a closed position;
an actuator comprising a magnet coupled to and configured to rotate with the operative component, wherein the magnet rotates with the rotatable operative component about a common axis; and
a data collection device coupled to the valve, aligned with the actuator, and configured to detect a position of the magnet, wherein said position is indicative of rotational displacement of the operative component, thereby indicting whether the valve is in the open position or the closed position;
wherein the data collection unit is in a magnetically neutral condition when the valve is in the open position, and in a magnetically polarized condition when the valve is in the closed position.

2. The valve assembly according to claim 1, wherein the valve comprises a position indicator coupled to the operative component that is configured to indicate whether the valve is in the open position or the closed position.

3. The valve assembly according to claim 2, wherein the actuator is mounted on the position indicator.

4. The valve assembly according to claim 3, wherein the actuator is mounted on the valve without any modifications to a physical structure of the position indicator.

5. The valve assembly according to claim 3, wherein the actuator comprises a housing with a cavity formed therein in which a portion of the position indicator is disposed and adhesively secured.

6. The valve assembly according to claim 2, wherein at least one alignment tab projects out from a housing of the actuator to facilitate alignment of the actuator and the position indicator during installation of the actuator on the position indicator.

7. The valve assembly according to claim 6, wherein the at least one alignment tab is removable from the actuator so that operation of the valve is unaffected by the at least one alignment tab.

8. The valve assembly according to claim 1, wherein a gap is provided between the actuator and the data collection unit.

9. The valve assembly according to claim 8, wherein movement of the operative component of the valve causes a distance between the actuator and data collection unit to change.

10. The valve assembly according to claim 9, wherein the distance increases when the valve is transitioned from the closed position to the open position, and the distance decreases when the valve is transitioned from the open position to the closed position.

11. The valve assembly according to claim 1, wherein the data collection device is coupled to the valve without any physical modifications to the valve.

12. The valve assembly according to claim 1, wherein the data collection unit is further configured to wirelessly communicate with a remote device when movement of the actuator is detected or a particular distance exists between the data collection unit and the actuator.

13. The valve assembly according to claim 1, wherein the valve comprises a plate configured to protect the valve from damage when contact is made with an external object, and the data collection device is coupled to the plate.

14. A method for detecting an operational status of a passageway on a railway asset, comprising:
using a resilient member to mechanically support a wireless sensor node and an actuator in a given position relative to each other and allow a magnet to be transitioned between a distal position and a proximal position;

placing the magnet in the distal position by using the resilient member to resiliently bias the magnet in a direction away from a wireless sensor node coupled to the passageway;

determining that the passageway is in an open position when the wireless sensor node is neutrally polarized, the data collection device being neutrally polarized when the magnet is in the distant position;

causing compression of the resilient member using a passageway cover;

causing the magnet to move in a direction towards the wireless sensor node responsive to compression of the resilient membera cover of the passageway being closed;

placing the magnet in the proximal position by causing further compression of the resilient member; and determining that the passageway is in a closed position when the wireless sensor node is magnetically polarized, the wireless sensor node being magnetically polarized when the magnet is in the proximal position-proximity therete.

15. The method according to claim 14, wherein the passageway comprises a manway.

16. The method according to claim 14, further comprising coupling the wireless sensor node to the passageway without any modifications to a physical structure of the passageway.

17. The method according to claim 16, wherein the wireless sensor node is coupled to the passageway via an adhesive and at least one magnet.

18. A passageway, comprising:
a nozzle;
a cover coupled to the nozzle and transitionable between an open position and a closed position;
a data collection device assembly coupled to the nozzle, and comprising a wireless sensor node and a resilient member mechanically supporting the wireless sensor node and an actuator in a given position relative to each other while allowing a magnet to be transitioned between a distal position and a proximal position;

wherein the magnet is placed in the distal position by being resiliently biased by the resilient member in a direction away from the wireless sensor node, and transitions from the distal position to the proximal position by moving in a direction towards the wireless sensor node responsive to compression of the resilient member caused by the cover being closed;

wherein the wireless sensor node is configured to detect that the cover is in the open position when the wireless sensor node is neutrally polarized as a result of the magnet being in the distal position and detect that the cover is in the closed position when the wireless sensor is magnetically polarized as a result of the magnet being in the proximal position.

19. The passageway according to claim 18, wherein the passageway comprises a manway.

20. The passageway according to claim 18, wherein the wireless sensor node is coupled to the passageway without any modifications to a physical structure of the nozzle.

21. The passageway according to claim 20, wherein the wireless sensor node is coupled to the nozzle via an adhesive and at least one magnet.

22. The passageway according to claim 18, wherein the data collection device assembly further comprises a protective cover coupled to the passageway without any modifications to a physical structure of the nozzle.

23. The passageway according to claim 22, wherein the protective cover is coupled to the nozzle via at least one magnet.

* * * * *